US012449775B2

(12) United States Patent
Clark et al.

(10) Patent No.: US 12,449,775 B2
(45) Date of Patent: *Oct. 21, 2025

(54) CONTROL SYSTEM WITH NEURAL NETWORK PREDICTOR FOR INDUSTRIAL PROCESSES WITH CHEMICAL REACTIONS

(71) Applicant: Imubit Israel Ltd., Modiin (IL)

(72) Inventors: Corrie Clark, Houston, TX (US); Joseph Von Edwins, Houston, TX (US); Abishek Mukund, Houston, TX (US); Elhanan Ilani, Jerusalem (IL); Ofer Salhov, Houston, TX (US); Janelle Jagnanan, Houston, TX (US); Matthew Stephens, Houston, TX (US); Kevin Clarke, Houston, TX (US); Gilad Cohen, Houston, TX (US); Nadav Cohen, Yavne (IL)

(73) Assignee: IMUBIT ISRAEL LTD. (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/749,958

(22) Filed: Jun. 21, 2024

(65) Prior Publication Data

US 2024/0337993 A1    Oct. 10, 2024

Related U.S. Application Data

(63) Continuation of application No. 17/831,227, filed on Jun. 2, 2022, now Pat. No. 12,066,800, which is a
(Continued)

(51) Int. Cl.
*G05B 13/04* (2006.01)
*G05B 13/02* (2006.01)

(52) U.S. Cl.
CPC ......... *G05B 13/048* (2013.01); *G05B 13/027* (2013.01)

(58) Field of Classification Search
CPC ............................ G05B 13/048; G05B 13/027
(Continued)

(56) References Cited

U.S. PATENT DOCUMENTS

| 4,176,052 A | 11/1979 | Bruce et al. |
| 4,374,021 A | 2/1983 | Bartholic |

(Continued)

FOREIGN PATENT DOCUMENTS

| CN | 109814513 A | 5/2019 |
| EP | 0 949 318 A3 | 10/1999 |

(Continued)

OTHER PUBLICATIONS

Chang A I et al: "Advanced control project stabilizes delayed coker, increases throughput", Oil and Gas Journal, Pennwell, Houston, TX, US vol. 99, No. 34 Aug. 20, 2001 (Aug. 20, 2001), pp. 52-56.

(Continued)

*Primary Examiner* — Allen C Wong
(74) *Attorney, Agent, or Firm* — FOLEY & LARDNER LLP

(57) ABSTRACT

A predictive control system for automatic operation of a plant includes controllable equipment and a predictive controller. The predictive controller is configured to use a predictive model to predict values of controlled variables predicted to result from operating the controllable equipment in accordance with corresponding values of manipulated variables, use the values of the controlled variables predicted by the predictive model to evaluate an objective function that defines a control objective as a function of at least the controlled variables, perform a predictive optimization process to generate optimal values of the manipulated variables for a plurality of time steps in an optimization period using the predictive model and the objective function, and operate the controllable equipment by providing the
(Continued)

controllable equipment with control signals based on the optimal values of the manipulated variables generated by performing the predictive optimization process.

20 Claims, 20 Drawing Sheets

Related U.S. Application Data continuation-in-part of application No. 17/384,660, filed on Jul. 23, 2021, now Pat. No. 12,049,592, which is a continuation-in-part of application No. 17/308,474, filed on May 5, 2021, now Pat. No. 11,993,751, which is a continuation-in-part of application No. 16/950,643, filed on Nov. 17, 2020, now Pat. No. 12,045,022, and a continuation-in-part of application No. 16/888,128, filed on May 29, 2020, now Pat. No. 11,494,651, which is a continuation-in-part of application No. 15/883,114, filed on Jan. 30, 2018, now Pat. No. 11,200,489, said application No. 16/950,643 is a continuation-in-part of application No. 15/883,114, filed on Jan. 30, 2018, now Pat. No. 11,200,489.

(58) Field of Classification Search
USPC .......................................................... 700/44
See application file for complete search history.

(56) References Cited

U.S. PATENT DOCUMENTS

| | | | |
|---|---|---|---|
| 5,311,421 | A | 5/1994 | Nomura et al. |
| 5,825,646 | A | 10/1998 | Keeler et al. |
| 6,246,972 | B1 | 6/2001 | Klimasauskas |
| 7,720,641 | B2 | 5/2010 | Alagappan et al. |
| 9,690,312 | B2 | 6/2017 | Steven et al. |
| 2002/0059202 | A1 | 5/2002 | Hadzikadic et al. |
| 2003/0108244 | A1 | 6/2003 | Li et al. |
| 2006/0178762 | A1 | 8/2006 | Wroblewski et al. |
| 2007/0156288 | A1 | 7/2007 | Wroblewski et al. |
| 2007/0168328 | A1 | 7/2007 | Peralta et al. |
| 2009/0095657 | A1 | 4/2009 | Taha et al. |
| 2010/0050025 | A1 | 2/2010 | Grichnik et al. |
| 2012/0053762 | A1 | 3/2012 | Stiefenhofer et al. |
| 2015/0094201 | A1 | 4/2015 | Janssen et al. |
| 2015/0185717 | A1 | 7/2015 | Sayyar-Rodsari et al. |
| 2015/0379429 | A1 | 12/2015 | Lee et al. |
| 2016/0048113 | A1* | 2/2016 | Pandurangan ....... G05B 13/045 700/29 |
| 2016/0147202 | A1 | 5/2016 | Nandigam et al. |
| 2016/0258361 | A1 | 9/2016 | Tiwari et al. |
| 2017/0061249 | A1* | 3/2017 | Estrada ................ G06V 10/454 |
| 2017/0139423 | A1 | 5/2017 | El Ferik et al. |
| 2017/0183573 | A1 | 6/2017 | Arora et al. |
| 2018/0016503 | A1* | 1/2018 | Prasad .................. C10G 9/005 |
| 2018/0275692 | A1* | 9/2018 | Lattanzio ................ G01K 3/14 |
| 2019/0236447 | A1 | 8/2019 | Cohen et al. |
| 2020/0074486 | A1 | 3/2020 | Motohashi et al. |
| 2020/0311547 | A1 | 10/2020 | Mukund et al. |
| 2020/0355391 | A1 | 11/2020 | Wenzel et al. |
| 2021/0096518 | A1 | 4/2021 | Ilani et al. |
| 2021/0253956 | A1 | 8/2021 | Jagnanan et al. |
| 2021/0348066 | A1 | 11/2021 | Clark et al. |

FOREIGN PATENT DOCUMENTS

| | | | |
|---|---|---|---|
| SU | | 844626 A1 | 7/1981 |
| WO | WO-2021/025841 A1 | | 2/2021 |

OTHER PUBLICATIONS

Extended European Search Report issued in EP application No. 21813354.4 dated Nov. 20, 2023.
International Search Report and Written Opinion issued in PCT/US2022/015474 dated May 12, 2022.
International Search Report and Written Opinion issued in PCT/US2022/024645 dated Jul. 1, 2022.
International Search Report and Written Opinion issued on PCT/US2021/030723 dated Jul. 28, 2021.
International Search Report and Written Opinion on PCT/IB2021/057421 dated Nov. 4, 2021.
International Search Report and Written Opinion on PCT/US23/22036 dated Aug. 4, 2023.
Lawrynczuk, "Predictive Control of a Distillation Column Using a Control-Oriented Neural Model," ICANNGA, 2011, part 1, pp. 230-239.
Lawrynczuk, "Neural Dynamic Matrix Control Algorithm with Disturbance Compensation," IEA/AIE, 2010, part 3, pp. 52-61.
Nguyen et al., "Multiple neural networks for a long term time series forecast", Neural Computing & Applic (2004) 13:90-98 (Year: 2004).
Yu, et al., "Implementation of neural network predictive control to a multivariable chemical reactor", Control Engineering Practice 11 92003) 1315-1323 (Year: 2003).
Zahedi Gholamreza et al: A Neural Network Approach for Identification and Modeling of Delayed Coking Plant:, International Journal of Chemical Reactor Engineering, [Online] vol. 7, No. 1, May 6, 2009.
Guran, Ardeshir et al.: "On Neural Networks in Dientification and Control of Dynamic Systems", Wave Motion, Intelligent Structures and Nonlinear Mechanics. Jun. 1, 1995 (Jun. 1, 1995), World Scientific, XP093200324, pp. 194-225, DOI: 10.1142/9789812796455_0007.
Jadlovska, Anna et al.: "Predictive Control Design Based on Neural Model of a Non-Linear System", Acta Polytechnica Hungarica, vol. 5, No. 4, 2008, Dec. 31, 2008 (Dec. 31, 2008), 16 pg., XP093200317, https://acta.uni-obuda.hu/Jadlovska_Kabakov_Sarnovsky_16.pdf.
Bhutani N. et al: "First-Principals, Data-Based, and Hybrid Modeling and Optimization of an Industrial Hydrocracking Unit", Industrial & Engineering Chemistry Research, vol. 45, No. 23, Oct. 10, 2006 (Oct. 10, 2006), pp. 7807-7816, XP093229502, issn 0888-5885, DOI: 10.1021/ie060247q.
Cristina Popa: "Neural Network Model Predictive Control System for Fluid Catalytic Cracking Unit," Jan. 1, 2013 (Jan. 1, 2013), XP093227795, URL: https://bch.ro/pdfRc/POPA%20C.pdf%2012%2013.pdf.
Ibrahim Alhajree et al: "Modeling and optimization of an industrial hydrocracker plan", Journal of Petroleum Science and Engineering, Elsevier, Amsterdam, NL, vol. 78, No. 3, Jul. 26, 2011 (Jul. 26, 2011), pp. 627-636, XP028106432, ISSN: 0920-4105, DOI: 10.1016/J.PETROL.2011.07.019 [retrieved on Aug. 9, 2011].

* cited by examiner

CONTROL SYSTEM WITH NEURAL NETWORK PREDICTOR FOR INDUSTRIAL PROCESSES WITH CHEMICAL REACTIONS

CROSS-REFERENCE TO RELATED PATENT APPLICATIONS

This application is a continuation of U.S. patent application Ser. No. 17/831,227 filed Jun. 2, 2022, which is a continuation-in-part of U.S. patent application Ser. No. 17/384,660 filed Jul. 23, 2021, which is a continuation-in-part of U.S. patent application Ser. No. 17/308,474 filed May 5, 2021, which is a continuation-in-part of U.S. patent application Ser. No. 16/888,128 filed May 29, 2020 (now U.S. Pat. No. 11,494,651), which is a continuation-in-part of U.S. patent application Ser. No. 15/883,114 filed Jan. 30, 2018 (now U.S. Pat. No. 11,200,489). U.S. patent application Ser. No. 17/308,474 is also a continuation-in-part of U.S. patent application Ser. No. 16/950,643 filed Nov. 17, 2020, which is a continuation-in-part of U.S. patent application Ser. No. 15/883,114 filed Jan. 30, 2018 (now U.S. Pat. No. 11,200,489). The entire disclosures of each of these patent applications and patents are incorporated by reference herein.

BACKGROUND

The present disclosure relates generally to systems and methods for operating a plant including one or more controllable systems or processes, and more specifically to systems and methods for optimally controlling a plant using a combination of neural network models and optimization-based control processes.

Neural network models can be used to learn the behavior of a continuous process represented as a set of time series variables. The above-referenced patent applications and patents describe implementations of neural network models in a control system for a continuous process that use both a predictor neural network model and a controller neural network model to generate control signals for the plant. The predictor neural network model is trained to predict the dynamic behavior of the plant, whereas the controller neural network model is trained based on the predictions generated by the predictor neural network model and subsequently used to generate control signals. The above-referenced patent applications and patents also describe implementations in which a predictor neural network produces a gains matrix that is used for online control.

Some conventional approaches have used neural networks in a control system by training the controller neural network to mimic the behavior of a traditional controller with respect to set of historical training data. After training, the controller neural network can then be substituted for the online controller with the expectation that the controller neural network will perform similarly to online controller that was used to generate the training data. However, there is no guarantee that the control signals generated by the controller neural network are optimal when implemented in the online environment.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a predictive control system including controllable equipment and a controller. The controllable equipment are operable to affect one or more controlled variables of a plant by providing the controllable equipment with control signals based on one or more manipulated variables. The controller includes a processing circuit configured to use a neural network model to predict values of the one or more controlled variables predicted to result from operating the controllable equipment in accordance with corresponding values of the one or more manipulated variables, use the values of the one or more controlled variables predicted by the neural network model to evaluate an objective function that defines a control objective as a function of at least the one or more controlled variables, perform a predictive optimization process to generate optimal values of the manipulated variables for a plurality of time steps in an optimization period using the neural network model and the objective function, and operate the controllable equipment by providing the controllable equipment with control signals based on the optimal values of the manipulated variables generated by performing the predictive optimization process.

In some embodiments, performing the predictive optimization process includes setting the values of the one or more manipulated variables to adjusted values, using the neural network model to generate predicted values of the one or more controlled variables predicted to result from operating the controllable equipment in accordance with the adjusted values of the one or more manipulated variables, evaluating the objective function using the predicted values of the one or more controlled variables, and iteratively repeating the setting, using, and evaluating steps until the control objective has converged upon an optimal value.

In some embodiments, the values of the one or more manipulated variables include at least one of time step specific values of the one or more manipulated variables at each of the time steps of the optimization period or changes in the time step specific values of the one or more manipulated variables between time steps of the optimization period.

In some embodiments, performing the predictive optimization process includes forecasting values of one or more disturbance variables at each of the plurality of the time steps of the optimization period, providing the values of the one or more disturbance variables as additional inputs to the neural network model, and using a neural network model to predict the values of the one or more controlled variables based on the corresponding values of one or more manipulated variables and the values of the one or more disturbance variables.

In some embodiments, performing the predictive optimization process includes forecasting values of one or more disturbance variables at each of the plurality of the time steps of the optimization period, providing the values of the one or more disturbance variables as additional inputs to the objective function, and evaluating the objective function to calculate a value of the control objective as a function of at least the values of the one or more controlled variables and the values of the one or more disturbance variables.

In some embodiments, performing the predictive optimization process includes adjusting the one or more manipulated variables using a non-convex optimization algorithm.

In some embodiments, performing the predictive optimization process includes generating a plurality of scenarios, each of the plurality of scenarios comprising a different and alternative set of conditions that could potentially occur over the optimization period and affect at least one of the neural network model or the objective function and at least one of (1) repeating the predictive optimization process for each of the plurality of scenarios to generate a plurality of scenario-specific optimization results comprising scenario-specific optimal values of the manipulated variables and merging the plurality of scenario-specific optimization results to generate the optimal values of the manipulated variables or (2) generating a combined objective function by combining a plurality of scenario-specific objective functions for the plurality of scenarios and performing the predictive optimization process using the combined objective function to generate the optimal values of the manipulated variables.

In some embodiments, the processing circuit is configured to train the neural network model by performing a training process including initializing the neural network model with an initial set of weights, using the neural network model to predict the values of the controlled variables at a historical time step based on historical plant data for one or more previous time steps occurring prior to the historical time step, determining an error between predicted values of the controlled variables predicted by the neural network model and actual values of the controlled variables defined by the historical plant data, and adjusting the weights of the neural network model to reduce the error.

In some embodiments, the processing circuit is configured to train the neural network model by performing a plurality of training episodes. Each training episode may include obtaining the neural network model including a set of weights and repeatedly applying the neural network model to historical plant data for a historical time step to predict values of the controlled variables at the historical time step for a plurality of historical time steps. The values of the controlled variables predicted at each subsequent historical time step may be based on the values of the controlled variables predicted by the neural network model from a preceding historical time step. Each training episode may further include adjusting the weights of the neural network model to reduce errors between the values of the controlled variables predicted by the neural network model and actual values of the controlled variables defined by the historical plant data over a duration of the training episode.

In some embodiments, the processing circuit is configured to augment the objective function with one or more penalties based on at least one of the values of the one or more manipulated variables, the values of the one or more controlled variables, or the values of the one or more disturbance variables relative to corresponding threshold values. For example, the penalties may be based on amounts by which the values of the one or more manipulated variables, the values of the one or more controlled variables, or the values of the one or more disturbance variables exceed corresponding maximum value thresholds, are less than minimum value thresholds, fall outside threshold ranges, etc.

In some embodiments, the processing circuit is configured to perform the predictive optimization process subject to a set of constraints that define limits based on at least one of the values of the one or more manipulated variables or the values of the one or more controlled variables.

In some embodiments, the optimization period is an initial optimization period and the processing circuit is configured to shift the initial optimization period in time to generate one or more time-shifted optimization periods that partially overlap with the initial optimization period and repeat the predictive optimization process for the one or more time-shifted optimization periods to generate optimal values of the manipulated variables for a plurality of time steps in the one or more time-shifted optimization periods.

In some embodiments, the processing circuit is configured to generate the control signals for the controllable equipment by using the optimal values of the manipulated variables for one or more first time steps of the plurality of time steps in the optimization period to generate the control signals for the one or more first time steps, discarding the optimal values of the manipulated variables for one or more subsequent time steps in the optimization period occurring after the one or more first time steps, repeating the predictive optimization process for one or more time-shifted optimization periods to generate new optimal values of the manipulated variables for the one or more subsequent time steps, and using the new optimal values of the manipulated variables for the one or more subsequent time steps to generate the control signals for the one or more subsequent time steps.

In some embodiments, the processing circuit is configured to generate the control signals for the controllable equipment by using the optimal values of the manipulated variables for one or more first time steps of the plurality of time steps in the optimization period to generate the control signals for the one or more first time steps, storing the optimal values of the manipulated variables for one or more subsequent time steps in the optimization period occurring after the one or more first time steps, repeating the predictive optimization process for one or more time-shifted optimization periods to generate new optimal values of the manipulated variables for the one or more subsequent time steps, and merging the new optimal values of the manipulated variables for the one or more subsequent time steps with the stored optimal values of the manipulated variables to generate the control signals for the one or more subsequent time steps.

Another implementation of the present disclosure is a method for operating controllable equipment in a predictive control system. The method includes using a neural network model to predict values of one or more controlled variables of a plant predicted to result from operating the controllable equipment in accordance with corresponding values of one or more manipulated variables, using the values of the one or more controlled variables predicted by the neural network model to evaluate an objective function that defines a control objective as a function of at least the one or more controlled variables, performing a predictive optimization process to generate optimal values of the manipulated variables for a plurality of time steps in an optimization period using the neural network model and the objective function, and operating the controllable equipment by providing the controllable equipment with control signals based on the optimal values of the manipulated variables generated by performing the predictive optimization process.

In some embodiments, performing the predictive optimization process includes setting the values of the one or more manipulated variables to adjusted values, using the neural network model to generate predicted values of the one or more controlled variables predicted to result from operating the controllable equipment in accordance with the adjusted values of the one or more manipulated variables, evaluating the objective function using the predicted values of the one or more controlled variables, and iteratively repeating the setting, using, and evaluating steps until the control objective has converged upon an optimal value.

In some embodiments, the values of the one or more manipulated variables include at least one of time step specific values of the one or more manipulated variables at each of the time steps of the optimization period or changes in the time step specific values of the one or more manipulated variables between time steps of the optimization period.

In some embodiments, performing the predictive optimization process includes forecasting values of one or more disturbance variables at each of the plurality of the time steps of the optimization period, providing the values of the one or more disturbance variables as additional inputs to the neural network model, and using a neural network model to predict the values of the one or more controlled variables based on the corresponding values of one or more manipulated variables and the values of the one or more disturbance variables.

In some embodiments, performing the predictive optimization process includes forecasting values of one or more disturbance variables at each of the plurality of the time steps of the optimization period, providing the values of the one or more disturbance variables as additional inputs to the objective function, and evaluating the objective function to calculate a value of the control objective as a function of at least the values of the one or more controlled variables and the values of the one or more disturbance variables.

In some embodiments, performing the predictive optimization process includes adjusting the one or more manipulated variables using a non-convex optimization algorithm.

In some embodiments, performing the predictive optimization process includes generating a plurality of scenarios, each of the plurality of scenarios comprising a different and alternative set of conditions that could potentially occur over the optimization period and affect at least one of the neural network model or the objective function and at least one of (1) repeating the predictive optimization process for each of the plurality of scenarios to generate a plurality of scenario-specific optimization results comprising scenario-specific optimal values of the manipulated variables and merging the plurality of scenario-specific optimization results to generate the optimal values of the manipulated variables or (2) generating a combined objective function by combining a plurality of scenario-specific objective functions for the plurality of scenarios and performing the predictive optimization process using the combined objective function to generate the optimal values of the manipulated variables.

In some embodiments, the method includes training the neural network model by performing a training process including initializing the neural network model with an initial set of weights, using the neural network model to predict the values of the controlled variables at a historical time step based on historical plant data for one or more previous time steps occurring prior to the historical time step, determining an error between predicted values of the controlled variables predicted by the neural network model and actual values of the controlled variables defined by the historical plant data, and adjusting the weights of the neural network model to reduce the error.

In some embodiments, the method includes training the neural network model by performing a plurality of training episodes. Each training episode may include obtaining the neural network model including a set of weights and repeatedly applying the neural network model to historical plant data for a historical time step to predict values of the controlled variables at the historical time step for a plurality of historical time steps. The values of the controlled variables predicted at each subsequent historical time step may be based on the values of the controlled variables predicted by the neural network model from a preceding historical time step. Each training episode may further include adjusting the weights of the neural network model to reduce errors between the values of the controlled variables predicted by the neural network model and actual values of the controlled variables defined by the historical plant data over a duration of the training episode.

In some embodiments, the method includes augmenting the objective function with one or more penalties based on at least one of the values of the one or more manipulated variables, the values of the one or more controlled variables, or the values of the one or more disturbance variables relative to corresponding threshold values. For example, the penalties may be based on amounts by which the values of the one or more manipulated variables or the values of the one or more controlled variables exceed corresponding maximum value thresholds, are less than minimum value thresholds, fall outside threshold ranges, etc.

In some embodiments, the method includes performing the predictive optimization process subject to a set of constraints that define limits based on at least one of the values of the one or more manipulated variables or the values of the one or more controlled variables.

In some embodiments, the optimization period is an initial optimization period and the method further includes shifting the initial optimization period in time to generate one or more time-shifted optimization periods that partially overlap with the initial optimization period and repeating the predictive optimization process for the one or more time-shifted optimization periods to generate optimal values of the manipulated variables for a plurality of time steps in the one or more time-shifted optimization periods.

In some embodiments, the method includes generating the control signals for the controllable equipment by using the optimal values of the manipulated variables for one or more first time steps of the plurality of time steps in the optimization period to generate the control signals for the one or more first time steps, discarding the optimal values of the manipulated variables for one or more subsequent time steps in the optimization period occurring after the one or more first time steps, repeating the predictive optimization process for one or more time-shifted optimization periods to generate new optimal values of the manipulated variables for the one or more subsequent time steps, using the new optimal values of the manipulated variables for the one or more subsequent time steps to generate the control signals for the one or more subsequent time steps.

In some embodiments, the method includes generating the control signals for the controllable equipment by using the optimal values of the manipulated variables for one or more first time steps of the plurality of time steps in the optimization period to generate the control signals for the one or more first time steps, storing the optimal values of the manipulated variables for one or more subsequent time steps in the optimization period occurring after the one or more first time steps, repeating the predictive optimization process for one or more time-shifted optimization periods to generate new optimal values of the manipulated variables for the one or more subsequent time steps, and merging the new optimal values of the manipulated variables for the one or more subsequent time steps with the stored optimal values of the manipulated variables to generate the control signals for the one or more subsequent time steps.

DETAILED DESCRIPTION

Overview

General Overview

Figure 1:
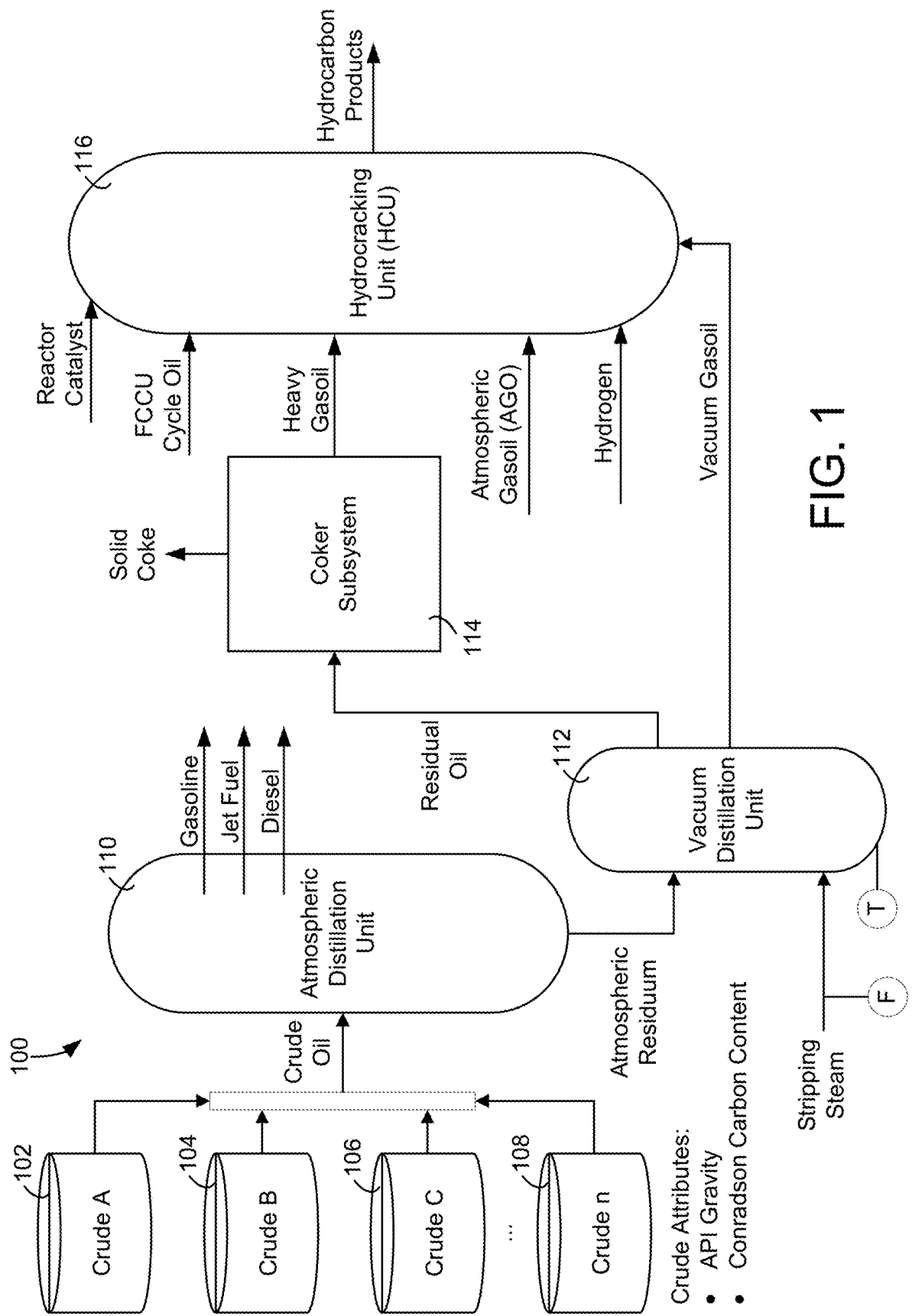
FIG. 1 is a diagram of a petroleum refinery system, according to some embodiments.

Referring generally to the FIGURES, systems and methods for controlling and optimizing hydrocracking and hydrotreating oil refinery processes are shown, according to exemplary embodiments. Hydrocracking and hydrotreating are valuable oil refinery processes that convert low-value feedstocks (e.g., residue oil, vacuum gasoils, etc.) into a variety of higher-value and lower-density products including but not limited to naphtha, kerosene, diesel, and gasoline. Hydrocracking reactions may occur over a catalyst within a hydrocracking unit (HU) in the presence of hydrogen. Specifically, longer-chain hydrocarbon molecules may be broken down into shorter molecules in the presence of hydrogen and the catalyst. This process results in a relatively heavier (i.e., higher density) input hydrocarbon feed being converted (i.e., broken down) into one or more lighter (i.e., lower density) hydrocarbon outputs.

In some embodiments, the goal of hydrocracking processes may be to maximize the value of the yield (i.e., output, production, generation, etc.) of the hydrocarbon outputs, reach a certain product quality of the hydrocarbon outputs (e.g., chemical and/or physical properties, or a combination thereof. However, it can be difficult and challenging to accomplish this goal due to the highly nonlinear nature of hydrocracking reactions. For example, in some cases, the temperature within a reactor bed of the HCU (e.g., weighted average bed temperature (WABT), reactor severity, bed(s) temperature, a combination thereof, etc.) can be correlated positively to conversion of heavy hydrocarbon feed to light hydrocarbon outputs. However, too high of reactor WABT's, for example, may lead to over-cracking of diesel and/or naphtha molecules into much lighter hydrocarbons, such as LPG and off-gas. The temperature at which this can occur can vary, and can be dependent on several factors (e.g., catalyst age, catalyst feed rate, hydrogen feed rate, gas oil feed rate, feed quality, etc.). The present disclosure provides various control systems and methods for improving the desired yield and/or the product quality of one or more hydrocarbon products produced from hydrocracking units based on one or more nonlinear factors (e.g., reactor severity, feed quality, feed rate, catalyst quality, etc.).

The control systems and methods described herein can be used to predictively model the hydrocracking conversion process and control oil refinery systems to generate the most valuable total volume and/or most valuable volume and/or most valuable product qualities of one or more hydrocarbon products from hydrocracking unit(s). This may be performed by assigning a value or price to one or more of the fractions (i.e., output oil products) produced by a hydrocracking unit—such as diesel or jet fuel—and optimizing the total expected value of the hydrocracking process by minimizing or maximizing an objective function that takes into account the values or prices assigned to each of the hydrocracking unit fractions, as well as predicted yield rates of the individual fractions (i.e., the hydrocarbon products produced by the hydrocracking unit after hydrotreating and hydrocracking the received feedstock). These predicted yield rates may be determining using various predictive control techniques, such model predictive control, neural network control, or a combination thereof.

As described herein, product qualities can refer to a specific chemical or physical property of a product stream. This may be considered different from its yield, as the quality of the actual stream is different than the volume or amount of the stream. As described herein, the product streams can refer to any and all of the output oil streams from HCU 116, any input streams into HCU 116, or a combination thereof.

Adjusting unit feed rate or reactor severity can alter both the yield of a product, and/or the chemical and/or physical properties of the product. In some embodiments, could be considered by a control technique (e.g., predictive control, model predictive control, an objective function, etc.). For example, a control technique that uses an objective function may modify the price of a stream to account for the value of the cetane number (CN) in diesel, as typically the higher the CN in a diesel stream, the more valuable the diesel stream is. The objective function could therefore be modified to include an upgrade to the price (e.g., monetary price, weight of the variable associated with the diesel stream, etc.) based on the value of the CN in the diesel stream. Alternatively, the objective function could be structured to not consider product qualities of one or more of the output streams. Instead, there could be additional CVs (e.g., a CV that represented diesel_cetane_number, etc.) which would have associated with it an upper/lower bound and/or a constant goal. In some embodiments, these properties are represented by inferentials. Details regarding product qualities and the control thereof is described in greater detail below.

As described herein, the term oil products is not limited to hydrocarbon products from HCU's that include oil, but can be or include any type of production stream produced by within system 100 (e.g., by HCU 116), such as liquefied petroleum gas (LPG) products, gasoline, diesel, kerosene, jet fuel, fuel oil, or a combination thereof. In some embodiments, oil product includes some or all of the products produced by HCU 116. These can include individual hydrocarbon products or a combination of hydrocarbons.

As described herein, the control systems and methods can be used to predict total volume (e.g., largest total amount of volume achievable by HCU 116), of HCU 116, the highest valued total volume (e.g., highest valued amount of total volume), total volume of one or more hydrocarbon products (e.g., total volume of naphtha, etc.), highest valued volume of one or more hydrocarbon products (e.g., highest value of jet fuel volume, etc.), or any combination thereof. As described herein, the volume of the one or more hydrocarbon products can refer to the amount (e.g., the actual volume, the mass, the flow rate, a combination thereof, etc.) of the output oil products produced by HCU 116 and/or their value (e.g., economic value, using custom weights, etc.).

Hydrocracking Overview

Oil refiners that wish to optimize volume production may implement systems and methods for "cracking" certain hydrocarbons. In some embodiments, there is less demand for the longer-chain, high molecular weight hydrocarbons, when compared to lighter hydrocarbons (e.g., gasoline, diesel, etc.). At a high level, this method of cracking hydrocarbons may generally refer to heating the heavier hydrocarbons (e.g., along with additional methods) until the hydrocarbon molecular chains break, producing lightweight, valuable oil products. Several methods for performing cracking may be implemented, such as catalytic cracking, thermal cracking, steam cracking, and hydrocracking.

In some embodiments, different methods for cracking heavy hydrocarbons can be used to yield different amounts (i.e., yields) of lower-weight hydrocarbon products. For example, a hydrocracker my "upgrade" a vacuum gasoil (VGO) feed by injecting hydrogen, resulting in a higher volume of high-quality diesel and kerosene. In contrast, if the same feed were input into a fluid catalytic cracking unit (FCCU) at the same refinery, the FCCU may yield a higher volume of high-quality gasoline (i.e., compared to diesel and kerosene).

As noted above, hydrocracking and hydrotreating are valuable processes in oil refineries that convert low-value feedstocks (e.g., residue oil, vacuum gasoils, etc.) into a variety of higher-value products, including, but not limited to, naphtha, kerosene, diesel, and gasoline. Hydrocracking reactions may occur over a catalyst within a hydrocracking unit (HU) in the presence of hydrogen. HCUs may typically be divided into several reactor stages, each with different operating objectives and physical configurations.

For example, in the first stage of an HCU, an input oil feed (e.g., a feedstock, a collection of oil compounds entering into the HCU, etc.) is processed to remove organic sulfur and organic nitrogen, which can poison downstream catalysts. The organic nitrogen and sulfur are converted to ammonia and hydrogen sulfide, respectively. The reactor effluent from the first stage (e.g., the hydrotreating stage) can then be processed in a series of liquid/vapor separation vessels, where the nitrogen and sulfur—now in the gaseous state—can be readily removed.

In the hydrocracking section (e.g., the second stage), longer-chain hydrocarbon molecules are broken down into shorter molecules in the presence of hydrogen and the received catalyst. The carbon-carbon (C—C) bonds within the longer chain molecules are replaced with carbon-hydrogen (C—H) bonds through an exothermic reaction. As such, hydrocracking may consume large volumes of hydrogen, with hydrogen atoms readily bonding to the carbon atoms. The inclusion of additional hydrogen into the hydrocarbon molecules, as well as the breaking of larger molecules into smaller molecules, can result in decreasing the density of the product stream.

In some embodiments, hydrocracking increases each of the volumes of the combined products streams relative to the volume of the feed (as a result of the introduction of hydrogen into the process) while also the decreasing the density of the products. This can result in more volume being produced compared to the volume received in the feed, which can be referred to as volume swell.

Reactor effluent from the second stage is then processed in additional liquid/vapor separation vessels before being combined with the effluent from the first stage, and then fractionated into product streams in a multi-stage distillation column. Typical products from this column include liquid petroleum gas (LPG), naphtha, kerosene, jet fuel, diesel and unconverted cycle oil (UCO). A portion of the UCO stream can be recycled back through the second stage for further processing (or cracking). Refiners may also withdraw some of the UCO as a product from the hydrocracking unit.

In some embodiments, both the first and second stages can be split over multiple reactors, either in series or parallel. In addition, a single reactor can contain both hydrotreating and hydrocracking catalyst beds, with the hydrotreating sections at the top of the reactor, and the hydrocracking reactions at the bottom. Hydrocracking is a highly non-linear process, as such, previous optimization technologies (e.g., traditional advanced process control (APC) linear models, etc.) cannot model the complex dynamic and nonlinear relationships between reactor severity and one or more product yields (e.g., conversion and selectivity) and/or product qualities. Additionally, ever-changing feed rates and compositions, as well as catalyst degradation, can make real-time optimization of hydrocracking units a challenge, since these factors impact where on the reactor severity curves reactors should operate to optimize product yields.

Traditional hydrocracking optimization may attempt to maximize conversion to some limit determined by weekly linear programming (LP) models. Conversion is generally defined as:

$$\text{Conversion} = (1 - UCO/\text{Feed}) * 100\%$$

Where UCO is unconverted cycle oil (i.e., the volumetric flow rate of purged oil that leaves the unit without being converted into lighter products). In some embodiments, this is zero for some units with lighter feed.

In some embodiments, reactor temperatures are described using Weighted-Average Bed Temperatures (WABTs) which can account for the different catalyst volumes in each reactor bed when averaging the reactor bed temperatures. An exemplary WABT calculation is shown below:

$$WABT = \sum (x_i(T_{IN,i} + 2/3[\Delta T_{OUT,i}]))$$

Where WABT is the weighted average bed temperature, $x_i$ is a fraction of catalyst in a given bed (i) or reactor, $T_{IN}$ is the inlet temperature to the given bed (i) or reactor, and $T_{OUT}$ is the outlet temperature to the given bed (i) or reactor.

In some embodiments, conversion trends positively with reactor temperature. In such embodiments, to maximize conversion, refiners will run their hydrocracking reactors as hot as possible while considering catalyst life. In fixed bed reactors, the catalyst can be changed at fixed intervals (e.g., several years apart, etc.). Therefore, maintaining sufficient catalyst activity between fresh catalyst loads is one of the main driving factors of hydrocracking operation. At higher temperatures, more coke is deposited on the catalyst, blocking reaction sites and reducing catalyst activity. As such, hydrocrackers are typically operated at maximum allowable temperatures, where the maximum allowable temperature will increase gradually throughout the catalyst lifecycle to some final limit.

Maximizing conversion is not always the optimal economic solution, however, as increasing reactor WABTs can lead to over-cracking of valuable diesel molecules into naphtha and LPG. In addition, the temperature at which over-cracking begins to occur is highly variable and depends on unit conditions, catalyst age, feed rates, and feed qualities. Linear modeling techniques are not adequate to truly understand, control, and optimize the variables that affect hydrocracker product yields.

Additionally, the saturation of polyaromatics present in the feed to the hydrotreater can be a considerable source of volume gain within the unit. Saturation of polyaromatics is reversible, and at high temperatures, the reverse reaction will begin to occur, negatively affecting unit volume gain and profitability. The temperature at which the reverse reaction can become favorable is highly dynamic and can be affected by multiple factors including catalyst age, feed rate, hydrogen partial pressure, and feed quality. The relationship between first-stage WABT and organic nitrogen/sulfur conversion may also be highly nonlinear. Factors that affect this relationship include but are not limited to, feed quality and rate, hydrogen partial pressure in the reactor, and catalyst age. Controlling the concentration of nitrogen leaving the first stage using a linear model is, therefore, highly inaccurate.

Advantageously, the systems and methods described herein improve upon previous control systems for oil refinery processes by using neural networks to predict, control, and optimize hydrocracking and hydrotreating processes. Neural networks are a type of artificial intelligence that are generally inspired by biological neural networks. Neural networks can include a collection of connected nodes, wherein the connections of the nodes are modeled as weights. The inputs to a neural network may be modified by these weights and summed, producing an output layer that indicates a particular prediction or determination. Adjustment of the weights effects the output layer of the neural network, thus affecting its learning process.

Neural network-based control systems can be used to monitor and control a wide variety of systems and processes including, for example, a petroleum refinery system, a natural gas processing plant, a liquefied natural gas (LNG) production facility, an olefin manufacturing plant, a commodity chemical manufacturing plant, a polymer production system, a renewable fuel production facility, an ammonia complex processing system, and many other types industrial, production, or processing systems. Training a neural network typically includes applying a set of training data that represents the behavior of the system to the neural network and tuning the neural network to predict the system behavior reflected by the training data. However, it can be challenging to properly train and apply a neural network to a dynamic system that behaves differently at different points in time.

Oil Refinery System

Referring now to FIG. 1, a system 100 for refining petroleum to transform crude oil (or other crude petroleum products) into more useful products (e.g., gasoline, petrol, kerosene, jet fuel, etc.) is shown, according to exemplary embodiments. FIG. 1 depicts one example of a system 100 for refining crude oil, but it should be understood that the systems and methods described herein are not limited to any particular configuration of system 100. For example, other embodiments of system 100 may include other refinery tools (e.g., a de-salter for the crude oil, hydrocrackers, hydrotreaters, etc.), different arrangements or configurations of system 100 that include the same components, more or fewer drums and/or storage containers, and other modifications to system 100. System 100 is shown to include crude oil storage tanks (e.g., "oil tanks") 102-108, atmospheric distillation unit (ADU) 110, vacuum distillation unit (VDU) 112, coker subsystem 114, and fluid catalytic cracker unit (FCCU) 116. In some embodiments, system 100 is configured to generate light hydrocarbon products from residue and other heavy hydrocarbons using, at least in part, hydrocracking unit (HU) 116. System 100 may include a control system configured to optimize the volume gain (e.g., the volume of light hydrocarbons produced, etc.), the total volume produced by one or more hydrocarbon products, or the most valuable amount of hydrocarbon products individually and/or as a whole.

Before describing the components of system 100 in detail, it is noted that although system 100 is described primarily as refining oil, it should be understood that the systems and methods described herein can be used to refine or produce any of a variety of petroleum products. For example, system 100 can be operated to produce butane, methane, diesel fuel, fuel oil, gasoline, kerosene, liquefied natural gas, liquefied petroleum gas, propane, microcrystalline wax, napalm, naphtha, naphthalene, paraffin wax, petroleum jelly, petroleum wax, refined asphalt, refined bitumen, refined petroleum gas, slack wax, sulfur, petroleum coke, petrochemicals, or any other type of petroleum product. In general, system 100 may be configured to convert one or more input petroleum products into one or more output or derived petroleum products.

Oil tanks 102-108 may represent the mechanical components and/or methods for storing and providing petroleum into system 100. As disclosed herein, the terms "petroleum" and "crude oil" may be used interchangeably when referring to the mixture of hydrocarbons received prior to oil refining. In some embodiments, the oil stored in oil tanks 102-108 has an American Petroleum Institute (API) gravity of 15-45 degrees, wherein a high API indicates a lower density crude oil and a low API indicates a higher density crude oil. In some embodiments, the oil stored in oil tanks 102-108 has a lower or higher API gravity. In some embodiments, the level of concarbon content (CCR) (e.g., Conradson carbon residue, etc.) is measured to provide an indication of the coke-forming tendencies of the crude oil, prior to providing crude oil to system 100 via oil tanks 102-108. The crude oil stored in oil tanks 102-108 may be recovered through various forms of oil drilling and/or natural petroleum springs. A pumping system may then transfer the received crude oil to store in oil tanks 102-108 and provide the crude oil into atmospheric distillation unit 110.

ADU 110 may be configured to superheat the received crude oil to temperatures that separate the crude oil into its various naturally-occurring components, such as gasoline, kerosene, diesel, fuel oil, and residual oil. While FIG. 1 shows a single atmospheric distillation unit, system 100 may include any number of atmospheric and/or vacuum distillation units for refining the crude oil. Additionally, the crude oil may be preheated (e.g., by a furnace, by one or more tube-still heaters, etc.) such that the crude oil enters ADU 110 at a temperature where some or most of the crude oil is already vaporized. For example, crude oil may be preheated to a temperature of 250-260° C. The oil then enters a tube-still heater to reach a temperature of 350-360° C., where it is then fed into ADU 110. Upon entering ADU 110, the crude oil is further heated to increase vaporization of the crude oil. The vapor rises within ADU 110 and separates to fractions (e.g., subcomponents, layers, levels, etc.). These fractions may be determined by the temperature at which the vapor phase changes back into a liquid. As such, once the vapor reaches an appropriate fraction layer, the vapor changes back into a liquid and is successfully separated into a distillate of the crude oil.

Various distillates may be produced via ADU 110, including light distillates (e.g., liquid petroleum gasoline (LPG), gasoline, naphtha, etc.), middle distillates (e.g., kerosene, jet fuel, diesel, etc.), heavy distillates (e.g., fuel oil, etc.), and residuum (e.g., heavy fuel oil, lubricating oils, vax, asphalt, etc.). In a general embodiment, light distillates may have a boiling point around 150-200° C., middle distillates may have a boiling point around 250-300° C., heavy distillates may have a boiling point around 300-350° C., and residuum may have a boiling point around 350° C. and above. The processes performed by ADU 110 may be referred to a fractional distillation or fractionation. ADU 110 is shown providing the distilled residuum to VDU 112 for further distillation.

VDU 112 may provide another vessel for distilling petroleum products in a heated container. As shown in FIG. 1, the crude oil residuum is provided to VDU 112 for further distillation. System 100 further shows stripping steam entering VDU 112, which may be included in the distillation process. The stripping steam may be controlled based on flow measurements taken by flow sensors, prior the stripping steam entering VDU 112. VDU 112 may perform vacuum distillation, a process similar to ADU 110, but in a vacuum or close to a vacuum (e.g., 10 mmHg, 20 mmHg, etc.). This process for distilling crude oils may help to produce petroleum products from heavier oils left over from atmospheric distillation, as the low pressure in the vacuum decreases the boiling point for the petroleum products in the crude oil. VDU 112 may produce similar distillates as ADU 110 and decrease the overall residuum left over after distillation. However, residuum from the vacuum distillation of VDU 112 may still be present, and is sent to coker subsystem 114 for further processing.

Coker subsystem 114 may be configured to act as a coking system and may convert the residual oil from VDU 112 into more distillates, such as hydrocarbon gases, naphtha, gas oils, and coke. The solid coke may be dumped into a coke hauler to be transported away from system 100. The excess gasoils that were not transformed into solid coke may be provided to HCU 116 for further processing. In some embodiments, the excess gasoil can be further broken down into lighter hydrocarbons via catalytic cracking, which may occur in HCU 116. Coker subsystem 114 may be similar to ADU 110 in that it separates an input feed (e.g., residual oil) into various distillates using heat. As disclosed herein, coke may refer to any raw petroleum coke (e.g., green coke) produced in a coker (e.g., a delayed coker, a non-delayed coker, etc.). The coke may include any combination of components including carbon, hydrogen, nitrogen, sulfur, and ash. Additionally, the coke may include any combination of metals, including aluminum, boron, calcium, chromium, cobalt, iron, manganese, magnesium, molybdenum, nickel, potassium, silicon, sodium, titanium, and vanadium. In a general embodiment, the coke is mostly carbon byproducts from the heavy distillates produced in ADU 110.

HCU 116 may be configured to convert low-value feedstock (e.g., vacuum gasoils, heavy gasoil, etc.) into a variety of higher-value products (e.g., diesel, jet fuel, naphtha, etc.). In some embodiments, HCU 116 includes several stages for converting the feedstock, such as a treating stage (e.g., hydrotreating stage, hydrotreating reactor stage, etc.) and a hydrocracking stage. Of course, any number of stages can be included in various embodiments and the processes performed therein can be contemplated in series or in parallel, depending on the arrangement of the reactor stages. A treating stage in HCU 116 may remove organic sulfur and/or organic nitrogen from the feed to reduce the potential poisoning of downstream catalysts, which may be converted to ammonia and hydrogen sulfide. The feed may then be processes in a series of liquid/vapor separation vessels. A hydrocracking stage may then break down the longer-chain hydrocarbon molecules of the treated feed into shorter molecules, creating lighter hydrocarbon products. A more detailed description of the reactor stages within HCU 116 is provided with reference to FIG. 3.

In some embodiments, HCU 116 uses a metal catalyst (e.g., zeolite, etc.) combined with hydrogen to break up longer hydrocarbon chains for heavy crude oil fractions. This may produce different results than hydrocarbon cracking via catalytic cracking (e.g., within a fluid catalytic cracking unit, etc.). In such embodiments, an acidic catalyst may be used to reject carbon from the feed to break up the longer hydrocarbon chains. When cracking the heaviest of hydrocarbon products (e.g., heavy vacuum gas oil, vacuum distillation residue, etc.) using catalytic cracking, potential problems—resulting from coke deposits on the catalyst—inside of catalytic cracking units can occur. As such, the hydrocracking processes performed by HCU 116 can be configured to processes a wider array of feedstock, such as the heavy vacuum gas oil and vacuum distillation residue, the may not otherwise be cracked by typical catalytic cracking methods. Systems and methods for hydrocracking and/or hydrotreating are described in greater detail below with reference to FIG. 2.

In some embodiments, the hydrocracking process of HCU 116 cracks the high-boiling, high molecular weight hydrocarbons into lower-boiling, lower molecular weight olefinic and aromatic hydrocarbons and hydrogenates them. Any sulfur and nitrogen present in the hydrocracking feedstock may also be hydrogenated and form gaseous hydrogen sulfide (H2S) and ammonia (NH3) which can be subsequently removed. In some embodiments, this results in the hydrocracking products essentially free of sulfur and nitrogen impurities and are consisting mostly of paraffinic hydrocarbons.

Additionally, hydrocracking may produce one or more products that differ from products using catalytic cracking processes. In some embodiments, catalytic cracking can result in breaking the heavy fractions of the incoming feed into paraffins, iso-paraffins, aromatics, naphthenes, and olefins, with a particular focus on producing high-octane gasoline. Hydrocracking processing may, in contrast, emphasize a greater output of diesel fuel production and/or liquid yield, rather than gas (e.g., high-octane gasoline, etc.) and coke. In some embodiments, the differences between hydrocracking and hydrotreating include time which the feedstock remains at reaction temperature. As such, the lower limit of hydrocracking conditions may overlap with the upper limits of hydrotreating. Where the reaction conditions overlap, feedstock to be hydrocracked may generally be exposed to the reactor temperature for longer periods.

As discussed above, HCU 116 can receive several different types of feed and the feed into HCU 116 is not limited to the embodiments described herein. For example, HCU 116 can also include atmospheric gasoil (AGO) from ADU 110, cycle oil from a fluid catalytic cracking unit, vacuum gasoil from VDU 112, heavy gasoil from coker subsystem 114, other heavy hydrocarbons, and any combination thereof.

Hydrocracking Unit

Figure 2:
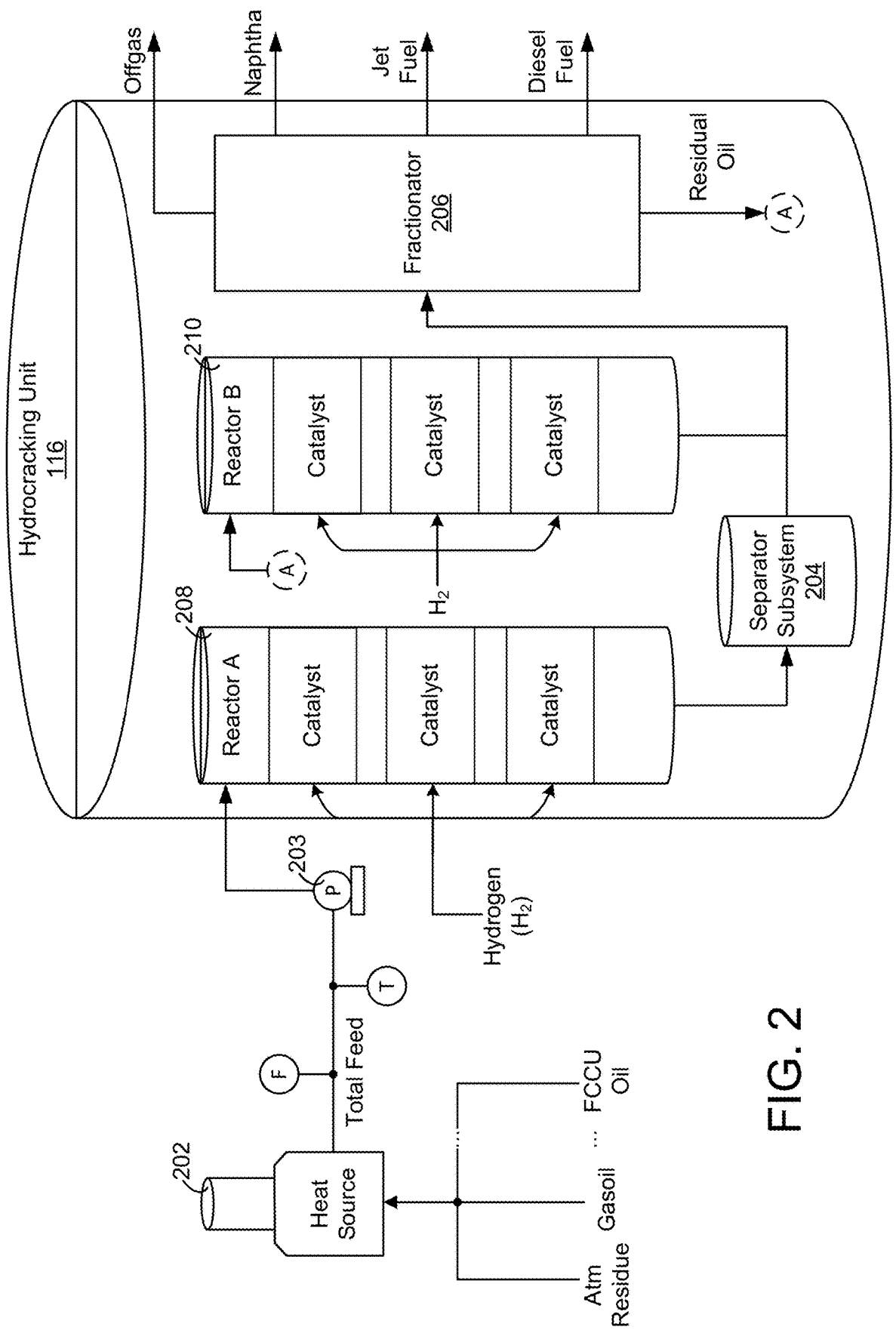
FIG. 2 is a diagram of a hydrocracking unit which can be implemented in the petroleum refinery system of FIG. 1, according to some embodiments.

Referring now to FIG. 2, a detailed block diagram of HCU 116 is shown, according to some embodiments. In the embodiment shown in FIG. 2, HCU 116 is shown to include several processes that relate to the overall production of light hydrocarbons using hydrogen, a catalyst, and a feed. However, it is contemplated that one or more of these processes can be performed outside of HCU 116 (e.g., by other components of system 100) in other embodiments. For example, the fractionation processes performed by fractionator 206 may be performed in a unit separate from HCU 116. HCU 116 is shown to include reactor separator subsystem 204, fractionator 206, reactor 208 and reactor 210.

HCU 116 is shown in FIG. 2 as a two stage hydrocracker configuration. This configuration may use two reactors (i.e. reactor 208 and reactor 210) and recycle the residual hydrocarbon oil from the bottom of fractionator 206 back into reactor 210 for further cracking. In some embodiments, the first stage reactor feed is virtually free of some or all of organic sulfur, organic nitrogen ammonia, hydrogen sulfide, or any combination thereof. This allows reactor 210 to use a higher performance catalyst (e.g., palladium catalyst, platinum catalyst, other noble metal catalysts, etc.) that otherwise would may be desired when used with sulfuric or nitrogen compounds.

It should be noted that HCU 116 being implemented as a two-stage hydrocracker as shown in FIG. 2 is only an exemplary embodiment, and other configurations can be considered as well. For example, HCU 116 may alternatively be configured as a single stage once-through hydrocracker, which utilizes only a single reactor and any uncracked residual oil from the bottom of fractionator 206 is not recycled for further cracking. In another example, HCU 116 is configured to be a single stage hydrocracker with recycling capabilities. In such an example, the uncracked residual hydrocarbon oil from the bottom of reaction product fractionation tower is recycled back into the single reactor for further cracking. For embodiments in which HCU 116 is implemented using a single reactor, the feedstock may need to be hydrotreated first to remove some or all of organic sulfur, organic nitrogen ammonia, hydrogen sulfide, or any combination thereof, or the catalyst used in the reactor would need to be capable both of hydrotreating and hydrocracking processes.

HCU 116 may receive a feedstock from several different units and processes upstream of system 100, which can include atmospheric gas oil from atmospheric crude oil distillation units, vacuum gas oil from VDU 112, coking gas oil from coker subsystem 114 (e.g., coker units within coker subsystem 114, etc.), slurry oil, or any combination thereof. In a general embodiment, the total feed entering HCU 116 may be referred to herein as gas oil, gas oil feed, and/or total feed.

The feed may be initially heated by heat source 202 and then pumped into reactor 208 via pump 203 (e.g., or vice versa, etc.). This feed may be mixed with streams of high-pressure hydrogen and enter the first stage reactor (i.e., reactor 208). Inside of reactor 208, several beds of catalysts are placed that, when exposed to the hydrogen and feed, hydrogenates the feed. Upon leaving the reactor 208, the feed may be provided to separator subsystem 204.

Some or all parts of the stream prior to heat source 202 and directly into HCU 116 via pump 203 may be considered the feed entering HCU 116. In some embodiments, a control device (e.g., actuator and valve assembly, etc.) may be implemented within system 100 to adjust the feed rate entering into HCU 116. This can include adjusting the actual rate of volume entering into HCU 116, adjusting the amount of each amount component entering into the feed that enters into HCU 116, or a combination thereof.

While the systems and methods described herein generally refer to reactor severity being the MV adjusted to improve and/or optimize the CV, the input feed rate to HCU 116 may also be considered. Both the input feed rate and the reactor severity, either alone or in combination, can affect the production of the output oil products and/or the quality of the output oil products.

Separator subsystem 204 may be configured to inject the feed with wash water (not shown), partially condense the feed in a water-cooled condenser and route the feed into a high-pressure vapor-liquid separator for separation into three phases (e.g., hydrogen-rich gas, hydrocarbon liquid and water). This may be done as sulfur and nitrogen compounds in the feed are converted into gaseous hydrogen sulfide and ammonia by the hydrogenation that takes place in the first stage reactor. Additionally, the wash water may be added to dissolve some of the hydrogen sulfide and ammonia gases present in the first stage reaction product stream.

The resulting aqueous solution of "sour water" (e.g., ammonium hydrosulfide (NH4HS)) may be routed to a sour water stripper (not shown) wherein the hydrogen sulfide is removed from the sour water and that hydrogen sulfide is subsequently converted to an end product of elemental sulfur.

Still referring to separator subsystem 204, the hydrogen-rich gas from the high-pressure separator may be routed through a scrubber where it is contacted with a solution to absorb and remove residual hydrogen sulfide in the gas. The rich solution (e.g., containing the absorbed hydrogen sulfide) may then be routed to a central gas treating unit elsewhere in the system (e.g., elsewhere in the refinery, etc.). The hydrocarbon liquid phase from the high-pressure separator may flow through a pressure letdown (e.g., pressure reduction) valve and into a low-pressure separator. The reduction in pressure can partially vaporize the liquid. The resulting vapor (i.e., offgas) can be routed to a central gas treating unit elsewhere in the system. Finally, the hydrocracked end products of the hydrocarbon liquid phase from the low-pressure separator can be heated again in a separate heater (not shown) and fed into fractionator 206.

Fractionator 206 may act as a distillation tower that separates cracked hydrocarbon streams into several different lighter hydrocarbon products, such as naphtha, jet fuel, and diesel oil. As HCU 116 is shown as a two-stage hydrocracker, some or all feed that is not cracked (e.g., feed that includes unconverted hydrocarbons from reactor 208) may be mixed with high pressure hydrogen (again) and recycled as feed into reactor 208. The outgoing feed from reactor 210 may feed back into fractionator 206.

Figure 3:
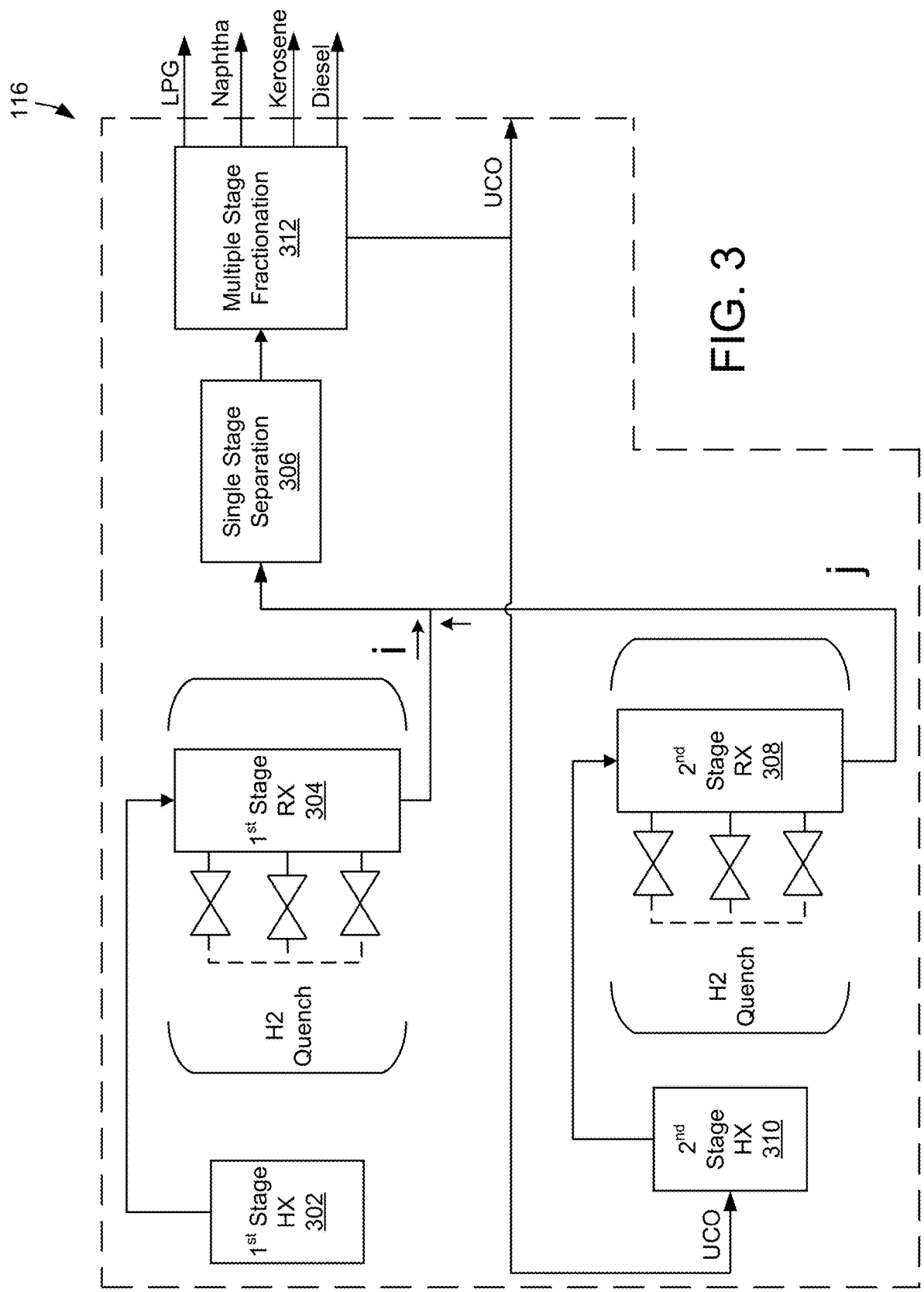
FIG. 3 is a block diagram of hydrocracker reactor stages which can be implemented in the hydrocracking unit of FIG. 2, according to some embodiments.

Referring now to FIG. 3, a block diagram illustrating an arrangement of the first stage(s) and second stage(s) of HCU 116 is shown, according to some embodiments. HCU 116 may include any number of stages which may be arranged in series, in parallel, or in any combination thereof. Each stage of HCU 116 may include hydrotreating, hydrocracking, or a combination of both. In the embodiment shown in FIG. 3, HCU 116 is shown to include a first hydrotreating sub-stage 302, a first hydrocracking sub-stage 304, a second hydrotreating sub-stage 310, a second hydrocracking sub-stage 308, a single stage separation process 306, and a multiple stage fractionation process 312.

In some embodiments, first hydrotreating sub-stage 302 removes organic sulfur and/or organic nitrogen from the incoming feed. The processed feed can then be provided to first hydrocracking sub-stage 304, whereupon the large hydro-carbon molecules in the feed are broken down into shorter molecules in the presence of the hydrogen and catalyst. In some embodiments, first hydrotreating sub-stage 302 and first hydrocracking sub-stage 304 may be part of a single process. In various embodiments, one or more instances of first hydrocracking sub-stage 304 be present, as denoted by the subscript "i" and the brackets surrounding first hydrocracking sub-stage 304. The one or more instances of first hydrocracking sub-stage 304 may be arranged in series with each other, in parallel with each other, or in any combination thereof. In some embodiments, first hydrotreating sub-stage 302 may also be duplicated one or more times.

After the feed has been hydrogenated within first hydrocracking sub-stage 304, the feed is provided to single-stage separation process 306, where the feed is separated into several different feed sections based on the phase of the feed: hydrogen-rich gas, hydrocarbon liquid and water. Finally, the hydrocarbon liquid is provided to multiple stage fractionation process 312. In some embodiments, multiple stage fractionation process 312 includes some or all of the processes performed by fractionator 206 described above with reference to FIG. 2. The now-processed and hydrotreated feed is cracked into smaller hydrocarbon chains to produce several different fractions, including LPG, naphtha, kerosene, and diesel.

In some embodiments, some of the feed that is not converted into fractions (i.e., unconverted cycle oil (UCO)) is routed back to a reactor (e.g., second hydrotreating sub-stage 310) for further processing. This may be performed in a hydrocracking unit equipped with multiple rectors (e.g., two-stage hydrocracker) that allows for further refining/processing or UCO. For example, some or all of the UCO from multiple stage fractionation process 312 can be provided to second hydrocracking sub-stage 310, whereupon the large hydro-carbon molecules in the feed are broken down into shorter molecules in the presence of the hydrogen and catalyst. In some embodiments, second hydrotreating sub-stage 310 and second hydrocracking sub-stage 308 may be part of a single process. In various embodiments, one or more instances of second hydrocracking sub-stage 308 be present, as denoted by the subscript "j" and the brackets surrounding second hydrocracking sub-stage 308. The one or more instances of second hydrocracking sub-stage 308 may be arranged in series with each other, in parallel with each other, or in any combination thereof. In some embodiments, second hydrotreating sub-stage 310 may also be duplicated one or more times.

Figure 4:
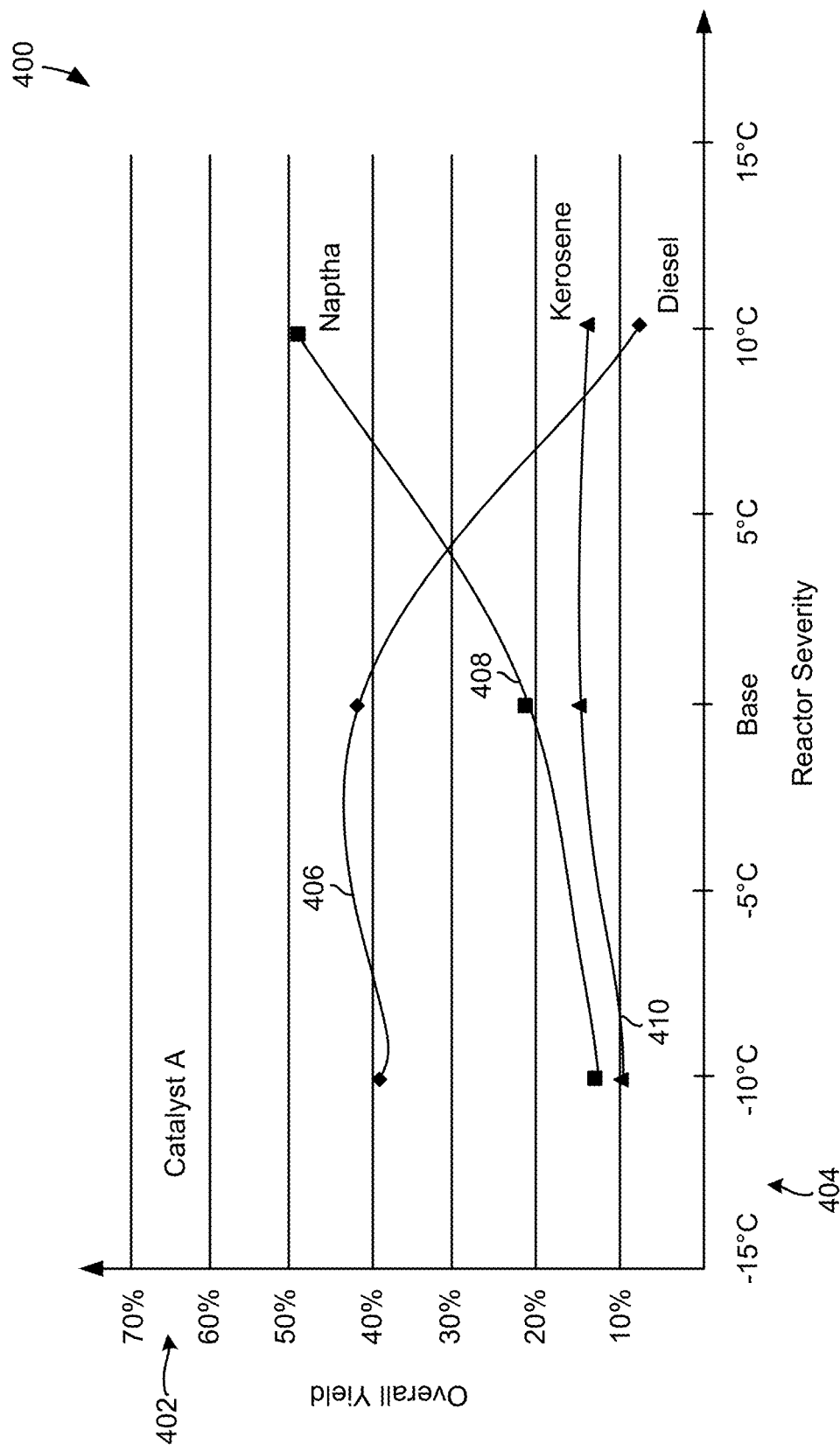
FIG. 4 is a graph of overall yield of a hydrocracking unit over a range of reactor severity, according to some embodiments.
Figure 5:
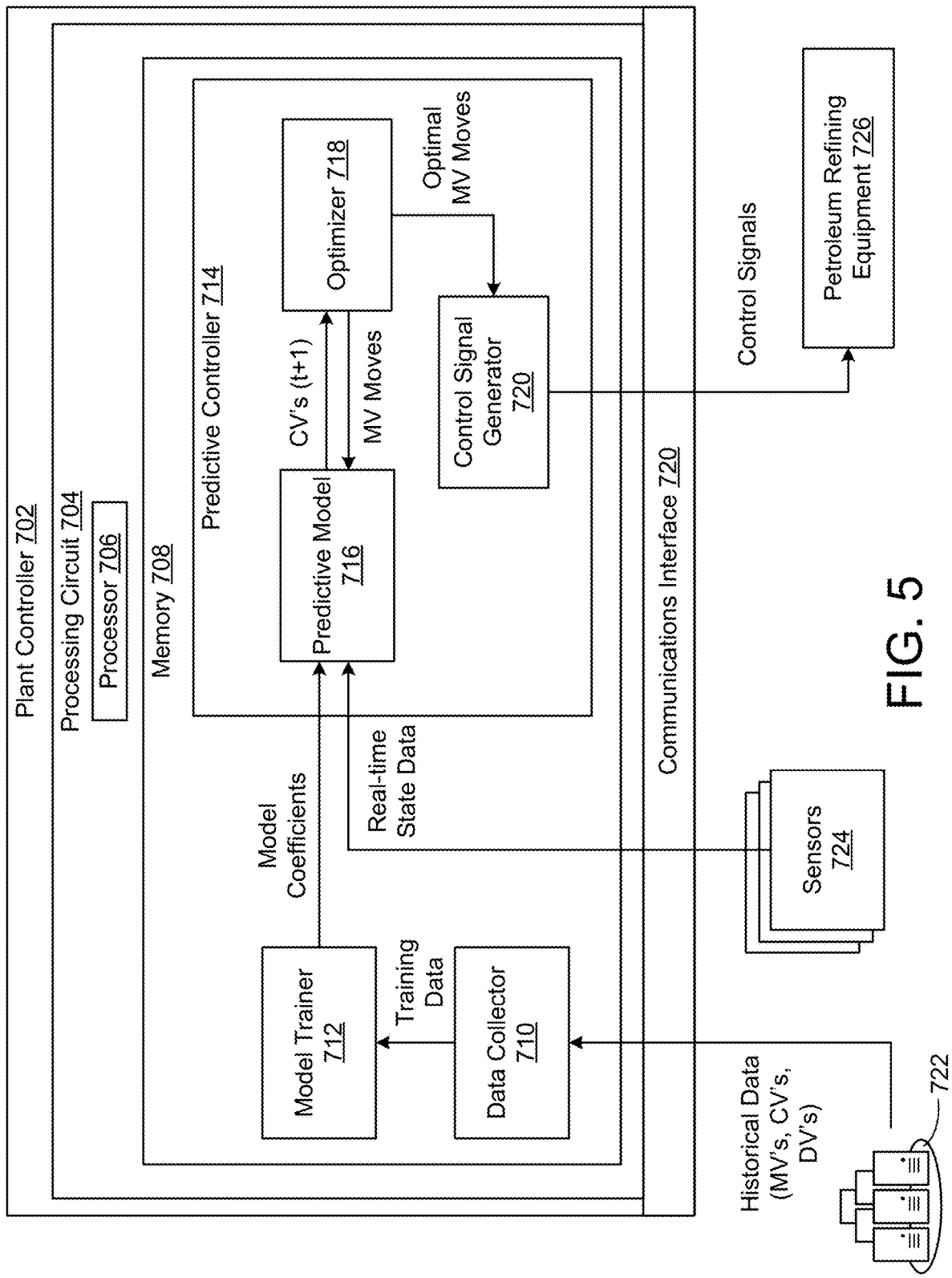
FIG. 5 is a block diagram of a plant controller with model predictive control functionality, which can be implemented in the petroleum refinery system of FIG. 1, according to some embodiments.
Figure 6:
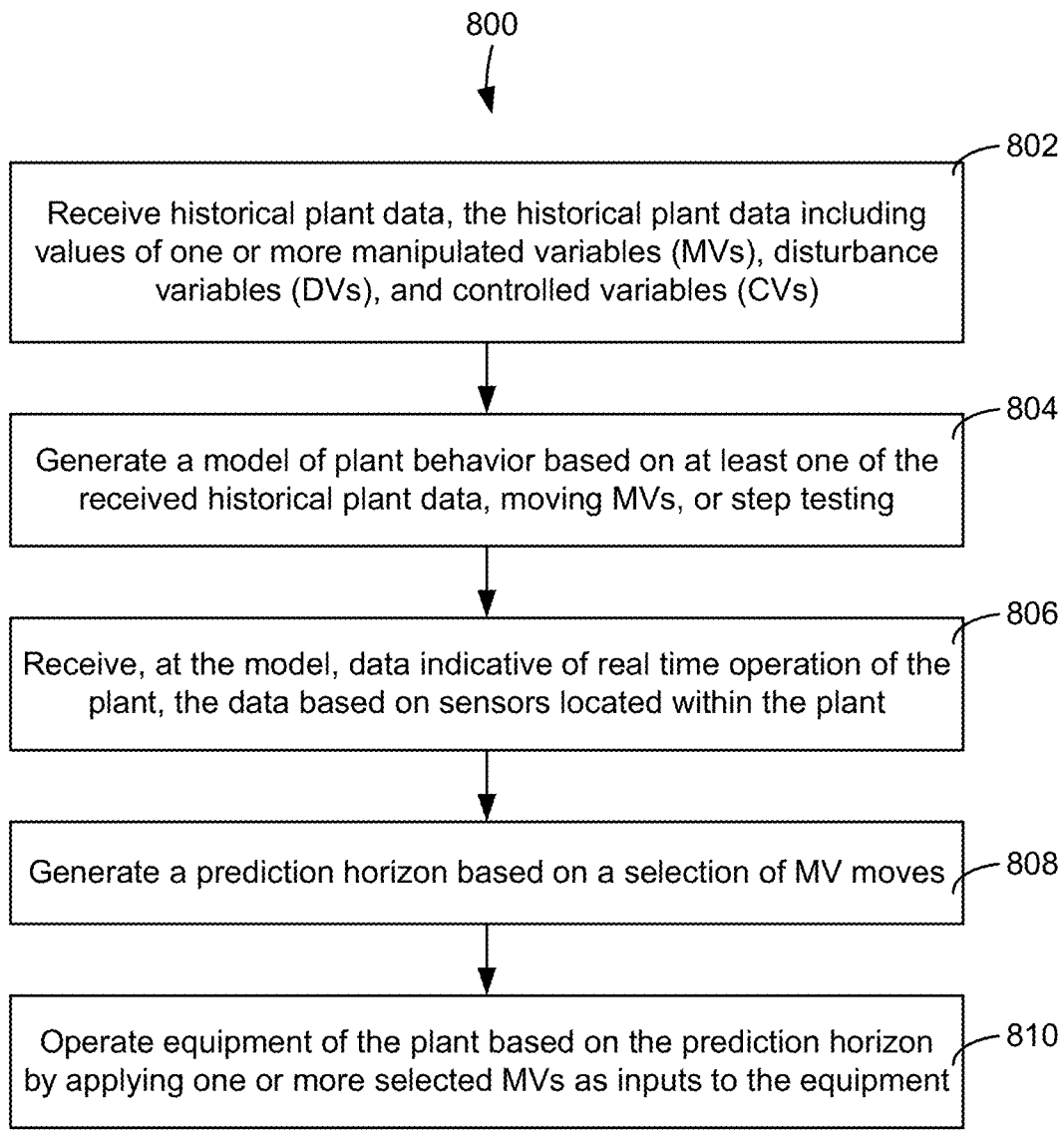
FIG. 6 is a flow diagram of a process for performing model predictive control of a plant, which can be performed by the controller of FIG. 5, according to some embodiments.

Referring now to FIGS. 4-6, graph 400 shows the overall yield of HCU 116 (Y-axis) vs. reactor severity inside of HCU 116 (X-axis), according to some embodiments. Graph 400 shows several of the output products created during the hydrotreating, hydrocracking, and fractionation processes in HCU 116 produce different yields when exposed to different reactor severities. For example, the overall yield of naphtha will be greater than kerosene and diesel when reactor 208 operates at a high reactor severity (e.g., +25° C., etc.).

As referred to herein, reactor severity may be a measure of the energy required to break the molecular bonds in the less-valuable heavy gasoil feedstock to produce the lighter, more valuable molecules. In some embodiments, reactor severity is proportional to reactor temperature or a function of reactor temperature (e.g., positively correlated with reactor temperature). The reactor severity can be controlled or adjusted using any type of heating device (e.g., a heat exchanger, a fuel burner, a resistive heater, an exothermic chemical reaction, etc.) that affects the temperature of input oil feeds entering into the HU. The reactor severity can also be controlled or adjusted by modulating the amount of hydrogen introduced into HCU 116 (i.e., the "H2 Quench" shown in FIG. 3). For example, increasing the amount of hydrogen introduced into HCU 116 may quench the reaction within HCU 116 and reduce temperature and reactor severity, whereas decreasing the amount of hydrogen introduced into HCU 116 may result in increased temperature and reactor severity. The flow of hydrogen into HCU 116 can be controlled by operating actuators or electronic valves located along hydrogen inlet line feeding into HCU 116. In various embodiments, reactor severity can be measured or quantified at any location within or proximate to HCU 116. For example, the reactor severity can be or include reactor temperature, reactor outlet temperature, riser temperature, and pre-heat temperature, exothermic heat from the catalyst reaction, or any combination thereof.

In some embodiments, reactor severity includes one or more bed temperatures of the catalyst beds located within the reactor. For example, reactor severity, as referred to herein, can include:

$$WABT = \sum (x_i(T_{IN,i} + 2/3[\Delta T_{OUT,i}]))$$

Where WABT is the weighted average bed temperature, $x_i$ is a fraction of catalyst in a given bed (i) or reactor, $T_{IN}$ is the inlet temperature to the given bed (i) or reactor, and $T_{OUT}$ is the outlet temperature to the given bed (i) or reactor.

For a given amount or rate of input oil feed into HCU 116, the reactor severity can be controlled to adjust the yield, a product quality of one or more of the output products, or a combination thereof of one or more of the output products, or drive the yield and/or the product quality of the one or more output products to desired values (e.g., target values, setpoints, etc.). As an example, if the reactor severity is too high, a greater amount of naphtha may be produced than is desired, resulting in less diesel/jet fuel being produced from the feed. Similarly, too little naphtha can be produced than desired if the reactor severity in the reactor (or multiple reactors) is too low. Overall, in some embodiments, the relationship between the varying product yields of the hydrocracking unit and the reactor severity of the one or more reactors is non-linear.

As mentioned above, product quality can be improved and/or optimized (e.g., either exclusively or in combination with optimizing a valuable product yield, etc.). This may be performed by implementing the product quality as a CV, and using one or more control techniques (e.g., predictive control, model predictive control, neural network-based control, etc.) to optimize the CV (e.g., optimize the total amount of the product quality in one or more output streams, optimize the total value of the one or more output streams based on the product quality, etc.). Other properties that could be controlled using this process include LPG distillation curve (Initial boiling point through to End Point), LPG Reed Vapor Pressure, Naphtha distillation curve (Initial boiling point through to End Point), Naphtha octane, Diesel distillation curve (Initial boiling point through to End Point), Diesel Flash Point, Diesel Freeze Point, Diesel Cloud Point, Diesel Cetane Number, and UCO color.

Furthermore, the non-linearity can be affected by several factors within HCU 116, such as the lifespan of the catalyst, the feed rate into HCU 116 or into specific reactors inside of HCU 116, the catalyst composition, and the composition of the feed (e.g., mostly slurry oil, no atmospheric residue, mostly gas oil, etc.). As described in detail below, one or more processing devices (e.g., one or more controllers, processors, neural networks, machine learning modules, a combination thereof, etc.) can be configured to implement a control technique (e.g., optimize an objective function) to produce the desired amount of hydrocarbon products.

Hydrocracking Unit Control
Model Predictive Control

Referring now to FIG. 5, a detailed block diagram of plant controller 702 for performing control of system 100 using predictive control (e.g., Model Predictive Control (MPC), etc.) is shown, according to some embodiments. System 700 includes a plant controller 702, database 722, sensors 724, and petroleum refining equipment 726. In some embodiments, plant controller 702 uses predictive modeling to make control decisions, as shown in FIG. 5. In other embodiments, plant controller 702 uses one or more neural networks (e.g., a predictor neural network, a controller neural network, etc.) to make control decisions for some or all parts of system 100, which is described in greater detail below. As shown in FIG. 5, plant controller 702 receives historical data from database 722 and input data from sensors 724 and uses model predictive control to generate control signals for petroleum refining equipment 726. Plant controller 702 may be configured to control an oil refinery process as a whole (e.g., control system 100) or a portion or subsystem of system 100, such as system 200.

In some embodiments, plant controller 702 is configured to improve and/or optimize the most valuable total yield of HCU 116, optimize the total volume gain of HCU 116 (e.g., the most amount of product being products regardless of the value of each respective fraction, etc.), or a combination thereof, using a model-based feedback control technique such as MPC or other types of feedback control techniques (e.g., proportional control, proportional-integral (PI) control, proportional-integral-derivative (PID) control, etc.). For example, plant controller 702 may generate the most valuable amount of total product yield output by HCU 116, by operating reactor 208 at a reactor severity such that the amount of more valuable hydrocarbon products (e.g., diesel fuel, etc.) is increased and the amount of less valuable products (e.g., naphtha, etc.) are decreased. In other embodiments, the feed into HCU 116 can be controlled to vary the rate of incoming feed into HCU 116 to adjust the total yield.

In some embodiments, plant controller 702 is configured to improve and/or optimize the most valuable total product quality in a single output product of HCU 116. For example, plant controller 702 may generate the most valuable amount of total product quality output by HCU 116, by operating reactor 208 at a reactor severity such that the amount of more valuable hydrocarbon products (e.g., diesel fuel, etc.) is increased and the amount of less valuable products (e.g., naphtha, etc.) are decreased. In other embodiments, plant controller 702 may operate a feed control assembly that adjusts the rate of feed into HCU 116.

In some embodiments, plant controller 702 is configured to improve and/or optimize the most valuable total product quality of several or all of the output products of HCU 116. For example, when multiple different output oil products of HCU 116 are produced, one or more output oil products could have a cetane number (CN) indicating the combustion speed of the diesel compounds and the compression required for ignition of the diesel compounds. The hydrocracking processes within HCU 116 can produce distillates with different CN's and/or different rates of CN's. From this, plant controller 702 may be configured to optimize the most amount of CN produced by all of the output products. Of course, only a single distillate (e.g., diesel) could be improved and/or optimized for product quality (e.g., CN, etc.) as well.

In some embodiments, plant controller 702 is configured to improve and/or optimize a combination of the most valuable total yield of HCU 116 and the most valuable total product quality of HCU 116. In some embodiments, any and all combinations of adjusting reactor severity and/or input feed rate, to control total product yield, most valuable product yield, and product quality, can be considered.

Plant controller 702 is shown to include communications interface 720 and processing circuit 704 including processor 706 and memory 708. Processing circuit 704 can be communicably connected to communications interface 720 such that processing circuit 704 and the various components thereof can send and receive data via communications interface 720. Processor 706 can be implemented as a general purpose processor, an application specific integrated circuit (ASIC), one or more field programmable gate arrays (FPGAs), a group of processing components, or other suitable electronic processing components.

Communications interface 720 can be or include wired or wireless communications interfaces (e.g., jacks, antennas, transmitters, receivers, transceivers, wire terminals, etc.) for conducting data communications. In various embodiments, communications via communications interface 720 can be direct (e.g., local wired or wireless communications) or via a communications network (e.g., a WAN, the Internet, a cellular network, etc.). For example, communications interface can include an Ethernet card and port for sending and receiving data via an Ethernet-based communications link or network. In another example, communications interface 720 can include a Wi-Fi transceiver for communicating via a wireless communications network. In another example, communications interface 720 can include cellular or mobile phone communications transceivers.

Memory 708 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. Memory 708 can be or include volatile memory or non-volatile memory. Memory 708 can include database components, object code components, script components, or any other type of information structure for supporting the various activities and information structures described in the present disclosure. According to an example embodiment, memory 708 is communicably connected to processor 706 via processing circuit 704 and includes computer code for executing (e.g., by processing circuit 704 and/or processor 706) one or more processes described herein.

In some embodiments, plant controller 702 is implemented within a single computer (e.g., one server, one housing, etc.). In various other embodiments plant controller 702 can be distributed across multiple servers or computers (e.g., that can exist in distributed locations). Further, while FIG. 5 shows database 722 outside of plant controller 702, in some embodiments database 722 can be hosted within plant controller 702 (e.g., within memory 708). Memory 708 is shown to include data collector 710, model trainer 712, and predictive controller 714.

Data collector 710 may be configured to collect or receive one or more data sets for controlling some or all components of systems 100-600. Data collector 710 may receive manipulated variables (MV's), controlled variables (CV's), and disturbance variables (DV's). MV's may be variables that can be adjusted to keep CV's at their intended set points. MV's may include control signals that are provided as inputs to equipment, setpoints that are provided as inputs to controllers, or other variables that can be directly manipulated (i.e., adjusted, set, modulated, etc.) by plant controller 702. Examples of MV's for system 100 can include reactor severity, reactor WABT's, feed rate, or any combination thereof.

CV's may quantify the performance or quality of one or more variables affected by the controlled system or process. Examples of CV's may include measured values (e.g., temperature, pressure, energy consumption, etc.), calculated values (e.g., efficiency, coefficient of performance (COP), etc.), or any other values that characterize the performance or state of a controllable system or process. Some CV's may be quantities that are not capable of being directly manipulated by plant controller 702 (e.g., highest value volume gain, etc.), but rather can be affected by manipulating corresponding MV's that affect the CV's (e.g., increasing the reactor severity of HCU 116, etc.). Examples of CV's can include organic sulfur and/or nitrogen concentrations in the reactor effluent (e.g., feed being processed by HCU 116, etc.), naphtha product distillation boiling points, naphtha product sulfur concentration, naphtha product flash point, diesel product cloud point, diesel product distillation boiling points, diesel product flash point, diesel product sulfur concentration, UCO distillation boiling points, product stream flows, conversion ratios, conversion levels, hydraulic constraints, any product stream or intermediate flow, or any combination thereof. CVs may include the volumes, flow rates, mass, or other variables that quantify the amount of the various output oil products produced by the HU.

DV's or "load variables" may represent disturbances that can cause CV's to deviate from their respective set points. Examples of DV's include measurable or unmeasurable disturbances to the system such as outside air temperature, outside air humidity, uncontrolled sources of heat transfer, etc. DV's are typically not controllable, but may be measurable or unmeasurable depending on the type of disturbance. Any of the variables described as MV's may be DV's in some embodiments in which the system cannot control those variables. Similarly, any of the variables described as DV's may be MV's in some embodiments in which the system can control those variables. Data collector 710 is configured to provide the training data to model trainer 712. Examples of DV's can include feed rate, feed composition, hydrogen flow rate, reactor pressure, catalyst age, separation and/or fractionation section temperatures and pressures, reactor temperature differentials, intermediate flow rates, upstream unit process operating conditions, or any combination thereof.

Data collector 710 may be configured to separate the collected data into one or more episodes. In some embodiments, the historical data represents a variety of different control situations over different periods of time. The full set of historical data may represent the non-linear behavior of the system over a relatively long time period (e.g., days, months, years, etc.). Each sample of the historical data may include values for all of the MV's, CV's DV's, and potentially other variables at an instantaneous time or over a time step having a predetermined duration (e.g., 1 second, 1 minute, 15 minutes, 1 hour, etc.). Each sample of the historical data may include a time stamp indicating a time at which the sample was collected and defines a corresponding "state" of the system at the time the sample was collected. In some embodiments, the samples of historical data are separated into "episodes" which include the historical data for a window of time. These episodes may be predetermined prior to being received at plant controller 702 (e.g., the start times, end times, and/or duration of each episode may be predefined) or can be automatically determined within plant controller 702 based on attributes of the historical data and/or an operating condition of system 100 at a time when the historical data were collected.

In some embodiments, data collector 710 groups the time steps into "episodes" for modeling purposes. Each episode may encompass a period of time large enough to include multiple samples of the historical data (e.g., multiple time steps, etc.), but may encompass a period of time small enough such that the behavior of the system is substantially linear within a given episode. In other words, each episode may include a portion of the historical data that, when viewed in isolation, indicates substantially linear system behavior within the episode. In an exemplary embodiment, plant controller 702 is used to provide control instructions to system 100, which operates in a non-linear environment as indicated by the received historical data, when modeled holistically. However, the relationship between the MV's and CV's and/or the DV's and CV's can be modeled as a set of localized linear relationships when broken up into multiple episodes.

In some embodiments, data collector 710 is configured to generate representative values of the MV's, CV's, and DV's for each of the episodes of the historical data. In some embodiments, the representative values may be average, median, mean, or other type of aggregated values of the MV's, DV's, and CV's over the corresponding episode. For example, the representative value of a particular MV over the episode may be the average of all of the values of that particular MV indicated by the samples of the historical data within the episode.

In some embodiments, the historical data include not only multiple samples of the variables that affect the plant equipment (e.g., DV's, MV's, etc.) but also multiple samples of the variables that are affected by operating the plant equipment (e.g., CV's), which are the indicators of the final control product. As control systems for plants can be non-linear, the historical data is separated into episodes that allow the data to be modeled in a linear fashion. The relationships between the MV's and the CV's maintain a linear or generally linear relationship within each episode. In some embodiments, the samples within each episode are then averaged to create a single representative value of each of the variables for the episode, which are then used to train a neural network.

Model trainer 712 may be configured to generate a model of the plant (e.g., system 100) based on the historical data. In some embodiments, the training data also includes data relating to moving MV's and/or step testing. Model trainer 712 may be configured to determine one or more coefficients of a model that represents the dynamic and sometimes nonlinear behavior of the plant. For embodiments in which plant controller 702 performs model predictive control, the coefficients of the model may include values of one or more matrices (e.g., elements of the matrices) that characterize the dynamic behavior of the plant. Model trainer 712 may be configured to provide the model coefficients to predictive controller 714, which is shown to include predictive model 716, optimizer 718, and control signal generator 719.

Predictive model 716 may receive the model coefficients from model trainer 712, resulting in predictive model 716 becoming a trained or identified model. Predictive model 716 may be configured to predict values of the CV's at the next time step t+1 as a function of the real-time state data at time step t as well as a set of potential values for the MV's at time step t. Specifically, the predictive model can relate the reactor severity MV to the amounts of the various output products CVs. The set of values for the MV's may be treated as decision variables and adjusted by optimizer 718 while performing an optimization process, described in greater detail below. During operation, predictive controller 714 may provide real-time state data as an input to predictive model 716 and use predictive model 716 to generate a trajectory of predicted values of the CV's over a time horizon that extends from time t to a future time step t+T (i.e., t, t+T).

Optimizer 718 may be configured to perform an optimization process using predictive model 716. In some embodiments, the optimization process includes optimizing an objective function or cost function to determine optimal values of the MV's or optimal MV moves. In some embodiments, the objective function may consider both an established price of each hydrocarbon product and the flow rate of each hydrocarbon product, as well as the cost of feed and the flow rate of the feed. An exemplary objective function is shown below:

$$Obj.\ Function\left(\frac{flow}{time}\right) = [\text{unconverted product } (UCO) * UCO \text{ price} +$$
$$\text{diesel flow} * \text{diesel price} + \text{naphtha flow} * \text{naphtha price} +$$
$$\text{kerosene flow} * \text{kerosene price} + LPG \text{ flow} * LPG \text{ price}] - [\text{flow rate} * \text{feed price}]$$

The prices can be used within the objective function can be updated while the model is running closed-loop and controlling the process. Changes in prices can cause the model to manipulate the operating conditions of HCU 116 to yield the most profitable product mix for that pricing environment. This can allow the same model to be used throughout different economic operating regimes without the need for separate modes (e.g., gasoline mode, diesel mode, etc.) or additional robustness testing. In some embodiments, the prices can be changed with little or no downtime.

In some embodiments, the objective function can be configured to maximize the total volume of one or more of the total hydrocarbon products rather than optimizing the maximum value of the one or more hydrocarbon products. For example, the objective function could include:

$$Obj.\ Function\left(\frac{vol}{time}\right) = [\text{unconverted product } (UCO) + \text{diesel flow} +$$
$$\text{naphtha flow} + \text{kerosene flow} + LPG \text{ flow}] - [\text{feed flow rate}]$$

without including the pricing of the one or more hydrocarbon products. In various embodiments, the pricing of the one or more hydrocarbon products can be included in the objective function for some hydrocarbon products and not others. In some embodiments, the objective function could be or include the sum of the output flow rates divided by the input flow rate, such that the objective function can quantify the volume gain (e.g., the ratio of output volume to input volume).

In some embodiments, the objective function can be configured to maximize the total product quality of one or more of the output oil products. In some embodiments, a product quality considered valuable is the cetane number of diesel fuel. As such, the objective function could apply an upgraded price for the price of diesel fuel based on the cetane number found in the fuel. In some embodiment, the CN of the diesel can be tested via a sample of the diesel external from system 100 (e.g., within a lab, etc.) and provided back to plant controller 702 for processing. In some embodiments, system 100 includes measuring instruments capable of measuring the CN of the diesel stream (e.g., in real-time, at certain intervals, etc.) and providing the CN data back to plant controller 702.

Using the above example, the objective function could include:

$$\text{Obj. Function} \left(\frac{\text{flow}}{\text{time}}\right) = [\{\text{diesel flow}\} * \{\text{diesel price}\} +$$

$$\{\text{cetane upgrade value}\} * \{\text{cetane number in diesel stream} - \text{base cetane number}\}] +$$

$$\text{unconverted product } (UCO) * UCO \text{ price} + \text{naphtha flow} * \text{naphtha price} +$$

$$\text{kerosene flow} * \text{kerosene price} + LPG \text{ flow} * LPG \text{ price}] - [\text{flow rate} * \text{feed price}]$$

The above objective function provides an upgraded price for the product quality of CN, based on the difference between the actual CN in the diesel stream (e.g., the output oil product, etc.) and the base cetane number. "Cetane Upgrade Value" in the above equation may refer to a constant value that associates the CN quantity with an appropriate price upgrade when accounting for the price of the diesel stream.

In some embodiments, the objective function can include any number of weights in the objective function such that the various hydrocarbon products are weighted differently when attempting to maximize the objective function. The prices in the first embodiment of the objective function shown above act as weights on the flow rate terms. However, it is contemplated that different weights can be applied to the flow rate terms other than their prices. For example, if maximizing the volume of naphtha produced by HCU 116 is desired, while maximizing the volume of jet fuel is less desired, then the variable representing naphtha volume may be weighted higher than the variable representing jet fuel volume, regardless of the prices of the naphtha and jet fuel. In some embodiments, multiple weights may be applied to each of the flow rate terms and may combine to form an overall weight for each flow rate term such that the overall weight applied to a flow rate term is a combination (e.g., a sum or product) of a price-based weight and a price-independent weight. Of course, any number of weights and prices, either alone or in combination, can be used to prioritize certain hydrocarbon products over others.

In some embodiments, the objective function may include one or more terms that quantify the error between the current or predicted values of the CV's and target or setpoint values for the CV's. In some embodiments, the objective function may include one or more terms that quantify the amount of input resources (e.g., input oil feeds) consumed by system 100 or a cost of the input resources consumed. Optimizer 718 may be configured to iteratively adjust the values of the MV's and use predictive model 716 to predict the resulting values of the CV's that will result from each set of MV's. Optimizer 718 may continue adjusting the MV's while performing the optimization process until an optimal result is reached (e.g., minimum value of the objective function). Once the optimal result is reached, the values of the MV's that resulted in the optimal result may be designated as optimal values of the MV's or optimal MV moves. The objective function in this embodiment may be the same as or similar to any of the objective functions described with reference to FIG. 5.

These optimal MV moves may be provided to control signal generator 719, such that control signal generator 719 can provide control signals to petroleum refining equipment to satisfy the optimal MV moves. In some embodiments, only the first step of the control strategy (e.g., the modeled predictions of CV's over the time horizon determined by predictive model 716) is implemented. Then, process repeats itself, and the calculations are repeated starting from the new current state, yielding a new control scheme and new predicted state path for both the MV's and CV's.

Petroleum refining equipment 726 may be configured to receive control signals from plant controller 702 and affect the manipulated variables of the system 100. In some embodiments, petroleum refining equipment 726 includes a valving system to affect the flow of feed into HCU 116 and/or a valving system to affect the flow of hydrogen into HCU 116. In some embodiments, petroleum refining equipment 726 includes equipment capable of adjusting the reactor severity within HCU 116. Sensors 724 may be configured to provide measurements of environmental data to plant controller 702 as inputs for making control decisions. In some embodiments, the information from sensors 724 acts as CV's, MV's, DV's, TVs or any combination thereof for historical data or real-time data of system 100.

Referring now to FIG. 6 a flow diagram of a process 800 for performing model predictive control is shown, according some embodiments. Process 800 may be performed by any of the processing circuitry described herein, such as plant controller 702. In some embodiments, process 800 is at least partially performed by predictive controller 714 as described above with reference to FIG. 5.

Process 800 is shown to include receiving historical plant data, the historical plant data including values of one or more manipulated variables (MV's), disturbance variables (DV's), and controlled variables (CV's) (step 802). Data collector 710 may be configured to receive the historical plant data from database 722. In some embodiments, the data includes MV's, DV's, and/or CV's for one or more historical time periods (e.g., historical states) of the plant (e.g., operation of system 100). For example, at the time step t (e.g., Friday @ 10:15 AM, etc.) the historical data may indicate that the temperature of the feed entering reactor 208 after being pre-heated is 460° C. (MV), the feed prior to entering heat source 202 to be pre-heated is 400° C. (DV), the temperature within reactor 208 (i.e., the temperature relating to the reactor severity, etc.) is 535° C. (MV), and the intended volume gain of HCU 116 is 2,000 m³ (TV) to maximize the most valuable amount of total hydrocarbon products (CV)—the CV potentially being based on any number of factors, such as a ratio of the total amount of light hydrocarbons per the total incoming feed (e.g., 0.6, 0.7, etc.), the monetary value associated with each light hydrocarbon product, the production efficiency of each hydrocarbon product compared to one another, the production efficiency at a given reactor severity, or any combination thereof.

Other CV's, DV's, MV's, and TVs can also be considered. For example, the CV may also incorporate the price of the different lighter hydrocarbons being produced by HCU 116 as a factor of the optimization problem. In such embodiments, weights may be accorded to the different light hydrocarbon product yields such that those that have less monetary value are weighted lower than those with higher monetary value. In another example, the quality of the feed acts as a manipulated variable, and the plant has control over selectively mixing the different feed components to achieve a certain feed quality.

Process 800 is shown to include generating a model of plant behavior based on at least one of the received historical plant data, moving MV's, or step testing. In some embodiments, the model is generated by model trainer 712. The model can include a predictive model (e.g., a set of matrices used in MPC), multi-variable algorithms, cost functions, objective functions, optimization constraints, initial values of the model (e.g., initial values of states tracked by the model), and/or other criteria for determining a predictive model.

Process 800 is shown to include receiving, at the model, data indicative of real-time operation of the plant, the data based on sensors located within the plant (step 806) and generating a prediction horizon based on a selection of MV moves (step 808). The model coefficients can be provided to predictive model 716, wherein the predictive model is configured to generate CV predictions over a time horizon. The time horizon may be relatively short, as only the first move predicted throughout the time horizon may be implemented during model predictive control.

Process 800 is shown to include operating equipment of the plant based on the prediction horizon by applying one or more selected MV's as inputs to the equipment (step 810). Control signals may be provided to petroleum refining equipment 726 to satisfy optimal MV setpoints that, based on the predictions made by predictive model 716, will achieve the predicted CV's. In some embodiments of implementing process 800 as described above, the chosen MV moves may typically be those for which horizon provides optimal performance in terms of an objective function (e.g., as described below with reference to process 1200, etc.).

In some embodiments, one or more reactor severity control mechanisms (e.g., modules, components, etc.) are located proximate to HCU 116 or upstream/downstream of HCU 116 to adjust the reactor severity within reactor 208. For example, one reactor severity control mechanism that can adjust the reactor severity within HCU 116 at least in part can be a valving system that adjusts the flow of catalyst into riser 204. In some embodiments, another reactor severity control mechanism can include a valving system controlling the amount of feed entering HCU 116. In some embodiments, another reactor severity control mechanism is a heat source 202 that pre-heats the incoming feed. In some embodiments, another reactor severity control mechanism can include a valving system controlling the amount of hydrogen entering HCU 116. In some embodiments, another reactor severity control mechanism can be a mechanism for adjusting the amount of catalyst placed within reactors 208, 210 in HCU 116. The reactor severity control mechanisms may be part of petroleum refining equipment 726 described below, and may be configured to receive control signals from plant controller 702 to adjust one or more MV's of the plant (e.g., to increase the volume of valuable hydrocarbon products produced by HCU 116, etc.).

Offline Trained Predictor Neural Network and Controller Neural Network

Figure 7:
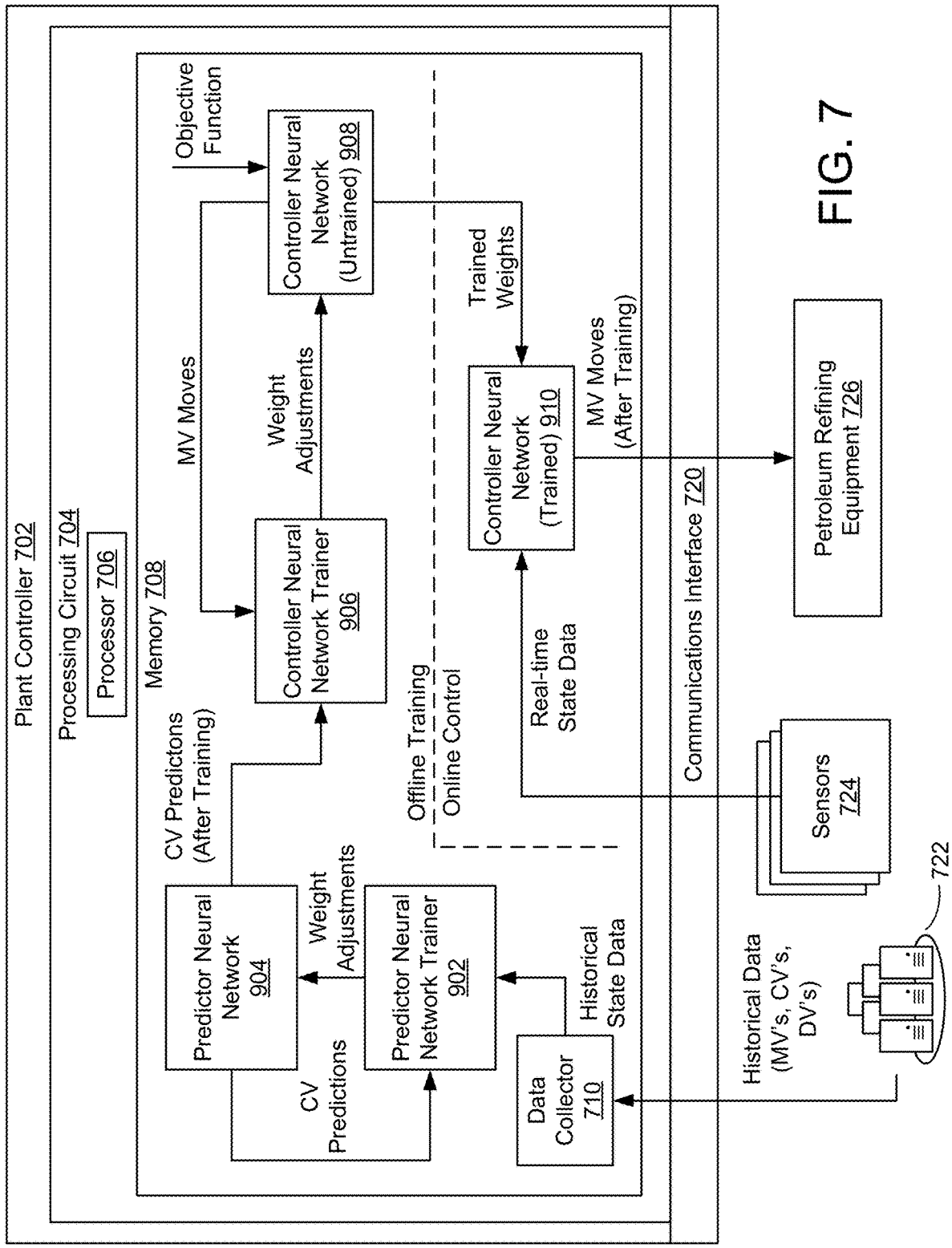
FIG. 7 is a block diagram of a plant controller using offline-trained neural networks to determine MV moves, which can be implemented in the petroleum refinery system of FIG. 1, according to some embodiments.

Referring now to FIG. 7, a block diagram of plant controller 702 is shown, according to some embodiments. In some embodiments, plant controller 702 as shown in FIG. 7 may be configured to perform control of the plant using one or more neural networks. In some embodiments, a first neural network (e.g., predictor neural network 904) is trained offline to make CV predictions. These CV predictions can be provided to a second neural network (e.g., controller neural network 908) for training. Once trained, the second neural network may provide MV moves that can be used to control petroleum refining equipment 726. In the embodiment shown in FIG. 7, memory 708 is shown to include data collector 710, predictor neural network trainer 902, predictor neural network 904, controller neural network trainer 906, controller neural network (untrained) 908, and controller neural network (trained) 910. Any components in FIG. 7 having the same reference numbers as components previously described (e.g., data collector 710) may operate in the same or similar manner in the embodiment shown in FIG. 7.

Predictor neural network trainer 902 may be configured to receive the historical data from data collector 710 and train predictor neural network 904 by adjusting the weights of predictor neural network 904. Predictor neural network trainer 902 may also be configured to receive the CV predictions of the predictor neural network 904 to facilitate training and determine how the weights need to be adjusted. For example, predictor neural network trainer 902 may adjust or tune the weights of predictor neural network 904 such that the CV predictions generated by predictor neural network 904 comply or align with the values of the CV's in the historical data. An example of a process which can be performed by predictor neural network trainer 902 to train predictor neural network 904 is described in greater detail with reference to FIG. 15.

Once trained, predictor neural network 904 may be configured to provide CV predictions as a function of a given state of the plant (e.g., a set of values of the CV's, MV's, DV's, etc.) which may be provided as an input to predictor neural network 904. In some embodiments, predictor neural network 904 is configured to predict the CV's of historical time steps using the set of historical data as an input to predictor neural network 904. In other embodiments, after training, the predictor neural network 904 is configured to predict the CV's for future time periods (e.g., future states of the plant). The CV predictions generated by predictor neural network 904 may be provided to controller neural network trainer 906 and used to train controller neural network (untrained) 908.

In some embodiments, predictor neural network trainer 902 is configured to determine an error between the predicted values of the CV's at historical time step t and actual values of the CV's at historical time step t in the historical training data. This may be performed by implementing a certain error threshold (e.g., 5% 20%, etc.) such that if the predicted CV is within that error threshold, the prediction is considered accurate, and if the predicted CV is outside of that error threshold, the prediction is considered inaccurate. Predictor neural network 904 may require a certain subset of CV predictions to be "accurate" prior to determining that the training of predictor neural network 904 is complete. Other methods for determining the error may be considered, such as determining if the answer is within a predetermined range of values or allowing supervised learning from a technician/ engineer.

In some embodiments, predictor neural network 904 is instructed to process a certain number of states, generate a certain number of accurate predictions, or a combination thereof. If this threshold has not been met predictor neural network 902 continues to train until efficient training inputs have been tested. Once this threshold is met, predictor neural network 904 may be considered trained.

In the above example, determining the error may be performed in a manner similar to the training of predictor neural network 904, but instead of adjusting the weights of predictor neural network 904 in response to the comparison of the output vector y and the desired output values vector y', an average error equal to the difference between the vectors y, y' is calculated over one or more time points and the average is displayed to a human user and/or is compared to a threshold. If the average difference is smaller than the threshold, predictor neural network 904 is considered ready for operation. Otherwise, one or more parameters of predictor neural network 904 may be adjusted, such as the weights between nodes of predictor neural network 904, number of layers, the selected inputs to predictor neural network 904 (e.g., specific controlled, manipulated and/or disturbance variables used), the size of the intermediary vectors h1, h2, h3, . . . hn and/or the duration T of the time period used to form the input vector x. The training of predictor neural network 904 may then be repeated MV's.

Instead of the training based on each time point on its own, in some embodiments, the training of predictor neural network 904 is performed on sequences of time points together. For each sequence of time points, t1, t2, . . . tn, the forming of the vectors and applying of predictor neural network 904 in order to receive the values of the controlled variables, are performed for the first time point of the sequence t1. Then, instead of immediately adjusting the weights of predictor neural network 904 according to a comparison to a desired output values vector y', an input vector for the second time point t2 is created using the outputs of the predictor instead of the stored values from database 722, for the values of the controlled variables at time t1. This process is repeated until predicted values are calculated for time tn. Then, the predicted values for times t1, t2, . . . tn are compared to the stored values using a given metric and the neural network is adjusted accordingly.

In some embodiments, rather than predicting explicit values of CV's, predictor neural network 904 is trained, using any suitable method known in the art, to produce a distribution over different possibilities. For example, predictor neural network 904 may output at time point t the mean and covariance of a Gaussian distribution which reflects estimated posterior probabilities of controlled variable values in time point t+1. This allows modeling uncertainty in the behavior of the plant, to optionally be taken into account by plant controller 702.

In some embodiments, an aggregate prediction error is determined during training of predictor neural network 904, which can be an error determination that takes into account several predictions made by predictor neural network 904. The aggregate prediction error could be an average of the errors resulting from each training input, an aggregate error, or any other metric. In some embodiments, the aggregate prediction error weights certain CV predictions over others based on user instruction. For example, it may be more important to accurately predict the most valuable volume gain for one or more hydrocarbon products (a CV in one embodiment) than the flow rate to reactor 208 (another CV in the embodiment) during training of predictor neural network 904. Other methods for comparing the aggregate prediction error to a threshold may be considered, such as determining if the error is within a predetermined range of value, determining if the error is off by a predetermined percentage or allowing supervised learning from a technician/engineer to make the decision.

Controller neural network (untrained) 908 may be configured to determine the appropriate MV moves while also satisfying one or more constraints or objective functions. The objective function in this embodiment may be the same as or similar to any of the objective functions described with reference to FIG. 5 and/or FIG. 7. In some embodiments, the objective function(s) considered by controller neural network (untrained) 908 can include representations of the value of each of the one or more hydrocarbon products such that maximizing the objective function maximizes the monetary value of the output oil products from HCU 116. In some embodiments, the objective function(s) considered by controller neural network (untrained) 908 includes one or more penalties associated with the light hydrocarbon products attempting to be optimized. For example, diesel-like products generated via HCU 116 may be more valuable than naphtha-like products generated via HCU 116. As such, the objective function may include weights associated with the variables for each of the hydrocarbon products based on their value, such that increasing the product yield of diesel-like products has a more optimizing effect on the objective function than increasing the product yield of naphtha-like products. This can allow the objective function to not only maximize the total volume gain for one or more hydrocarbons individually and/or as a whole, but maximize the most valuable volume gain for one or more hydrocarbons individually and/or as a whole to produce the most valuable products given the incoming feed. While monetary value is used in the above example as the reason for differentiating objective function weights, other factors can be considered, such as current amount of products, product efficiency at a given reactor severity, customer demands, etc.

In some embodiments, controller neural network (untrained) 908 is configured to output one or more MV's that will satisfy one or more predicted CV's and/or TVs from a training input. In some embodiments, this is performed by attempting to optimize an objective function (i.e., a function that calculates the error between actual and desired CV values). The objective function(s) may also consider the monetary cost of operating the system in terms of energy consumption, material consumption, or other costs associated with operating the equipment. Objective functions can be augmented with various terms to consider other optimization objectives as well such as penalties for certain types of actions (e.g., switching equipment on/off too rapidly, changing the control signal too rapidly, etc.), penalties for variables exceeding certain limits. These types of penalties can be incorporated into the objective function if they are permitted, or implemented as hard constraints if they are unacceptable and absolutely need to be avoided. Generally, controller neural network (untrained) 908 may act as a training mechanism for receiving the state information from predictor neural network 904 and outputting MV moves (e.g., trajectories, etc.) designated to meet the pre-specified constrains and objectives.

Controller neural network trainer 906 may be configured to adjust the weights of controller neural network (untrained) 908 such that the values of the MV's or MV moves output by controller neural network (untrained) 908 optimize the objective function. In some embodiments, controller neural network trainer 906 uses predictor neural network 904 to predict the values of the CV's that will result from a given set of MV's output by controller neural network (untrained) 908 and uses the predicted values of the CV's to evaluate the objective function. Controller neural network trainer 906 may continue adjusting the weights of controller neural network (untrained) 908 until the MV's output by controller neural network (untrained) 908 result in values of the CV's that optimize the objective function over a given time period. This training may resemble the training described above with reference to predictor neural network 904, with the exception that controller neural network (untrained) 908 is trained to output MV moves that optimize the objective function, whereas the predictor neural network 904 is trained to predict CV's that align with historical data. Once trained, controller neural network (untrained) 908 may become controller neural network (trained) 910 or the weights from controller neural network (untrained) 908 may be provided to controller neural network (trained) 910 for use in online control.

Controller neural network 910 (trained) is shown receiving real-time state data from sensors 724 and outputting MV moves as a function of the real-time state data. It should be appreciated that the real-time state data need not come from sensors 724 in some embodiments, but may be supplied from any type of data source (e.g., databases, controllers, a combination of sensors 724 and other data sources, etc.) During online control, the current state of the plant may be provided as an input to controller neural network (trained) 910. The MV moves output by controller neural network (trained) 910 may be provided to petroleum refining equipment 726 and/or used to generate control signals that are provided to petroleum refining equipment 726.

Figure 8:
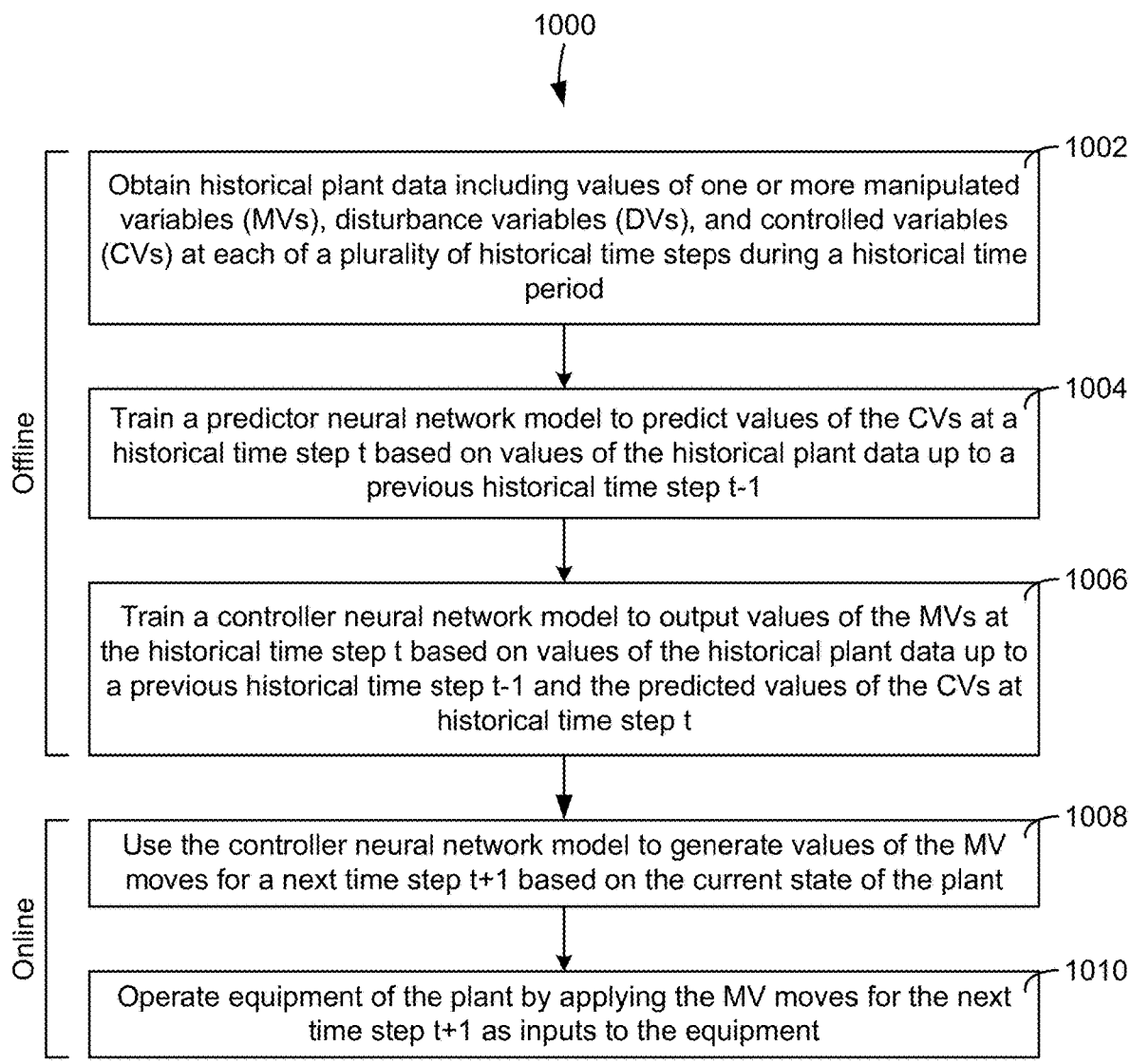
FIG. 8 is a flow diagram of a process for using offline-trained neural networks to determine MV moves, which can be performed by the controller of FIG. 7, according to some embodiments.

Referring now to FIG. 8, a flow diagram of a process 1000 for performing control of the plant using an offline trained predictor neural network and an offline trained controller neural network is shown, according to some embodiments. Process 1000 may be performed by any of the processing circuitry described herein, such as plant controller 702. In some embodiments, process 1000 is at least partially performed by plant controller 702 as described with reference to FIG. 7.

Process 1000 is shown to include obtaining historical plant data, the historical plant data including values of one or more manipulated variables (MV's), disturbance variables (DV's), and controlled variables (CV's) (step 1002). Data collector 710 may be configured to receive the historical plant data from database 722. In some embodiments, the data includes MV's, DV's, and/or CV's for one or more historical time periods (e.g., historical states) of the plant (e.g., operation of system 100).

Process 1000 is shown to include training a predictor neural network model to predict values of the CV's at a historical time step t based on values of the historical plant data up to a previous historical time step t−1 (step 1004). Predictor neural network trainer 902 may receive the historical state data from data collector 710 and begin training predictor neural network 904. The weights of predictor neural network 904 may be updated based on the predicted CV predictions received by predictor neural network trainer 902. Once trained, predictor neural network 904 can provide CV predictions to controller neural network trainer 906 for use in training controller neural network (untrained) 908.

In some embodiments, predictor neural network 904 is trained with the historical plant data. Predictor neural network 904 may receive data over any number of time periods (days, weeks, years, etc.) such that predictor neural network 904 is capable of predicting the CV's of the data set. Plant controller 702 may compare the error to a threshold and determine that further training is required. The weights of predictor neural network 904 may be updated accordingly and the training is repeated until the predictions are within an acceptable error percentage or range. The data input may include a vector of values for each of the MV's, DV's, and CV's (i.e., a time series of each variable including one or more time series values up to time step t−1), which could be provided in the form of a matrix or otherwise. The training period may be based on a certain amount of predictions being made, a certain number of historical data sets/states/episodes being analyzed, data for a certain number of future time steps being predicted, or any combination thereof.

In some embodiments, the weights of predictor neural network 904 and/or bias vectors of predictor neural network 904 are initialized. After initialization, for each of a plurality of time steps, an input vector x is formed of values of CV's, MV's and/or DV's of time points t−T . . . t, and a desired output values vector y' is formed of the values of the controlled variables at time t+1. Predictor neural network 904 is applied to the input vector x and the resultant output vector y is compared to the desired output values vector y'. Based on a difference between the output vector y and the desired output values vector y', the weights of predictor neural network 904 are adjusted in a direction which reduces the difference. The magnitude of the difference is calculated using any suitable difference measure (e.g., absolute value, sum of squares, etc.). The forming of the vectors, applying predictor neural network 904, and adjusting the weights is repeated for many time points, such that predictor neural network 904 reliably models the operation of the system.

Process 1000 is shown to include training a controller neural network model to output values of the MV's at the historical time step t based on values of the historical plant data up to a previous historical time step t−1, and the predicted values of the CV's at the historical time step (step 1006). Controller neural network trainer 906 may train controller neural network (untrained) 908 to output values of the MV's at the historical time step t as a function of the current state of the plant at time step t−1. As described above, the process of training the controller neural network model may include adjusting weights of controller neural network (untrained) 908 until the MV moves are adequate (e.g., based on supervised learning), or until they substantially optimize an objective function. For example, the MV moves output by the controller neural network may be provided as an input to the predictor neural network to predict the values of the CV's that will result from the MV moves. The values of the CV's can then be used to evaluate the objective function as described above. This process of adjusting the weights, generating MV moves, predicting CV values, and evaluating the objective function may be repeated until the performance of the controller neural network is acceptable (e.g., the objective function is sufficiently optimized).

Overall, this allows for a neural network system that can accurately predict appropriate CV's (e.g., most valuable volume gains for one or more hydrocarbon products) based on how the oil refinery has been operating, and then accurately generate moves for how the MV's (e.g., reactor severity, etc.) should be adjusted to accurately reach the predicted CV's. Advantageously, this provides a heighted level of optimization with reduced processing, as the neural networks can be trained offline prior to being implemented.

Process 1000 is shown to include using the controller neural network model to generate values of the MV moves for a next time step t+1 based on the current state of the plant (step 1008). Now that the controller neural network has been trained, controller neural network (trained) 910 can receive real-time state data indication operation of the plant in real time and determine MV moves based on the received real-time state data.

Offline Trained Predictor Neural Network with Model Predictive Control

Figure 9:
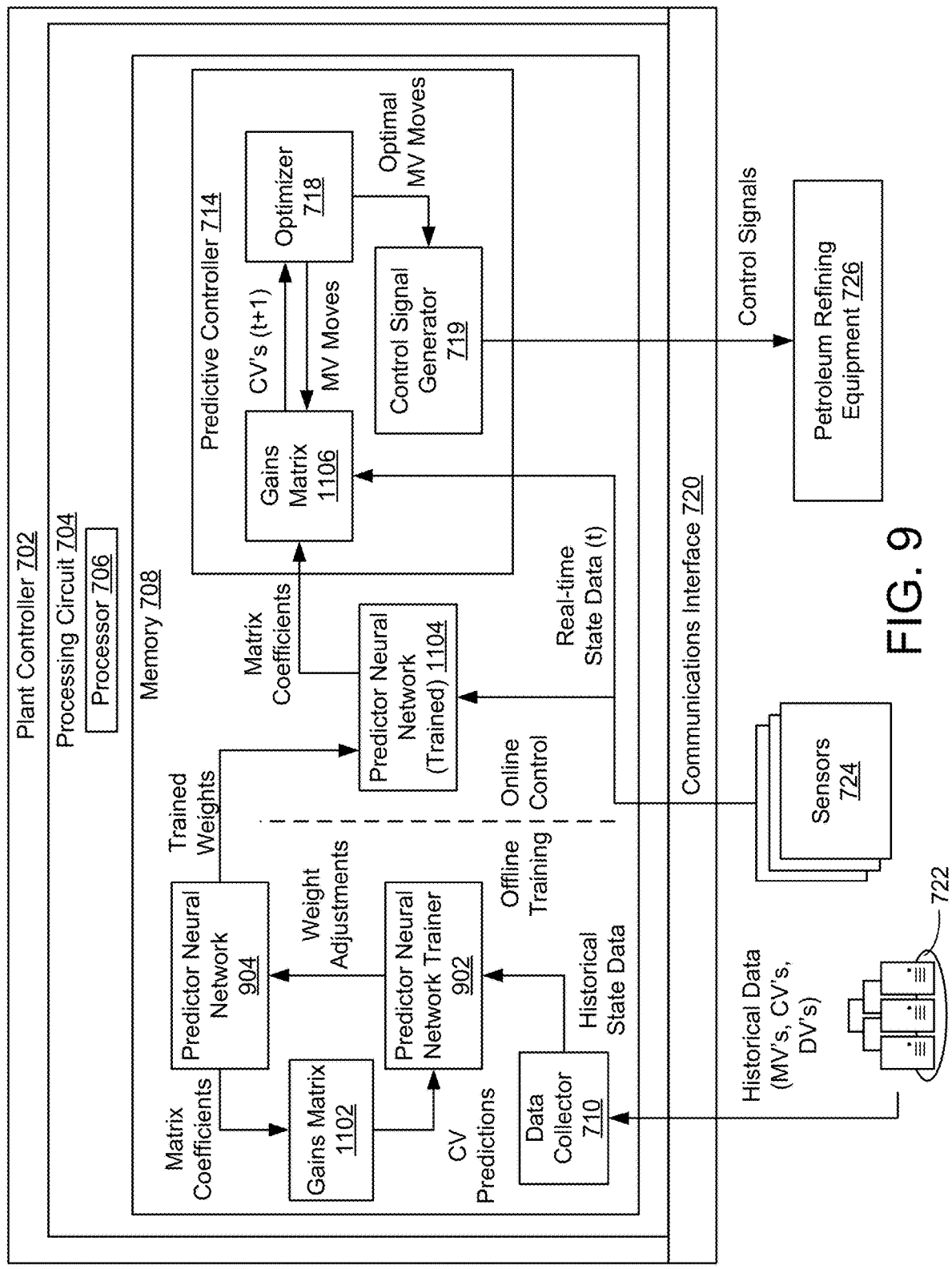
FIG. 9 is a block diagram of a plant controller using an offline-trained neural network to predict CV's for a model predictive controller, which can be implemented in the petroleum refinery system of FIG. 1, according to some embodiments.

Referring now to FIG. 9, a block diagram of plant controller 702 for performing model predictive control of a plant using offline trained neural networks is shown, according to some embodiments. In some embodiments, plant controller 702 as shown in FIG. 9 is configured to train a predictor neural network to generate a gains matrix. The gains matrix may be a matrix including a number of coefficients that provides a linearized representation of plant behavior for a given time period. The gains matrix may be generated based on the historical data for a certain time period, wherein the gains matrix represents the behavior of the plant or parts of the plant at that given time period. The gains matrix can then be used as the model of the plant for model predictive control (e.g., control as described above with reference to FIG. 5, performed by predictive controller 714, etc.). Memory 708 is shown to include data collector 710, predictor neural network trainer 902, predictor neural network 904, controller neural network trainer 906, controller neural network (untrained) 908, and controller neural network (trained) 910. Any components in FIG. 9 having the same reference numbers as components previously described may operate in the same or similar manner in the embodiment shown in FIG. 9, unless different operation is described below.

Predictor neural network trainer 902 may be configured to train predictor neural network 904 to generate matrix coefficients for gains matrix 1102 based on one or more historical data sets. The matrix coefficients may be used to create gains matrix 1102, which can include a linear representation (e.g., model) of the plant for that historical time period (e.g., the time period or episode during which the historical state data was collected). Predictor neural network trainer 902 may be configured to adjust the weights of predictor neural network 904 and evaluate gains matrix 1102 produced by predictor neural network 904 to determine whether gains matrix 1102 is accurate. For example, predictor neural network 902 may apply historical plant data for time step t−1 as an input to an instance of gains matrix 1102 created by predictor neural network 904 to predict the values of the CV's at time step t. Predictor neural network trainer 902 may compare the output of gains matrix 1102 to the actual values of the CV's at time step t in the historical data to determine whether gains matrix 1102 is sufficiently accurate. Once the gains matrix 1102 is being adequately generated (e.g., predictor neural network 904 produces a gains matrix 1102 that results in sufficiently accurate predictions of the CV's based on the historical state data, etc.), predictor neural network 904 may become predictor neural network (trained) 110.

One example of a gains matrix is shown in the following equation:

$$A(\theta)\Delta V_k = \Delta CV_{k+1}$$

where $A(\theta)$ is the gains matrix, $\Delta V_k$ is a vector of steps or changes in the MV's, CV's and DV's between time step k−1 and time step k, and $\Delta CV_{k+1}$ is a vector of predicted steps or changes in the CV's between time step k and time step k+1. In this example, the gains matrix $A(\theta)$ is multiplied with the vector $\Delta V_k$ of steps or changes in the MV's, CV's and DV's between time step k−1 and time step k (known from the historical data) to calculate the vector $\Delta CV_{k+1}$ of predicted steps or changes in the CV's between time step k and time step k+1.

In some embodiments, $A(\theta)$, $\Delta V_k$, and $\Delta CV_{k+1}$ have the following form:

$$A(\theta) = \begin{bmatrix} \theta_{1,1} & \cdots & \theta_{1,t} \\ \vdots & \ddots & \vdots \\ \theta_{m,1} & \cdots & \theta_{m,t} \end{bmatrix}, \Delta V_k = \begin{bmatrix} \Delta MV_{1,k} \\ \vdots \\ \Delta MV_{l,k} \\ \Delta CV_{1,k} \\ \vdots \\ \Delta CV_{m,k} \\ \Delta DV_{1,k} \\ \vdots \\ \Delta DV_{n,k} \end{bmatrix}, \Delta CV_{k+1} = \begin{bmatrix} \Delta CV_{1,k+1} \\ \vdots \\ \Delta CV_{m,k+1} \end{bmatrix}$$

where $A(\theta)$ is a m×t matrix having coefficients $\theta$, m is the total number of CV's, t is the total number of MV's, CV's and DV's, $\Delta MV_{1,k} \ldots \Delta MV_{l,k}$ are the actual steps or changes in the MV's (l being the total number of MV's) that occurred between time step k−1 and time step k, $\Delta CV_{1,k} \ldots \Delta CV_{m,k}$ are the actual steps or changes in the CV's that occurred between time step k−1 and time step k, $\Delta DV_{1,k} \ldots \Delta DV_{l,k}$ are the actual steps or changes in the DV's (n being the total number of DV's) that occurred between time step k−1 and time step k, and $\Delta CV_{1,k+1} \ldots \Delta CV_{m,k+1}$ are the predicted steps or changes in the CV's between time step k and time step k+1.

Once predictor neural network (trained) 1104 has been generated (e.g., by importing the trained weights from predictor neural network 904), predictor neural network (trained) 1104 can be used for online control. Predictor neural network (trained) 1104 is shown receiving real-time state data from sensors 724 and producing coefficients of a gains matrix 1106 as a function of the real-time state data. Gains matrix 1106 may provide a linearized representation of the dynamic behavior of the plant in real time, localized to the current state of the plant. This can include a live representation (e.g., a single time step), or can include multiple time steps to generate the representation. Gains matrix 1106 can then be used by predictive controller 714 to predict the values of the CV's at the next time step t+1 as a function of the real-time state data at time step t. For example, predictive controller 714 may use gains matrix 1106 as a predictive model (e.g., as predictive model 716), as described with reference to FIG. 5.

Optimizer 718 may operate in the same or similar manner as described with reference to FIG. 5. For example, optimizer 718 may perform an optimization process to determine the optimal MV moves based on the predicted CV's from the gains matrix 1106. Optimizer 718 may use gains matrix 1106 to generate predicted values of the CV's that will result from a given set of MV moves and iteratively adjust the MV moves until optimal values of the CV's are obtained. Control signal generator 719 may receive the optimal MV moves and generate control signals for petroleum refining equipment 726 to satisfy the setpoints for the optimal MV moves.

Optimizer 718 may be configured to perform an optimization process using predictive model 716. In some embodiments, the optimization process includes optimizing an objective function or cost function to determine optimal values of the MV's or optimal MV moves. In some embodiments, the objective function may consider both an established price of each hydrocarbon product and the flow rate of each hydrocarbon product, as well as the flow rate of the feed and the price of the feed. An exemplary objective function is shown below:

$$Obj.\ Function\left(\frac{vol}{time}\right) = [\text{unconverted product } (UCO) * UCO \text{ price} +$$
$$\text{diesel flow} * \text{diesel price} + \text{naphtha flow} * \text{naphtha price} +$$
$$\text{kerosene flow} * \text{kerosene price} + LPG \text{ flow} * LPG \text{ price}] - [\text{flow rate} * \text{feed price}]$$

The prices can be used within the objective function can be updated while the model is running closed-loop and controlling the process. Changes in prices can cause the model to manipulate the operating conditions of HCU 116 to yield the most profitable product mix for that pricing environment. This can allow the same model to be used throughout different economic operating regimes without the need for separate modes (e.g., gasoline mode, diesel mode, etc.) or additional robustness testing. In some embodiments, the prices can be changed with little or no downtime.

In some embodiments, the objective function can be configured to maximize the total volume of one or more of the total hydrocarbon products. For example, the objective function could include:

$$Obj.\ Function\left(\frac{flow}{time}\right) = [\text{unconverted product } (UCO) + \text{diesel flow} +$$
$$\text{naphtha flow} + \text{kerosene flow} + LPG \text{ flow}] - [\text{feed flow rate}]$$

Without including the pricing of the one or more hydrocarbon products. In various embodiments, the pricing of the one or more hydrocarbon products can be included in the objective function for some hydrocarbon products and not others.

In some embodiments, the objective function can be configured to maximize the total product quality of one or more of the output oil products. In some embodiments, a product quality considered valuable is the cetane number of diesel fuel. As such, the objective function could apply an upgraded price for the price of diesel fuel based on the cetane number found in the fuel. In some embodiment, the CN of the diesel can be tested via a sample of the diesel external from system 100 (e.g., within a lab, etc.) and provided back to plant controller 702 for processing. In some embodiments, system 100 includes measuring instruments capable of measuring the CN of the diesel stream (e.g., in real-time, at certain intervals, etc.) and providing the CN data back to plant controller 702.

Using the above example, the objective function could include:

$$Obj.\ Function\left(\frac{flow}{time}\right) = [[\{\text{diesel flow}\} * \{\text{diesel price}\} +$$
$$\{\text{cetane upgrade value}\} * \{\text{cetane number in diesel stream} - \text{base cetane number}\}] +$$
$$\text{unconverted product } (UCO) * UCO \text{ price} + \text{naphtha flow} * \text{naphtha price} +$$
$$\text{kerosene flow} * \text{kerosene price} + LPG \text{ flow} * LPG \text{ price}] - [\text{flow rate} * \text{feed price}]$$

The above objective function provides an upgraded price for the product quality of CN, based on the difference between the actual CN in the diesel stream (e.g., the output oil product, etc.) and the base cetane number. "Cetane Upgrade Value" in the above equation may refer to a constant value that associates the CN quantity with an appropriate price upgrade when accounting for the price of the diesel stream.

In some embodiments, the product qualities (e.g., CN as described above) are CVs with upper and lower bound and a control technique attempts to maintain the CV within the bounds and/or attempt to reach a target value within those bounds. In such embodiments, the price of the output streams may not be affected by the product quality, but the control technique still provides control to maintain a certain level of the product quality. This can allow plant controller 702 to generate the most valuable total product yield while maintaining appropriate levels of product quality. Of course, any variation of this, the most valuable product quality is optimized while the total yield for the output streams is maintained within upper and lower bounds and/or attempts to reach a target value, can also be considered.

In some embodiments, the objective function can include any number of weights in the objective function such that the various hydrocarbon products are weighted differently when attempting to maximize the objective function. For example, if maximizing the volume of naphtha produced by HCU 116 is desired, while maximizing the volume of jet fuel is less desired, than the variable representing naphtha volume may be weighted higher than the variable representing jet fuel volume. Of course, any number of weights and prices, either alone or in combination, can be used to prioritize certain hydrocarbon products over others.

In some embodiments, the objective function may include one or more terms that quantify the error between the current or predicted values of the CV's and target or setpoint values for the CV's. In some embodiments, the objective function may include one or more terms that quantify the amount of input resources (e.g., input oil feeds) consumed by system 100 or a cost of the input resources consumed. Optimizer 718 may be configured to iteratively adjust the values of the MV's and use predictive model 716 to predict the resulting values of the CV's that will result from each set of MV's. Optimizer 718 may continue adjusting the MV's while performing the optimization process until an optimal result is reached (e.g., minimum value of the objective function). Once the optimal result is reached, the values of the MV's that resulted in the optimal result may be designated as optimal values of the MV's or optimal MV moves.

Control signal generator 719 can be configured to receive MV/CV trajectories and provide control signals to petroleum refining equipment 726. In some embodiments, control signal generator 719 generates control signals for petroleum refining equipment 726 based on the values of the MV's output by optimizer 718. For example, if the MV value is a temperature, the control signal can be a signal for a heat source 202 to increase or decrease heating to achieve the target temperature value. This can be advantageous for embodiments in which the MV's are essentially setpoints and a local controller is needed to convert the setpoints into control signals for equipment that operate to achieve the setpoints.

Figure 10:
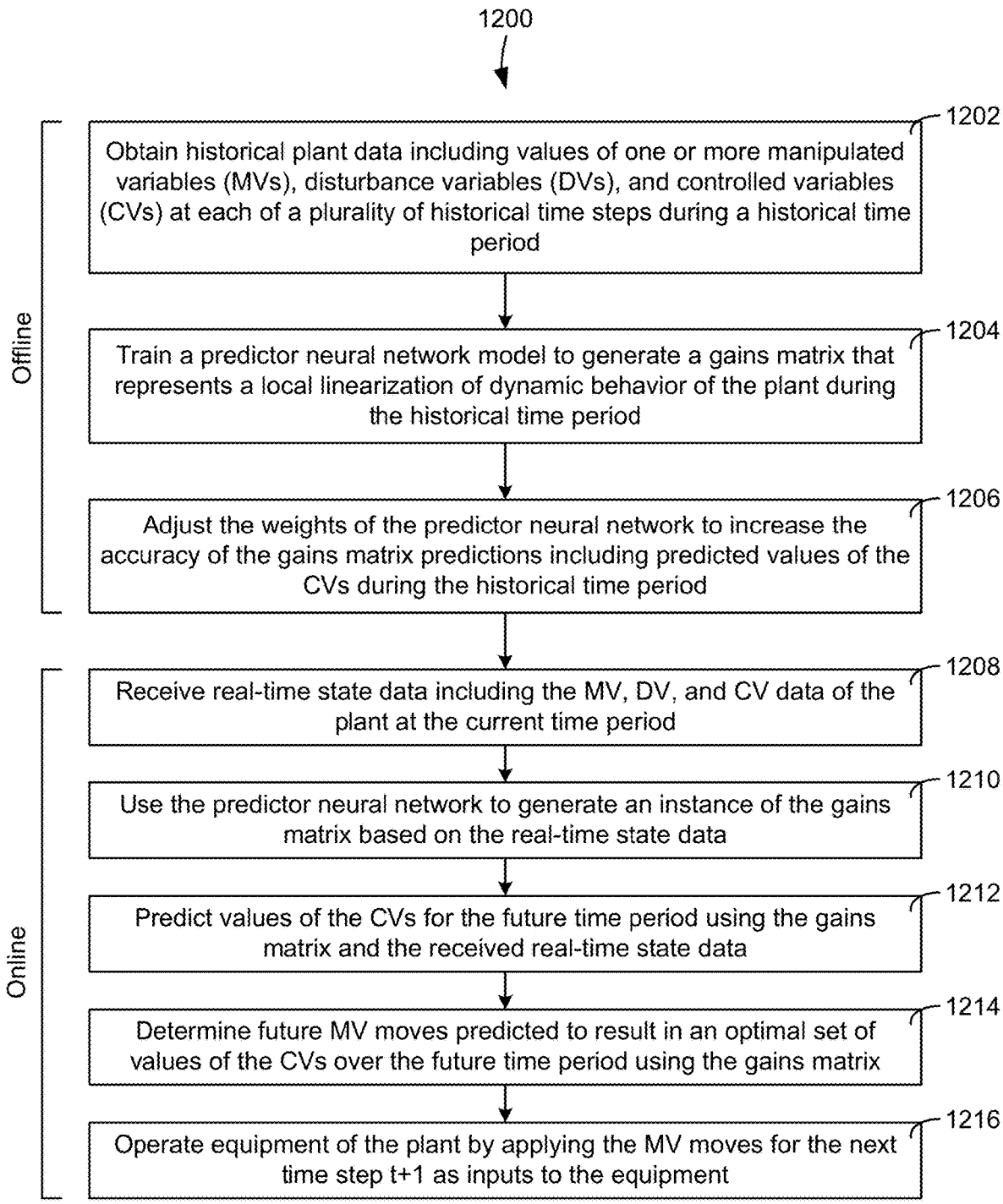
FIG. 10 is a flow diagram of a process for using an offline-trained neural network to predict CV's for a model predictive controller, which can be performed by the controller of FIG. 9, according to some embodiments.

Referring now to FIG. 10, a flow diagram of a process 1200 for performing control of the plant using an offline predictor neural network that generates a gains matrix is shown, according to some embodiments. Process 1200 may be performed by any of the processing circuitry described herein, such as plant controller 702. In some embodiments, process 1200 is at least partially performed by plant controller 702 as described above with reference to FIG. 9.

Process 1200 is shown to include obtaining historical plant data including values of one or more manipulated variables (MV's), disturbance variables (DV's), and controlled variables (CV's) (step 1202). Data collector 710 may be configured to receive the historical plant data from database 722. In some embodiments, the data includes MV's, DV's, and/or CV's for one or more historical time periods (e.g., historical states) of the plant (e.g., operation of system 100).

Plant controller 702 may obtain one or more "states" of the plant operation. As discussed above, the historical data represents a variety of different control situations over different periods of time. The full set of historical data may represent the non-linear behavior of the system over a relatively long time period (e.g., days, months, years, etc.). Each sample of the historical data may include values for all of the MV's, CV's DV's, and potentially other variables at an instantaneous time or over a time step having a predetermined duration (e.g., 1 second, 1 minute, 15 minutes, 1 hour, etc.). Each sample of the historical data may include a time stamp indicating a time at which the sample was collected and defines a corresponding "state" of the system at the time the sample was collected. As such, predictor neural network 904 may use the state data to predict future CV's and provide the predicted CV's to controller neural network 908 for prediction of future MV's.

Process 1200 is shown to include training a predictor neural network model to generate a gains matrix that represents a local linearization of dynamic behavior of the plant during the historical time period (step 1204) and adjusting the weights of the predictor neural network to increase the accuracy of the gains matrix predictions including predicted values of the CV's during the historical time period (step 1206). Predictor neural network trainer 902 may be configured to adjust the weights of predictor neural network 904 to ensure that the gains matrix 1102 generated by predictor neural network 904 accurately predicts values of the CV's in the historical data set.

Process 1200 is shown to include receiving real-time state data including the MV, DV, and CV data of the plant at the current time period (step 1208), using the predictor neural network to generate an instance of the gains matrix based on the real-time state data (step 1210), and predicting values of the CV's for the future time period using the gains matrix and the received real-time state data (step 1212). Once predictor neural network (trained) 1104 is trained, predictor neural network (trained) 1104 can receive real-time state data (e.g., data relating to the operation of the plant) via sensors 724 and generate a gains matrix 1106 based on that data. The gains matrix 1106 (i.e., the linearized representation of the current state) can then be used to predict future CV's (e.g., CV's for t+1, etc.), which can be provided to optimizer 718 during the optimization process.

Process 1200 is shown to include determining future MV moves that result in an optimal set of values of the CV's over the future time period using the gains matrix (step 1214). In some embodiments, the predictive controller 714 can input the real-time state data into the gains matrix to determine one or more CV values in a future time step, as discussed above. Then, predictive controller 714 may determine the MV adjustments required to reach the predicted CV value. The MV adjustments can be based on the model presented in the gains matrix, an attempt to satisfy an objective function received by predictive controller 714, or a combination thereof.

Process 1200 is shown to include operating equipment of the plant by applying the MV moves for the next time step t+1 as inputs to the equipment (step 1216). In some embodiments, petroleum refining equipment 726 can operate a reactor severity control device using the target severity to modulate the MV (e.g., the temperature affecting the volume of one or more hydrocarbon products within HCU 116, etc.).

In some embodiments, one or more reactor severity control mechanisms (e.g., modules, components, etc.) are located proximate to HCU 116 or upstream/downstream of HCU 116 to adjust the reactor severity within reactor 208. For example, one reactor severity control mechanism that can adjust the reactor severity within HCU 116 at least in part can be a valving system that adjusts the flow of catalyst into riser 204. In some embodiments, another reactor severity control mechanism can include a valving system controlling the amount of feed entering HCU 116. In some embodiments, another reactor severity control mechanism is a heat source 202 that pre-heats the incoming feed. The reactor severity control mechanisms may be part of petroleum refining equipment 726 described below, and may be configured to receive control signals from plant controller 702 to adjust one or more MV's of the plant.

Figure 11:
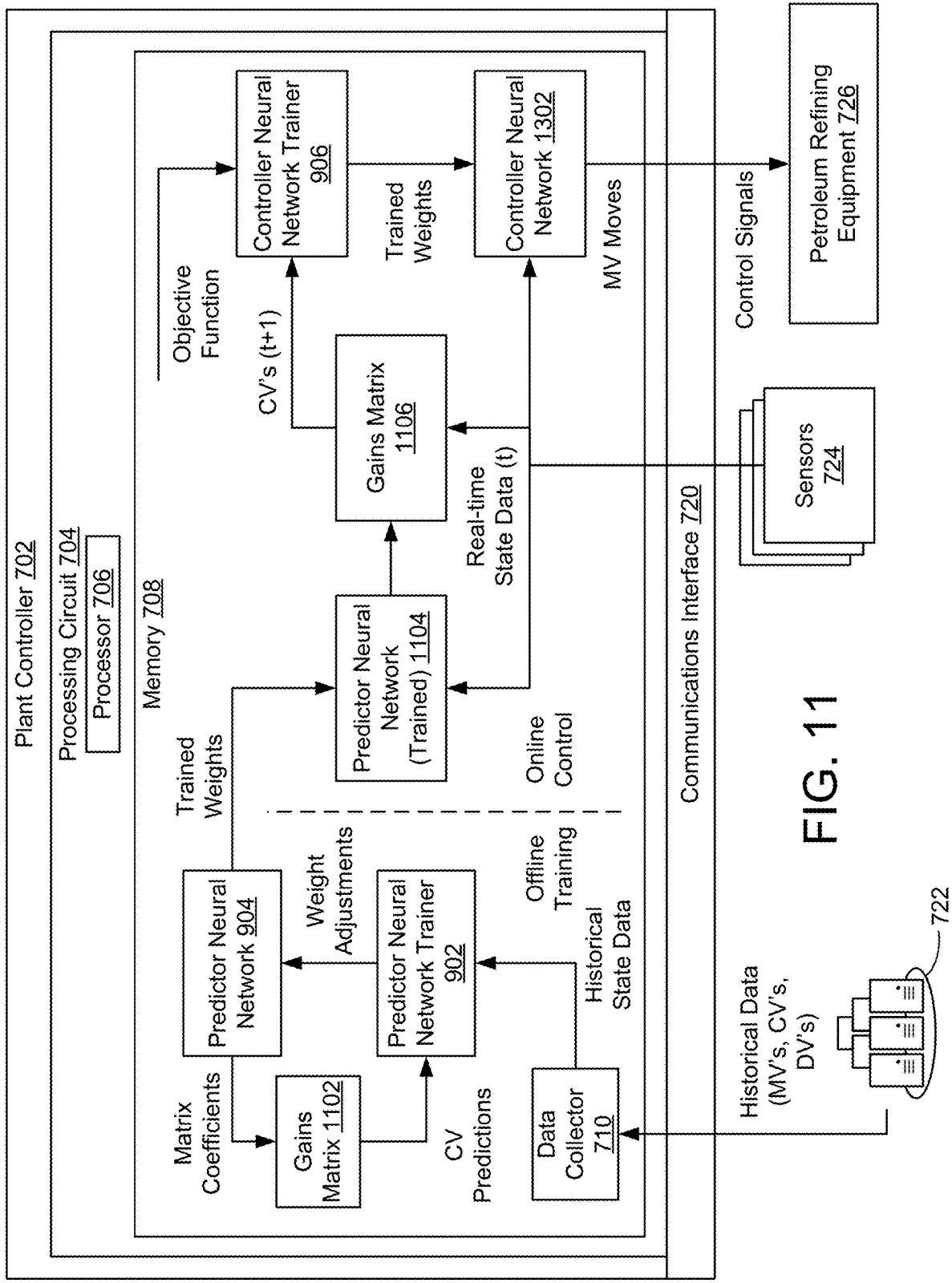
FIG. 11 is a block diagram of a plant controller using a predictor neural network to generate a gains matrix to train a controller neural network to determine MV moves, which can be implemented in the petroleum refinery system of FIG. 1, according to some embodiments.

Offline Trained Predictor Neural Network with Online Controller Neural Network Training Referring now to FIG. 11, a block diagram of another embodiment of plant controller 702 is shown. In the embodiment shown in FIG. 11, plant controller 702 may use predictor neural network 904 to generate gains matrix 1106 as previously described. However, instead of using gains matrix 1106 to perform model predictive control, gains matrix 1106 may be used to train a controller neural network 1302 for use in online control. Any components in FIG. 11 having the same reference numbers as components previously described may operate in the same or similar manner in the embodiment shown in FIG. 11, unless different operation is described below. For example, data collector 710 is shown providing historical data to predictor neural network trainer 902, which operates to train predictor neural network 904 to produce gains matrix 1102. These steps may be performed offline as previously described until predictor neural network 904 is trained sufficiently for online control. Once sufficiently trained, predictor neural network 904 may become predictor neural network (trained) 1104 or may provide the trained weights as an input to predictor neural network (trained) 1104.

During online control, predictor neural network (trained) 1104 may be used to generate gains matrix 1106 as a function of real-time state data. As described above, gains matrix 1106 may be configured to predict the values of the CV's at time step t+1 as a function of the MV's and/or real-time state data at time step t. Gains matrix 1106 may be used by controller neural network trainer 906 to train controller neural network 1302.

Controller neural network trainer 906 may be configured to train controller neural network 1302 by performing a training process similar to the training process described with reference to FIG. 7. For example, controller neural network trainer 906 may be configured to adjust the weights of controller neural network 1302 such that the values of the MV's or MV moves output by controller neural network 1302 optimize an objective function.

For example, controller neural network trainer 906 may be configured to perform an optimization process. In some embodiments, the optimization process includes optimizing an objective function or cost function to determine optimal values of the MV's or optimal MV moves. The objective function may consider both an established price of each hydrocarbon product and the flow rate of each hydrocarbon product, as well as the cost of feed and the price of the feed. An exemplary objective function is shown below:

$$Obj.\ \text{Function}\left(\frac{vol}{time}\right) = [\text{unconverted product } (UCO) * UCO \text{ price} +$$
$$\text{diesel flow} * \text{diesel price} + \text{naphtha flow} * \text{naphtha price} +$$
$$\text{kerosene flow} * \text{kerosene price} + LPG \text{ flow} * LPG \text{ price}] - [\text{flow rate} * \text{feed price}]$$

The prices can be used within the objective function can be updated while the model is running closed-loop and controlling the process. Changes in prices can cause the model to manipulate the operating conditions of HCU 116 to yield the most profitable product mix for that pricing environment. This can allow the same model to be used throughout different economic operating regimes without the need for separate modes (e.g., gasoline mode, diesel mode, etc.) or additional robustness testing. In some embodiments, the prices can be changed with little or no downtime.

In some embodiments, the objective function can be configured to maximize the total volume of one or more of the total hydrocarbon products. For example, the objective function could include:

$$Obj.\ \text{Function}\left(\frac{flow}{time}\right) = [\text{unconverted product } (UCO) + \text{diesel flow} +$$
$$\text{naphtha flow} + \text{kerosene flow} + LPG \text{ flow}] - [\text{feed flow rate}]$$

Without including the pricing of the one or more hydrocarbon products. In various embodiments, the pricing of the one or more hydrocarbon products can be included in the objective function for some hydrocarbon products and not others.

In some embodiments, the objective function can be configured to maximize the total product quality of one or more of the output oil products. In some embodiments, a product quality considered valuable is the cetane number of diesel fuel. As such, the objective function could apply an upgraded price for the price of diesel fuel based on the cetane number found in the fuel. In some embodiment, the CN of the diesel can be tested via a sample of the diesel external from system 100 (e.g., within a lab, etc.) and provided back to plant controller 702 for processing. In some embodiments, system 100 includes measuring instruments capable of measuring the CN of the diesel stream (e.g., in real-time, at certain intervals, etc.) and providing the CN data back to plant controller 702.

Using the above example, the objective function could include:

$$\text{Obj. Function}\left(\frac{\text{flow}}{\text{time}}\right) = [[\{\text{diesel flow}\} * \{\text{diesel price}\} +$$

$$\{\text{cetane upgrade value}\} * \{\text{cetane number in diesel stream} - \text{base cetane number}\}] +$$

$$\text{unconverted product } (UCO) * UCO \text{ price} + \text{naphtha flow} * \text{naphtha price} +$$

$$\text{kerosene flow} * \text{kerosene price} + LPG \text{ flow} * LPG \text{ price}] - [\text{flow rate} * \text{feed price}]$$

The above objective function provides an upgraded price for the product quality of CN, based on the difference between the actual CN in the diesel stream (e.g., the output oil product, etc.) and the base cetane number. "Cetane Upgrade Value" in the above equation may refer to a constant value that associates the CN quantity with an appropriate price upgrade when accounting for the price of the diesel stream.

In some embodiments, the product qualities (e.g., CN as described above) are CVs with upper and lower bound and a control technique attempts to maintain the CV within the bounds and/or attempt to reach a target value within those bounds. In such embodiments, the price of the output streams may not be affected by the product quality, but the control technique still provides control to maintain a certain level of the product quality. This can allow plant controller 702 to generate the most valuable total product yield while maintaining appropriate levels of product quality. Of course, any variation of this, the most valuable product quality is optimized while the total yield for the output streams is maintained within upper and lower bounds and/or attempts to reach a target value, can also be considered.

In some embodiments, the objective function can include any number of weights in the objective function such that the various hydrocarbon products are weighted differently when attempting to maximize the objective function. For example, if maximizing the volume of naphtha produced by HCU 116 is desired, while maximizing the volume of jet fuel is less desired, than the variable representing naphtha volume may be weighted higher than the variable representing jet fuel volume. Of course, any number of weights and prices, either alone or in combination, can be used to prioritize certain hydrocarbon products over others.

In some embodiments, the objective function may include one or more terms that quantify the error between the current or predicted values of the CV's and target or setpoint values for the CV's. In some embodiments, the objective function may include one or more terms that quantify the amount of input resources (e.g., input oil feeds) consumed by system 100 or a cost of the input resources consumed. Optimizer 718 may be configured to iteratively adjust the values of the MV's and use predictive model 716 to predict the resulting values of the CV's that will result from each set of MV's. Optimizer 718 may continue adjusting the MV's while performing the optimization process until an optimal result is reached (e.g., minimum value of the objective function). Once the optimal result is reached, the values of the MV's that resulted in the optimal result may be designated as optimal values of the MV's or optimal MV moves.

In some embodiments, controller neural network trainer 906 uses gains matrix 1106 to predict the values of the CV's that will result from a given set of MV's output by controller neural network 1302 and uses the predicted values of the CV's to evaluate the objective function. Controller neural network trainer 906 may continue adjusting the weights of controller neural network 1302 until the MV's output by controller neural network 1302 result in values of the CV's that optimize the objective function over a given time period. Once trained, controller neural network 1302 can then be used to generate MV moves for time step t+1 as a function of the real-time state data at time step t.

Figure 12:
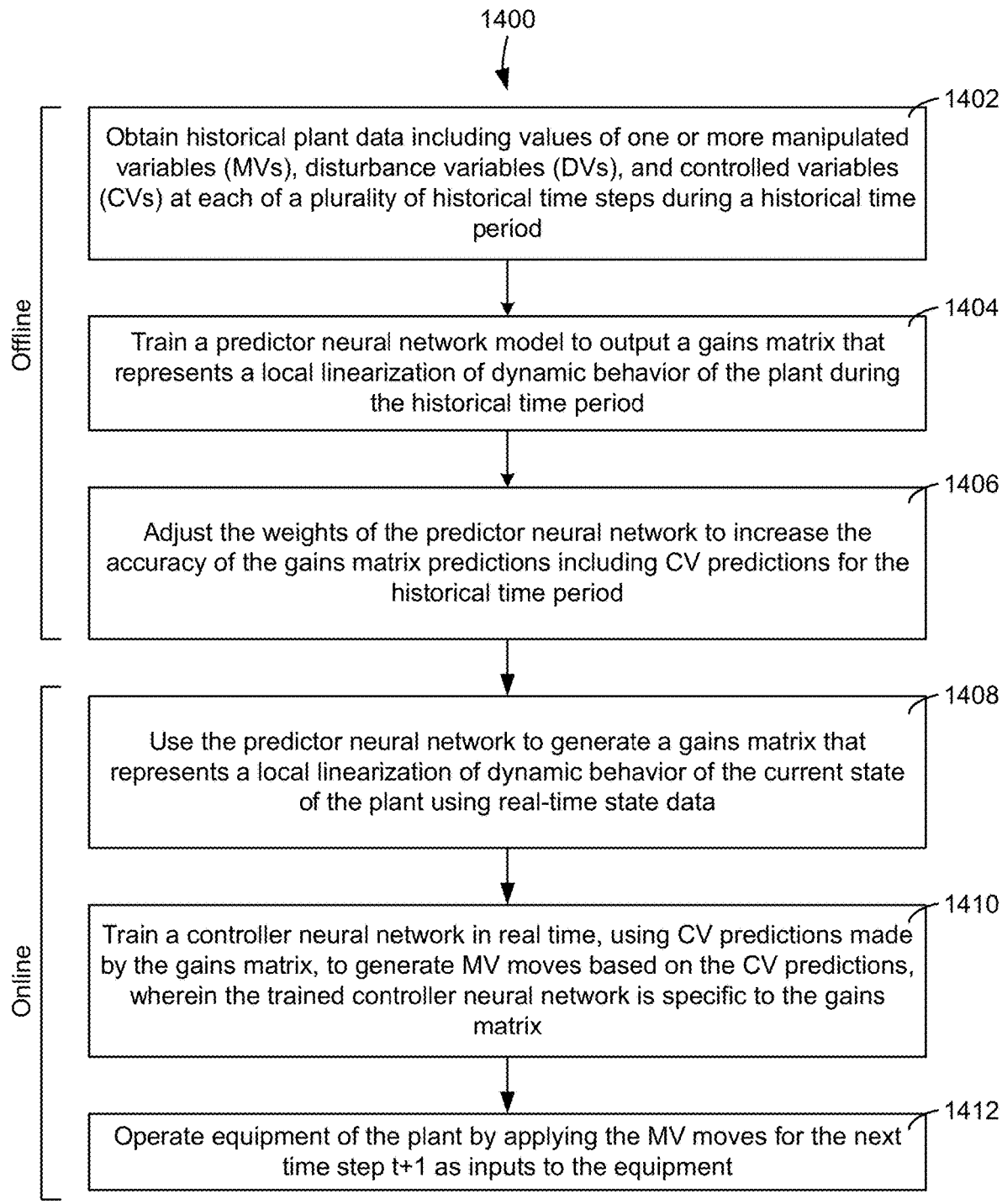
FIG. 12 is a flow diagram of a process for using a predictor neural network to generate a gains matrix to train a controller neural network to determine MV moves, which can be performed by the plant controller of FIG. 11, according to some embodiments.

Referring now to FIG. 12, a flow diagram of a process 1400 for training a controller neural network using a single gains matrix and using the controller neural network to operate equipment is shown, according to some embodiments. Process 1400 may be performed by any of the processing circuitry described herein, such as plant controller 702. In some embodiments, process 1200 is at least partially performed by plant controller 702 as described above with reference to FIG. 11.

Process 1400 is shown to include obtaining historical plant data including values of one or more manipulated variables (MV's), disturbance variables (DV's), and controlled variables (CV's) (step 1402). Data collector 710 may be configured to receive the historical plant data from database 722. In some embodiments, the data includes MV's, DV's, and/or CV's for one or more historical time periods (e.g., historical states) of the plant (e.g., operation of system 100).

In some embodiments, the MV's may include temperature severity of the HCU 116. Temperature severity can include the temperature inside of reactor 208, the temperature of the feed entering reactor 208, the temperature of the feed during the chemical reaction, the temperature of the feed after pre-heating, the temperature of the feed prior to pre-heating, or a combination thereof. In some embodiments, the CV acting as the most valuable volume gain of one or more hydrocarbon products produced by HCU 116 could include individual volume values for each of the outputs of HCU 116 and individual prices for each of the outputs of HCU 116 which could be used to calculate the most valuable volume gain of one or more hydrocarbon products.

Process 1400 is shown to include training a predictor neural network model to output a gains matrix that represents a local linearization of dynamic behavior of the plant during the historical time period (step 1404) and adjusting the weights of the predictor neural network to increase the accuracy of the gains matrix predictions including CV predictions for the historical time period (step 1406). Predictor neural network trainer 902 may be configured to adjust the weights of predictor neural network 904 to ensure the gains matrix 1102 generated by predictor neural network 904 accurately predicts values of the CV's in the historical data set.

Process 1400 is shown to include using the predictor neural network to generate a gains matrix that represents a local linearization of dynamic behavior of the current state of the plant using real-time state data. Once predictor neural network (trained) 1104 is trained, predictor neural network (trained) 1104 can receive real-time state data (e.g., data relating to the operation of the plant) via sensors 724 and generate a gains matrix 1106 based on that data. The linearized representation of the current state can be used to predict future CV's (e.g., CV's for t+1, etc.), which can be provided to optimizer 718.

Process 1400 is shown to include training a controller neural network in real-time, using CV predictions made by the gains matrix, to generate MV moves based on the CV predictions, wherein the trained controller neural network is specific to the gains matrix (step 1410). For example, step 1410 may include adjusting the weights of controller neural network 1302 such that the values of the MV's or MV moves output by controller neural network 1302 optimize an objective function. In some embodiments, controller neural network trainer 906 uses gains matrix 1106 to predict the values of the CV's that will result from a given set of MV's output by controller neural network 1302 and uses the predicted values of the CV's to evaluate the objective function. Controller neural network trainer 906 may continue adjusting the weights of controller neural 1302 until the MV's output by controller neural network 1302 result in values of the CV's that optimize the objective function over a given time period. Once trained, controller neural network 1302 can then be used to generate MV moves for time step t+1 as a function of the real-time state date at time step t.

Process 1400 is shown to include operating equipment of the plant by applying the MV moves for the next time step t+1 as inputs to the equipment (step 1412). Step 1412 may include using the values of the MV's at time step t+1 as inputs to the equipment or using the values of the MV's at time step t+1 to generate control signals for the equipment.

Offline Controller Neural Network Training Based on Multiple Gains Matrices

Figure 13:
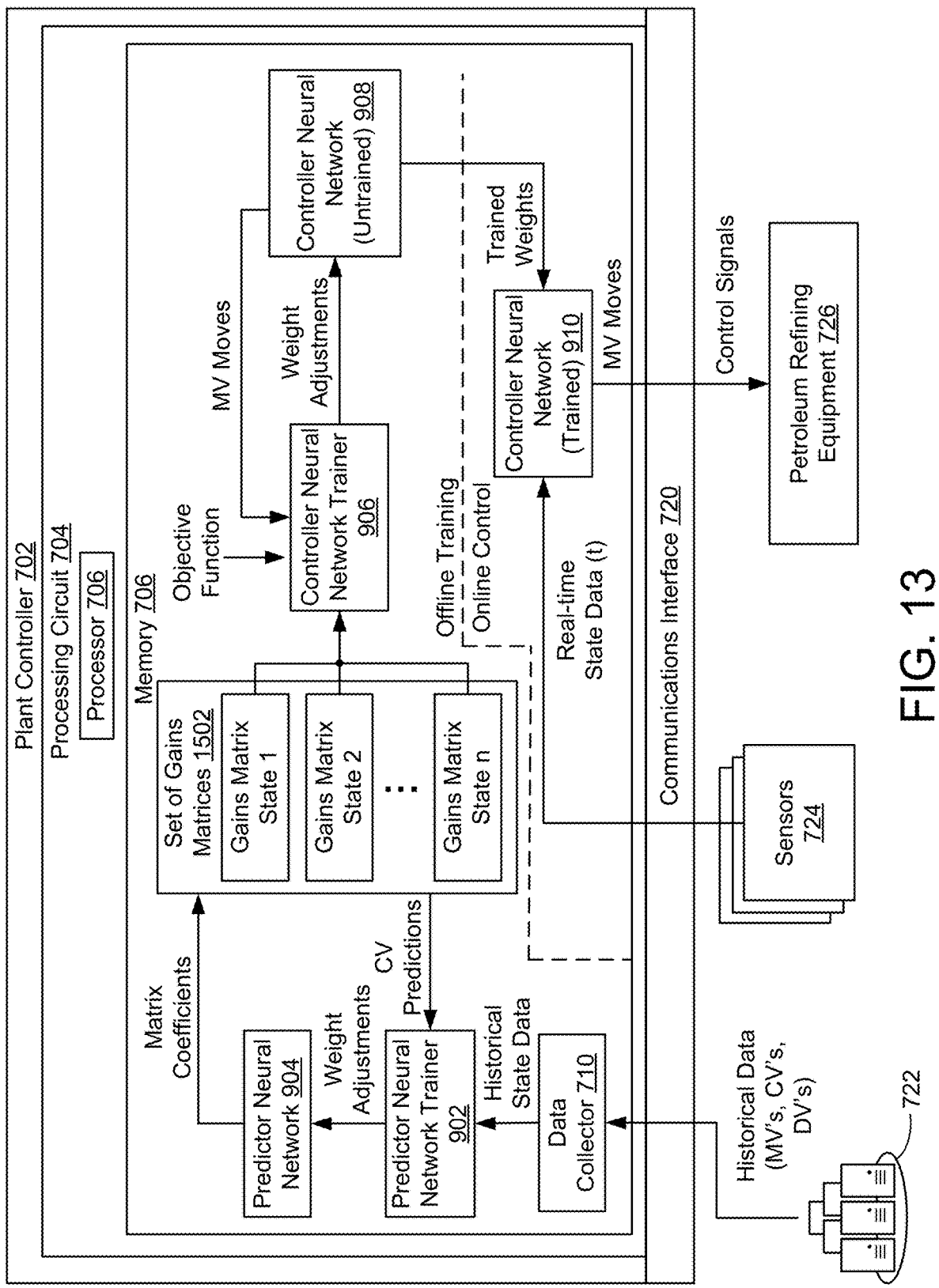
FIG. 13 is a block diagram of a plant controller using multiple gains matrices to train a controller neural network to determine MV moves, which can be implemented in the petroleum refinery system of FIG. 1, according to some embodiments.

Referring now to FIG. 13, a block diagram of a process for performing online control based on multiple gain matrices is shown, according to some embodiments. Memory 708 is shown to include data collector 710, predictor neural network trainer 902, predictor neural network 904, set of gains matrices 1502, controller neural network trainer 906, controller neural network (untrained) 908, controller neural network (trained) 910. Any components in FIG. 13 having the same reference numbers as components previously described may operate in the same or similar manner in the embodiment shown in FIG. 13, unless different operation is described below.

The embodiment illustrated in FIG. 13 may be similar to the embodiment illustrated in FIG. 11, with the exception that controller neural network 908, 910 is trained using multiple different gains matrices instead of a single gains matrix. The steps performed by predictor neural network trainer 902 to train predictor neural network 904 may be the same as previously described. Once trained, predictor neural network 904 can be used to generate a set of gains matrices 1502. Each of the gains matrices 1502 may represent a different linearization of dynamic behavior of the plant (e.g., localized to a particular episode of the historical data) and may be generated using the same or similar process used to generate gains matrix 1106 as previously described. The steps performed to generate the gains matrices 1502 can be repeated multiple times for different sets of historical data to generate a gains matrix for each set of the historical data (e.g., for multiple different episodes of the historical data).

Controller neural network trainer 906 can then use the set of gains matrices 1502 to train controller neural network (untrained) 908. The steps performed to train controller neural network (untrained) 908 may be similar to the embodiment described with reference to FIG. 11. However, instead of using a single gains matrix to predict the values of the CV's or CV moves that will result from each set of MV's or MV moves generated by controller neural network (untrained 908). Each set of MV's or MV moves generated by controller neural network (untrained) 908 may be associated with a particular episode of the training data, specifically the episode of training data used by controller neural network (untrained) 908 to generate that set of MV's or MV moves. The gains matrix generated for that same episode may then be used to predict the values of the CV's or CV moves that will result from the MV's or MV moves associated with that same episode. The entire set of predicted values of the CV's or CV moves (i.e., across all of the episodes) may then be used to evaluate the objective function to determine how well the various sets of MV's or MV moves optimize the objective function across all of the episodes.

In some embodiments, controller neural network trainer 906 receives an objective function to determine optimal values of the MV's or optimal MV moves. In some embodiments, the objective function may consider both an established price of each hydrocarbon product and the flow rate of each hydrocarbon product, as well as the cost of feed and the price of the feed. An exemplary objective function is shown below:

$$Obj.\ Function \left(\frac{vol}{time}\right) = [\text{unconverted product } (UCO) * UCO \text{ price} +$$
$$\text{diesel flow} * \text{diesel price} + \text{naphtha flow} * \text{naphtha price} +$$
$$\text{kerosene flow} * \text{kerosene price} + LPG \text{ flow} * LPG \text{ price}] - [\text{flow rate} * \text{feed price}]$$

The prices can be used within the objective function can be updated while the model is running closed-loop and controlling the process. Changes in prices can cause the model to manipulate the operating conditions of HCU 116 to yield the most profitable product mix for that pricing environment. This can allow the same model to be used throughout different economic operating regimes without the need for separate modes (e.g., gasoline mode, diesel mode, etc.) or additional robustness testing. In some embodiments, the prices can be changed with little or no downtime.

In some embodiments, the objective function can be configured to maximize the total volume of one or more of the total hydrocarbon products. For example, the objective function could include:

$$Obj.\ Function \left(\frac{flow}{time}\right) = [\text{unconverted product } (UCO) + \text{diesel flow} +$$
$$\text{naphtha flow} + \text{kerosene flow} + LPG \text{ flow}] - [\text{feed flow rate}]$$

Without including the pricing of the one or more hydrocarbon products. In various embodiments, the pricing of the one or more hydrocarbon products can be included in the objective function for some hydrocarbon products and not others.

In some embodiments, the objective function can be configured to maximize the total product quality of one or more of the output oil products. In some embodiments, a product quality considered valuable is the cetane number of diesel fuel. As such, the objective function could apply an upgraded price for the price of diesel fuel based on the cetane number found in the fuel. In some embodiment, the CN of the diesel can be tested via a sample of the diesel external from system 100 (e.g., within a lab, etc.) and provided back to plant controller 702 for processing. In some embodiments, system 100 includes measuring instruments capable of measuring the CN of the diesel stream (e.g., in real-time, at certain intervals, etc.) and providing the CN data back to plant controller 702.

Using the above example, the objective function could include:

$$Obj.\ Function\left(\frac{\text{flow}}{\text{time}}\right) = [[\{\text{diesel flow}\} * \{\text{diesel price}\} +$$
$$\{\text{cetane upgrade value}\} * \{\text{cetane number in diesel stream} -$$
$$\text{base cetane number}\}] + \text{unconverted product } (UCO) * UCO \text{ price} +$$
$$\text{naphtha flow} * \text{naphtha price} + \text{kerosene flow} * \text{kerosene price} +$$
$$LPG \text{ flow} * LPG \text{ price}] - [\text{flow rate} * \text{feed price}]$$

The above objective function provides an upgraded price for the product quality of CN, based on the difference between the actual CN in the diesel stream (e.g., the output oil product, etc.) and the base cetane number. "Cetane Upgrade Value" in the above equation may refer to a constant value that associates the CN quantity with an appropriate price upgrade when accounting for the price of the diesel stream.

In some embodiments, the product qualities (e.g., CN as described above) are CVs with upper and lower bound and a control technique attempts to maintain the CV within the bounds and/or attempt to reach a target value within those bounds. In such embodiments, the price of the output streams may not be affected by the product quality, but the control technique still provides control to maintain a certain level of the product quality. This can allow plant controller 702 to generate the most valuable total product yield while maintaining appropriate levels of product quality. Of course, any variation of this, the most valuable product quality is optimized while the total yield for the output streams is maintained within upper and lower bounds and/or attempts to reach a target value, can also be considered.

In some embodiments, the objective function can include any number of weights in the objective function such that the various hydrocarbon products are weighted differently when attempting to maximize the objective function. For example, if maximizing the volume of naphtha produced by HCU 116 is desired, while maximizing the volume of jet fuel is less desired, than the variable representing naphtha volume may be weighted higher than the variable representing jet fuel volume. Of course, any number of weights and prices, either alone or in combination, can be used to prioritize certain hydrocarbon products over others.

In some embodiments, the objective function may include one or more terms that quantify the error between the current or predicted values of the CV's and target or setpoint values for the CV's. In some embodiments, the objective function may include one or more terms that quantify the amount of input resources (e.g., input oil feeds) consumed by system 100 or a cost of the input resources consumed. Optimizer 718 may be configured to iteratively adjust the values of the MV's and use predictive model 716 to predict the resulting values of the CV's that will result from each set of MV's. Optimizer 718 may continue adjusting the MV's while performing the optimization process until an optimal result is reached (e.g., minimum value of the objective function). Once the optimal result is reached, the values of the MV's that resulted in the optimal result may be designated as optimal values of the MV's or optimal MV moves. The objective function in this embodiment may be the same as or similar to any of the objective functions described with reference to FIG. 5, FIG. 7, and/or FIG. 9.

Advantageously, using all of the gains matrices 1502 to train controller neural network 908, 910 may result in a controller neural network 908, 910 that is not specific to a single gains matrix or linear behavior of the plant, but rather can generate appropriate values of the MV's for any real-time state data or any linear behavior of the plant. In other words, controller neural network 908, 910 can be trained to output values of the MV's or MV moves for any value of the real-time state data corresponding to any of the divergent linear behaviors of the plant, not only values of the real-time state data that correspond to the same linear behavior of the plant as the episode of historical data used to generate a particular gains matrix. Accordingly, this allows a single controller neural network (untrained) 908 to be trained offline and then used as controller neural network (trained) 910 during online control rather than needing to generate a different instance of controller neural network (trained) 910 for each gains matrix and/or each episode of the historical data. In some embodiments, controller neural network (trained) 910 can receive one or more real time gains matrices generated by predictor neural network 904 based on the real time state data. The real-time gains matrix may inform controller neural network (trained) 910 of the current (e.g., real-time, etc.) linearized dynamics. Under this scheme, the real-time gains matrix may also be and input to controller neural network (untrained) 908 during training.

Figure 14:
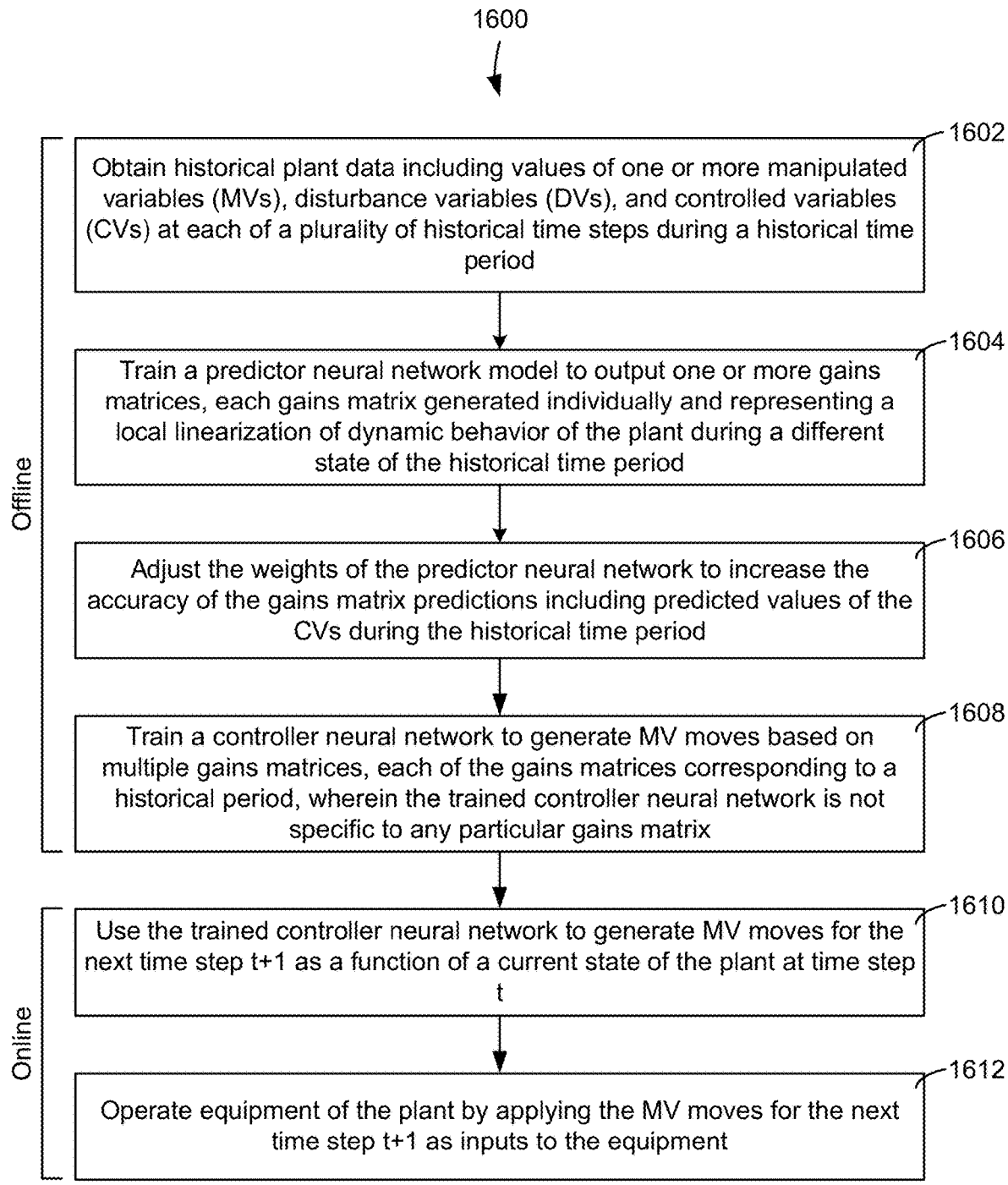
FIG. 14 is a flow diagram of a process for using multiple gains matrices to train a controller neural network to determine MV moves, which can be performed by the plant controller of FIG. 13, according to some embodiments.

Referring now to FIG. 14, a flow diagram of a process 1600 for performing online control based on multiple gain matrices is shown, according to some embodiments. Process 1600 may be performed by any of the processing circuitry described herein, such as plant controller 702. In some embodiments, process 1200 is at least partially performed by plant controller 702 as described above with reference to FIG. 13.

Process 1600 is shown to include obtaining historical plant data including values of one or more manipulated variables (MV's), disturbance variables (DV's), and controlled variables (CV's) (step 1602). Data collector 710 may be configured to receive the historical plant data from database 722. In some embodiments, the data includes MV's, DV's, and/or CV's for one or more historical time periods (e.g., historical states) of the plant (e.g., operation of system 100). Data collector 710 may be configured to receive the historical plant data from database 722. In some embodiments, the data includes MV's, DV's, and/or CV's for one or more historical time periods (e.g., historical states) of the plant (e.g., operation of system 100). For example, at the time step t (e.g., Friday @ 10:15 AM, etc.) the historical data may indicate that the temperature of the feed entering reactor 208 after being pre-heated is 460° C. (MV), the feed prior to entering heat source 202 to be pre-heated is 400° C. (DV), the temperature within reactor 208 (i.e., the temperature relating to the reactor severity, etc.) is 535° C. (MV), and the intended volume gain of HCU 116 is 2,000 m³ (TV) to maximize the value of the one or more hydrocarbon products individually and/or as a whole (CV)—the CV potentially being based on any number of factors, such as a ratio of the total amount of light hydrocarbons per the total incoming feed (e.g., 0.6, 0.7, etc.), the monetary value associated with each light hydrocarbon product, the production efficiency of each hydrocarbon product compared to one another, the production efficiency at a given reactor severity, or any combination thereof.

Process 1600 is shown to include training a predictor neural network model to output one or more gains matrices, each gains matrix generated individually and representing a local linearization of dynamic behavior of the plant during a different state or episode of the historical time period (step 1604). Process 1600 may include adjusting the weights of the predictor neural network to increase the accuracy of the gains matrix predictions including predicted values of the CVs during the historical time period (step 1606). In some embodiments, predictor neural network 904 is configured to generate a gains matrix for one or more sets of historical data. For example, each set of historical data may correspond to a particular episode of the historical data during within which the dynamic behavior of the plant is substantially linear. Each set of historical data may be used to generate a gains matrix that represents the localized linear behavior of the plant during the corresponding time period or episode. The set of gains matrices (e.g., set of gains matrices 1502) may represent a variety of different linear behaviors of the plant, giving the controller neural network (untrained) 908 more training data from a more diverse range of plant behaviors.

Process 1600 is shown to include training a controller neural network to generate MV moves based on multiple gains matrices, each of the gains matrices corresponding to a historical period, wherein the trained controller neural network is not specific to any particular gains matrix (step 1608). In some embodiments, the controller neural network (trained) 910 is trained using some or all of the gains matrices in the set of gains matrices 1502. This may allow controller neural network (trained) 910 to learn multiple types of dynamic behavior that the plant experiences. In other words, controller neural network (trained) 910 is trained using a diverse set of gains matrices, resulting in a controller neural network (trained) 910 that can be used for any state of the plant rather than only states that fall within a particular type of linear behavior.

Process 1600 is shown to include using the trained controller neural network to generate MV moves for the next time step t+1 as a function of a current state of the plant at time step t (step 1610). In some embodiments, controller neural network (trained) 910 can input the real-time state data in the model generated by the neural network of controller neural network (untrained) 908 to determine the MV adjustments required to reach one or more predicted CV values.

Process 1600 is shown to include operate equipment of the plant by applying the MV moves for the next time step t+1 as inputs to the equipment (step 1612). In some embodiments, petroleum refining equipment 726 can include a mechanism (e.g., an actuator/valve assembly, a pump device, etc.) that, when the control signals are received, adjust the flow of catalyst into reactor 208, thus adjusting the reactor severity in HCU 116 (e.g., when reactor severity is an MV, etc.).

In some embodiments, one or more reactor severity control mechanisms (e.g., modules, components, etc.) located proximate to HCU 116 or upstream/downstream of HCU 116 to adjust the reactor severity within reactor 208.

For example, one reactor severity control mechanism that can adjust the reactor severity within HCU 116 at least in part can be a valving system that adjusts the flow of catalyst into riser 204. In some embodiments, another reactor severity control mechanism can include a valving system controlling the amount of feed entering HCU 116. In some embodiments, another reactor severity control mechanism is a heat source 202 that pre-heats the incoming feed. The reactor severity control mechanisms may be part of petroleum refining equipment 726 described below, and may be configured to receive control signals from plant controller 702 to adjust one or more MV's of the plant.

In other embodiments, the control signals may be sent to heat source 202 to preheat the incoming feed prior to the feed entering HCU 116. In some embodiments, the reactor severity is the MV adjusted to reach the predicted CV, and the reactor severity is based at least in part on the incoming feed. In other embodiments, the control signals can be sent to any number of equipment configured to affect the reactor severity, such as the mechanisms described in the example above, a control system for mixing parts of the catalyst (e.g., to affect the quality of the catalyst, thereby affecting the reactor severity, etc.), or a combination thereof.

Predictor Neural Network Training

Figure 15:
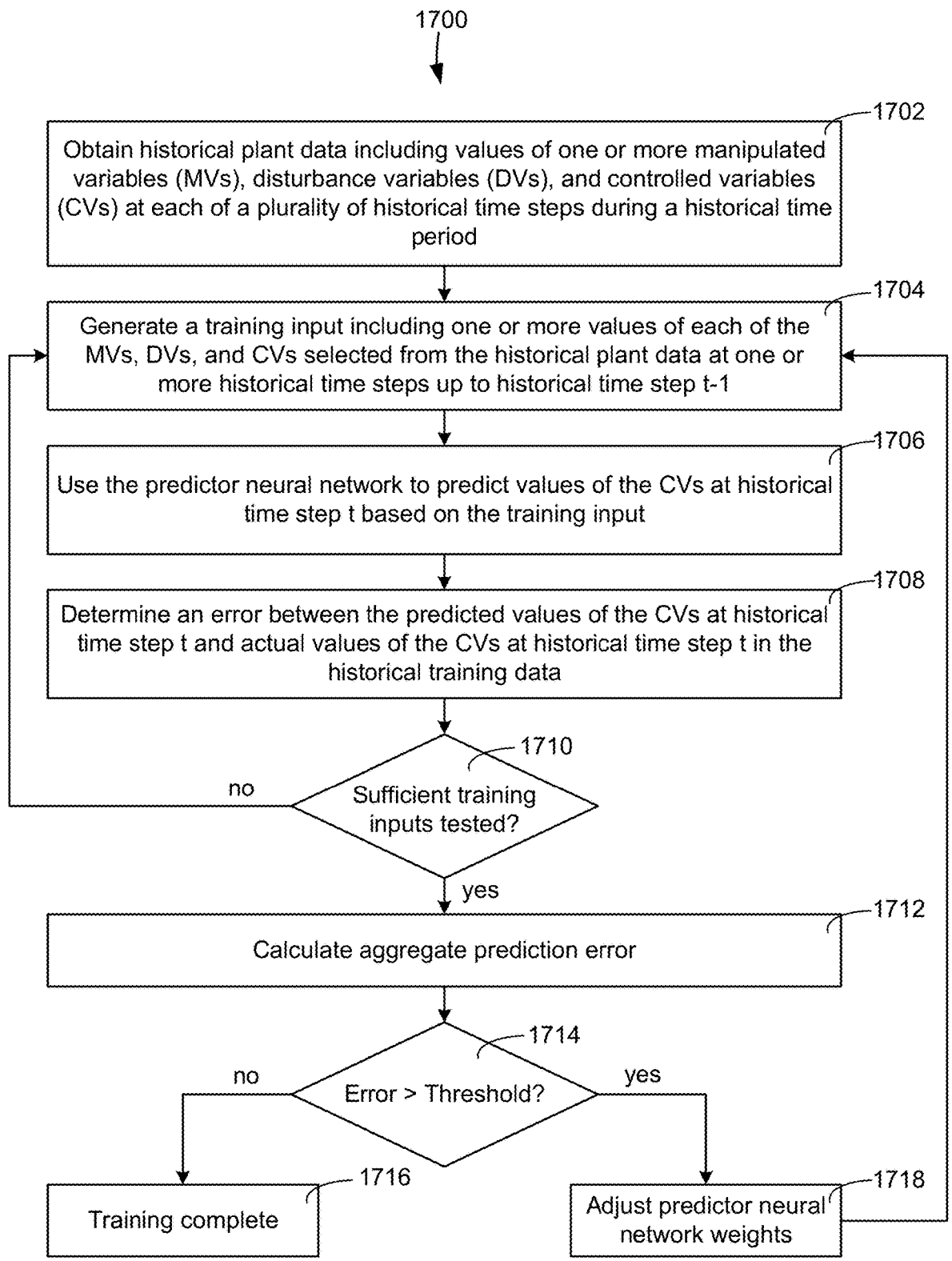
FIG. 15 is a flow diagram of a process for training a predictor neural network, which can be performed by the controllers of FIGS. 7-8, according to some embodiments.

Referring now to FIG. 15, a process 1700 for training a predictor neural network is shown, according to some embodiments. In some embodiments, process 1700 can be performed in place of or in addition to the processes described above to train the various predictor neural networks in FIGS. 9-16. Process 1700 may be performed by plant controller 702, or any of the other processing circuitry disclosed herein. Process 1700 is shown to include obtaining historical plant data including values of one or more manipulated variables (MV's), disturbance variables (DV's), and controlled variables (CV's) at each of a plurality of historical time steps during a historical time period (step 1702).

Process 1700 is shown to include generating a training input including one or more values of each of the MV's, DV's, and CV's selected from the historical plant data at one or more historical time steps up to historical time step t–1 (step 1704). The training input may include a vector of values for each of the MV's, DV's, and CV's (i.e., a time series of each variable including one or more time series values up to time step t–1), which could be provided in the form of a matrix or otherwise.

For example, the weights of predictor neural network 904 and/or bias vectors of predictor neural network 904 are initialized. After initialization, for each of a plurality of time steps, an input vector x is formed of values of CV's, MV's and/or DV's of time points t–T . . . t, and a desired output values vector y' is formed of the values of the controlled variables at time t+1. Predictor neural network 904 is applied to the input vector x and the resultant output vector y is compared to the desired output values vector y'. Based on a difference between the output vector y and the desired output values vector y', the weights of predictor neural network 904 are adjusted in a direction which reduces the difference. The magnitude of the difference is calculated using any suitable difference measure (e.g., absolute value, sum of squares, etc.). The forming of the vectors, applying predictor neural network 904, and adjusting the weights is repeated for many time points, such that predictor neural network 904 reliably models the operation of the system.

Process 1700 is shown to include using the predictor neural network to predict values of the CV's at historical time step t based on the training input (step 1706). In some embodiments, the predictor neural network is substantially similar or identical to predictor neural network 904. Predictor neural network 904 may generate a linear predictor which can include the predicted CV's of the current time step. In some embodiments, offline neural network can analyze the CV's, MV's, and DV's all for a current time step and predict the CV's for a future time step.

Process 1700 is shown to include determining an error between the predicted values of the CV's at historical time step t and actual values of the CV's at historical time step t in the historical training data (step 1708). This may be performed by implementing a certain error threshold (e.g., 5% 20%, etc.) such that if the predicted CV is within that error threshold, the prediction is considered accurate, and if the predicted CV is outside of that error threshold, the prediction is considered inaccurate. Predictor neural network 904 may require a certain subset of CV predictions to be "accurate" prior to determining that the training of predictor neural network 904 is complete. Other methods for determining the error may be considered, such as determining if the answer is within a predetermined range of values or allowing supervised learning from a technician/engineer.

Process 1700 is further shown to include determining if a sufficient number of training inputs have been tested (step 1710) In some embodiments, predictor neural network 904 is instructed to process a certain number of states, generate a certain number of accurate predictions, or a combination thereof. If this threshold has not been met, process 1700 repeats steps 1704-1708 until efficient training inputs have been tested. Once this threshold is met, process 1700 proceeds to step 1712 discussed below.

In the above example, determining the error may be performed in a manner similar to the training of predictor neural network 904, but instead of adjusting the weights of predictor neural network 904 in response to the comparison of the output vector y and the desired output values vector y', an average error equal to the difference between the vectors y, y' is calculated over one or more time points and the average is displayed to a human user and/or is compared to a threshold. If the average difference is smaller than the threshold, the predictor is considered ready for operation. Otherwise, one or more parameters of the neural network may be adjusted, such as the number of layers, the specific controlled, manipulated and/or disturbance variables used, the size of the intermediary vectors h1, h2, h3, . . . hn and/or the duration T of the time period used to form the input vector x. The training of predictor neural network 904 may then be repeated. In some embodiments predictor neural network 904 processes to values up to time t in order to estimate values of the CV's at time t+1. In other embodiments, predictor neural network 904 is applied to a vector including values of MV's at time t+1 in predicting the CV's at time t+1, so as to take into account the most recent values of the MV's.

Instead of the training based on each time point on its own, in some embodiments, the training of predictor neural network 904 is performed on sequences of time points together. For each sequence of time points, t1, t2, . . . tn, the forming of the vectors and applying of predictor neural network 904 in order to receive the values of the controlled variables, are performed for the first time point of the sequence t1. Then, instead of immediately adjusting the weights of predictor neural network 904 according to a comparison to a desired output values vector y', an input vector for the second time point t2 is created using the outputs of the predictor instead of the stored values from database 722, for the values of the controlled variables at time t1. This process is repeated until predicted values are calculated for time tn. Then, the predicted values for times t1, t2, . . . tn are compared to the stored values using a given metric and the neural network is adjusted accordingly.

In some embodiments, rather than predicting explicit values of CV's, predictor neural network 904 is trained, using any suitable method known in the art, to produce a distribution over different possibilities. For example, predictor neural network 904 may output at time point t the mean and covariance of a Gaussian distribution which reflects estimated posterior probabilities of controlled variable values in time point t+1. This allows modelling uncertainty in the behavior of the plant, to optionally be taken into account by plant controller 702.

Process 1700 is shown to include calculating aggregate prediction error (step 1712) and comparing it to a threshold (step 1714). In some embodiments, the aggregate prediction error is an error determination that takes into account several predictions made by predictor neural network 904. The aggregate prediction error could be an average of the errors resulting from each training input, an aggregate error, or any other metric. In some embodiments, the aggregate prediction error weights certain CV predictions over others based on user instruction. For example, it may be more important to accurately predict the most valuable volume gain of one or more hydrocarbon products (a CV in one embodiment) than the flow rate to reactor 208 (another CV in the embodiment) during training of predictor neural network 904.

Other methods for comparing the aggregate prediction error to a threshold may be considered, such as determining if the error is within a predetermined range of value, determining if the error is off by a predetermined percentage or allowing supervised learning from a technician/engineer to make the decision. If the aggregate prediction error is outside of the acceptable threshold, the weights of predictor neural network 904 are adjusted (1718) and steps 1704-1714 are repeated. If the aggregate prediction error is within the acceptable threshold, the training of predictor neural network 904 is completed (1716).

Controller Neural Network Training

Figure 16:
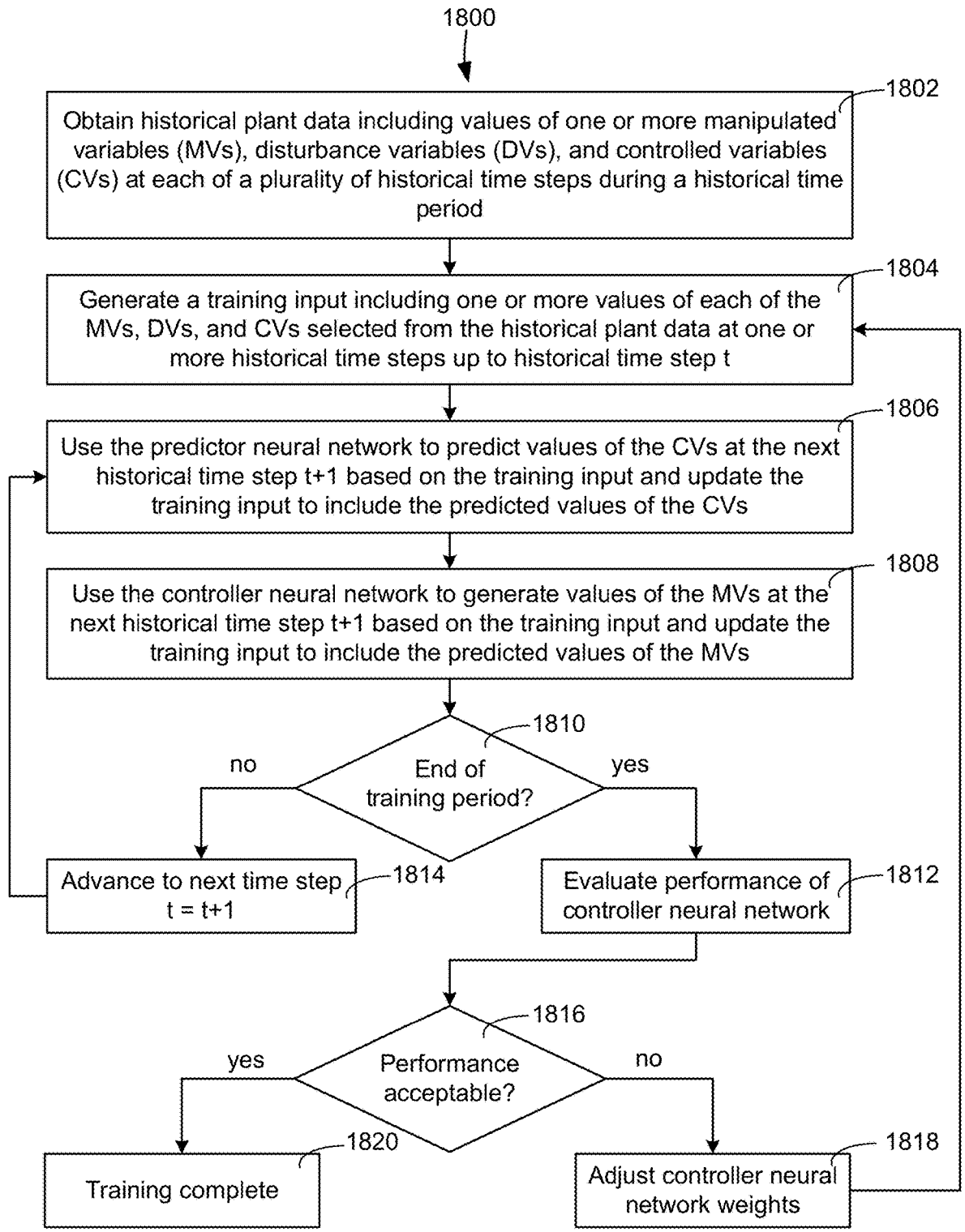
FIG. 16 is a flow diagram of a process for training a controller neural network, which can be performed by the controllers of FIGS. 7-8, according to some embodiments.

Referring now to FIG. 16, a process 1800 for training a controller neural network to generate MV's for given CV's is shown, according to some embodiments. In some embodiments, process 1700 can be performed in place of or in addition to the processes described above to train the various predictor neural networks in FIGS. 9-16. Process 1800 may be performed by plant controller 702, or any of the other processing circuitry disclosed herein. Process 1800 is shown to include obtaining historical plant data including values of one or more manipulated variables (MV's), disturbance variables (DV's), and controlled variables (CV's) at each of a plurality of historical time steps during a historical time period (step 1802).

Process 1800 is shown to include generating a training input including one or more values of each of the MV's, DV's, and CV's selected from the historical plant data at one or more historical time steps up to historical time step t (step 1804). In some embodiments, the training input may be similar to the historical states that can be used to train predictor neural network 904. The training input may also include target values for the CV's (i.e., setpoints or setpoint ranges).

Process 1800 is shown to include using the predictor neural network to predict values of the CV's at the next historical time step t+1 based on the training input and update the training input to include the predicted values of the CV's (step 1806). Predictor neural network 904 may predict the CV's for the next historical time step t+1 based on the training input, and include the predicted CV's for the future time step in the training input, which can subsequently be provided to controller neural network 1302.

Process 1800 is shown to include using the controller neural network to generate values of the MV's at the next historical time step t+1 based on the training input and update the training input to include the predicted values of the MV's (step 1808). Once controller neural network 1302 receives the training input, controller neural network 1302 can make MV predictions based on the predicted CV prediction made by predictor neural network 904. These predicted MV's (and any other relevant data (e.g., TVs)) can be added to the training input, such that all of the predictions for time step t+1 are included within the training input.

Process 1800 is shown to include determining if the training period has ended (step 1810). The training period may be based on a certain amount of predictions being made, a certain number of historical data sets/states/episodes being analyzed, data for a certain number of future time steps being predicted, or any combination thereof. If training has not been completed, process 1800 advances to the next time step t+1 (step 1814) and steps 1806-1808 are repeated until training is complete.

Once training has been completed, the performance of controller neural network 1302 is evaluated (step 1812) to determine whether the performance of controller neural network 1302 is acceptable (step 1816). In some embodiments, this step includes comparing the predicted CV's to the target values of the CV's for the corresponding time steps to calculate an average or aggregate error, or putting the predicted values of the CV's into an objective function and calculating the value of the objective function. In some embodiments, the evaluation also considers values of the MV's and/or includes penalties for the MV's deviating from predetermined ranges. If the performance of controller neural network 1302 is evaluated and considered not acceptable, process 1800 repeats steps 1804-1812 until the performance is acceptable. When the performance of controller neural network 1302 is considered acceptable, the training is complete (step 1820).

Inferentials

In some embodiments, one or more inferentials may be developed to generate, predict, calculate, or otherwise determine the values of variables as a function of other variables or data inputs (e.g., to convert a slow sampled process signal to a fast sampled variable) in oil refinery control systems. Inferentials may use one or more variable types (e.g., MV's, CV's, DV's, etc.) as inputs and may produce one or more of the same or different variable types as outputs. Inferentials may also be used in the objective function.

As described herein, any of the values of CV's, MV's and DV's can be predicted, calculated, inferred, estimated, or interpolated at any point in real-time and/or via querying historical time data. For example, a predictive model (e.g., neural network, etc.) is configured receive multiple data points (e.g., data samples, etc.) of an MV at a rate that is lower than preferred. As such, the predictive model makes an inference as to the value of the MV based on the inferential functionality performed by the predictive model. In some embodiments, the inferential functionality is performed by using linear regression, nonlinear regression weighted interpolation, extrapolation, neural networks, or any combination thereof.

In some embodiments, the sampling of CV values is slow such that inferential functionality is used to infer a value of the CV in between samples. A neural network currently implemented in the system (e.g., controller neural network 910, etc.) or a separate neural network can be configured to use regression analysis to infer the value of the CV in between samples. Of course, this is merely exemplary and any of the values MV's, CV's, and DV's, may be determined based on inferences made by one or more models performing regression analysis.

Typical inferentials for HU's and their inputs include but are not limited to: Debutanizer Bottoms RON-ROT, Btms Temp, Btms Pressure, Main Frac OVHD Pressure Compensated Temp, Cat Circ, Straight Run Naphtha Feed, Main Frac OVHD Temp, Naphtha Product Rate, Debut Tray 1 TempBB C5+ Content—Olefin flow, Main Frac OVHD Pressure, Debut Tray 9 Temp, HCO P/A, ROT, COT. Typical inferentials for HCUs and their inputs may also include Cat Gas RVP—Debut Tray 9 Temp, Main Frac OVHD Temp, Olefin flow, total cat gas flow, COT, Top PA Draw Temp, Riser Top Temperature, Primary Absorber Feed, DeC4 BTMS Temp, DeC4 OH Temp. Typical inferentials for HCUs and their inputs may also include Cat Gas T90—Main Frac OVHD Temp, HCO P/A, Debut OVHD Pressure, Total feed, Debut Tray 9 Temp.

Additionally, typical inferentials for HCUs and their inputs may also include LCO T90—Total LCO flow, slurry to storage flow, LCO Draw Temp, Main Frac OVHD Temp, HCO P/A, Main Frac OVHD Pressure. Typical inferentials for HCUs and their inputs may also include LCO Flash—COT, Total feed, Total LCO flow, LCO Draw Temp. Typical inferentials for HCUs and their inputs may also include Saturated C3s—Feed Preheat Temp, Riser Top Temperature, LPG to Merox, DeC3 BTMS Temp, DeC3 OH Temp. Typical inferentials for HCUs and their inputs may also include Unsaturated C3s—Feed Preheat Temp, Riser Top Temperature, LPG to Merox, DeC3 BTMS Temp, DeC3 OH Temp. Typical inferentials for HCUs and their inputs may also include Saturated C4s—Feed Preheat Temp, Riser Top Temperature, Primary Absorber Feed, DeC4 BTMS Temp, DeC4 OH Temp.

Additionally, typical inferentials for HCUs and their inputs may also include Unsaturated C4s—Feed Preheat Temp, Riser Top Temperature, Primary Absorber Feed, DeC4 BTMS Temp, DeC4 OH Temp. Typical inferentials for HCUs and their inputs may also include Cat Gas FBP—Main Frac OH Pressure, Main Frac OH temperature, Top PA Draw Temp, LCO Stripper Bottoms Temp, Riser Top Temperature, Primary Absorber Feed, DeC4 BTMS Temp, DeC4 OH Temp. Typical inferentials for HCUs and their inputs may also include DeC4 OH C5s—Feed Preheat Temp, Top PA Draw Temp, Riser Top Temperature, Primary Absorber Feed, DeC4 BTMS Temp, DeC4 OH Temp. Typical inferentials for HCUs and their inputs may also include Slurry Gravity—Feed Preheat Temp, Riser Top Temperature, Slurry Product Rate, Feed/Slurry Exchanger Feed Bypass Temp.

Additionally, typical inferentials for HCUs and their inputs may also include iC4s—Feed Preheat Temp, Riser Top Temperature, Primary Absorber Feed, DeC4 BTMS Temp, DeC4 OH Temp. Typical inferentials for HCUs and their inputs may also include nC4s—Feed Preheat Temp, Riser Top Temperature, Primary Absorber Feed, DeC4 BTMS Temp, DeC4 OH Temp. Typical inferentials for HCUs and their inputs may also include Octane—Feed Preheat Temp, Riser Top Temperature, Gasoline Product Rate, Dry Gas Product Rate, DeC4 BTMS Temp. Typical inferentials for HCUs and their inputs may also include LCO 90%—Total LCO flow, LCO stripper bottoms temp, Feed Flow.

In some embodiments, one or control mechanisms (e.g., modules, components, etc.) can be used to change the production of the output oil steams of HCU 116 such that, when they are adjusted by a control system, can affect the total product yield and/or product quality of one or more output streams.

In some embodiments, these control mechanisms can adjust the feed entering into HCU 116 (as described in detail above with reference to FIG. 2). The control device may include any number of valves and/or actuators, for example, than can change the rate of feed entering into HCU 116. In some embodiments, these control mechanisms (e.g., control device, etc.) are located proximate to HCU 116 or upstream/downstream of HCU 116 to adjust the reactor severity within reactor 208. For example, one control device that can adjust the reactor severity within HCU 116 at least in part can be a valving system that adjusts the flow of catalyst into riser 204. In some embodiments, another reactor severity control mechanism can include a valving system controlling the amount of feed entering HCU 116. In some embodiments, another control device mechanism can be a heat source 202 that pre-heats the incoming feed. The control device mechanisms may be part of petroleum refining equipment 726 described below, and may be configured to receive control signals from plant controller 702 to adjust one or more MV's of the plant. While not shown, in some embodiments, one or more feed control mechanisms (e.g., devices, modules, components, etc.) can be used to adjust the flow rate of feed into HCU 116. In some embodiments, a feed control device can increase or decrease the feed rate into HCU 116 using a system of actuators and/or valves. As described herein, a control device may include any number of reactor severity control devices, feed control devices, or a combination thereof.

In some embodiments, the term "constrained variable" refers to at least one of MV's and DV's. A constrained variable may be any variable that is constrained by the system, and may even include CV's. In general a constrained variable refers to a variable that is constrained (e.g., via a penalty in an objective function, etc.).

Optimization Control System with Neural Network Predictor

Figure 17:
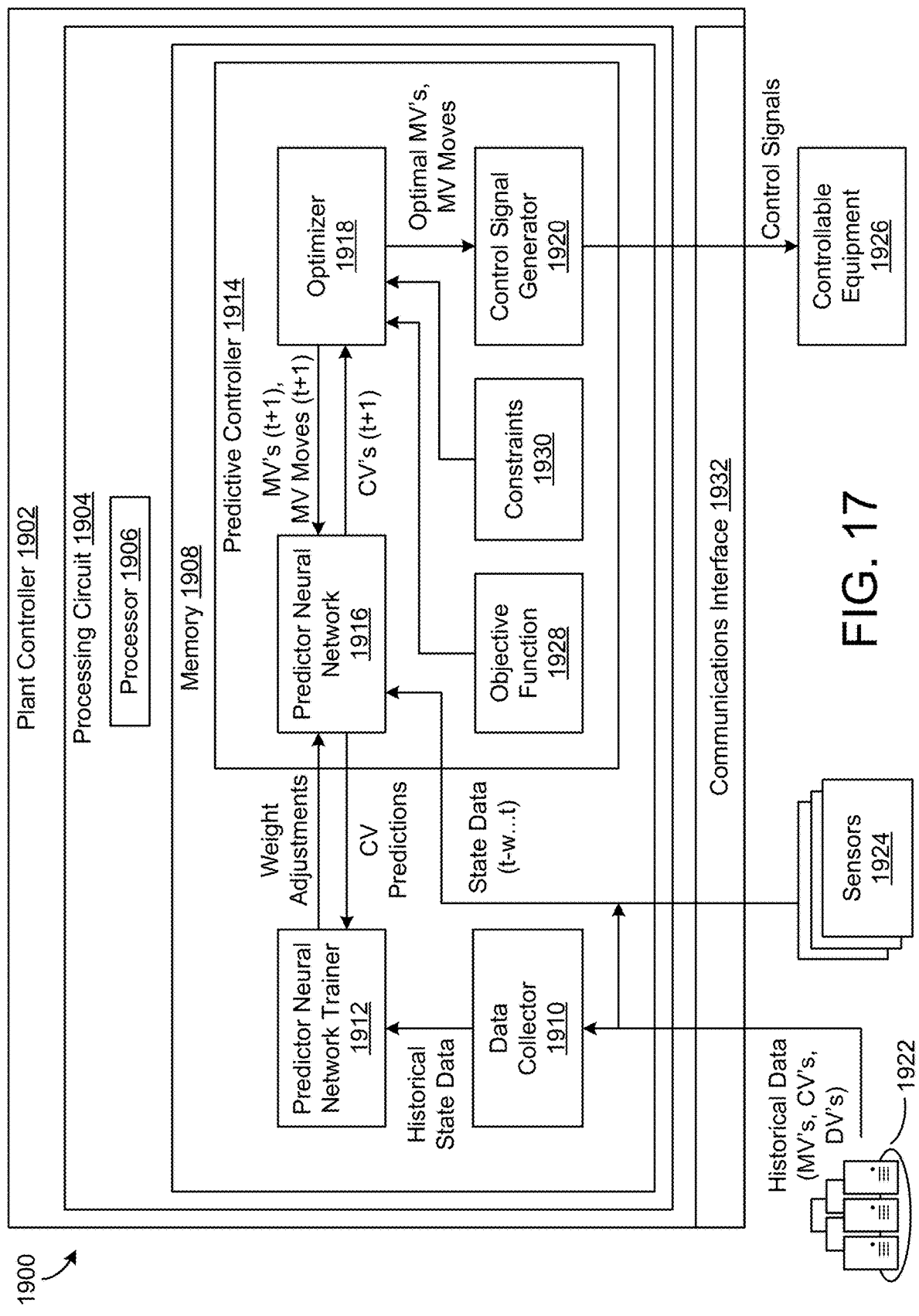
FIG. 17 is a block diagram of an optimization control system with a neural network predictor, according to some embodiments.

Referring now to FIG. 17, a block diagram of an optimization control system 1900 is shown, according to an exemplary embodiment. Control system 1900 is shown to include a plant controller 1902, a database 1922, sensors 1924, and controllable equipment 1926. Control system 1900 can be used to monitor and/or control any type of controllable equipment 1926 including, but not limited to, the equipment of system 100 (e.g., atmospheric distillation unit 110, vacuum distillation unit 112, coker subsystem 114, hydrocracking unit 116, etc.), the equipment of system 200 (e.g., heat source 202, pump 203, separator subsystem 204, etc.), petroleum refining equipment 726, and/or any other type of controllable equipment 1926 in any type of controllable system or process, whether related to petroleum refining or otherwise. Control system 1900 can be used in combination with any of the systems or equipment described in U.S. patent application Ser. No. 17/384,660 filed Jul. 23, 2021, U.S. patent application Ser. No. 17/308,474 filed May 5, 2021, U.S. patent application Ser. No. 16/950,643 filed Nov. 17, 2020, U.S. patent application Ser. No. 16/888,128 filed May 29, 2020, and/or U.S. patent application Ser. No. 15/883,114 filed Jan. 30, 2018, each of which is incorporated by reference herein in its entirety. It is contemplated that control system 1900 can be used in a wide variety of settings and is not limited to the particular examples of controllable systems described herein. The specific types of equipment that can be included in controllable equipment 1926 may depend on the particular implementation of control system 1900.

Database 1922 may be the same as or similar to database 722 as previously described. For example, database 1922 may be configured to store historical values of manipulated variables (MV's), controlled variables (CV's), disturbance variables (DV's), or any other type of variable or parameter that can be monitored and/or controlled in control system 1900. The specific MV's, CV's, and DV's stored in database 1922 may depend on the type of system or process monitored and controlled by control system 1900 and may vary across different implementations of control system 1900. In some embodiments, the variables or parameters stored in database 1922 include one or more variables measured by sensors 1924 (e.g., temperatures, pressures, flow rates, etc.), values of control signals generated by plant controller 1902 (e.g., equipment setpoints, MV moves, etc.), values of performance variables received as feedback from sensors 1924 or controllable equipment 1926, calculated variables, and/or any other type of MV, CV, or DV that can be monitored, controlled, or otherwise used to carry out the functions of control system 1900. The historical values of the MV's, CV's, and DV's can be stored in database 1922 in tabular format, time series format, in the form of data objects having one or more attributes, or any other data storage format. In some embodiments, each of the historical data stored in database 1922 may include a value attribute and a timestamp. The value attribute may indicate the value of the corresponding MV, CV, or DV, whereas the timestamp may indicate the particular time at which that value occurred. Plant controller 1902 can use the values and timestamps of the historical data to organize the historical data into episodes as previously described.

Sensors 1924 may include any type of measurement device capable of monitoring and reporting real-time values of MV's, CV's, DV's, or any other variable in control system 1900. Sensors 1924 may provide plant controller 1902 with state data, which may be the same as or similar to the real-time state data previously described with reference to FIGS. 5-16. For example, sensors 1924 may include temperature sensors, flow rate sensors, pressure sensors, lighting sensors, or any other type of sensor configured to monitor a variable state or condition of the plant, of external factors (e.g., weather data, external price data, one or more DV's, etc.), or any other states or conditions that can be used in control system 1900. In various embodiments, sensors 1924 may be standalone devices or embedded into other devices such as controllable equipment 1926. In some embodiments, sensors 1924 are configured to report calculated values and/or values of internal parameters or states of controllable equipment 1926 (e.g., values of state variables stored in memory of controllable equipment 1926). Accordingly, the real-time state data reported by sensors 1924 may include any type of measured value, calculated value, or other type of value that represents the current state of control system 1900.

Plant controller 1902 is shown to include communications interface 1932 and a processing circuit 1904. Communications interface 1932 can be or include wired or wireless communications interfaces (e.g., jacks, antennas, transmitters, receivers, transceivers, wire terminals, etc.) for conducting data communications. In various embodiments, communications via communications interface 1932 can be direct (e.g., local wired or wireless communications) or via a communications network (e.g., a WAN, the Internet, a cellular network, etc.). For example, communications interface 1932 can include an Ethernet card and port for sending and receiving data via an Ethernet-based communications link or network. In another example, communications interface 1932 can include a Wi-Fi transceiver for communicating via a wireless communications network. In another example, communications interface 1932 can include cellular or mobile phone communications transceivers. Communications interface 1932 can be communicably connected to processing circuit 1904 such that processing circuit 1904 and the various components thereof can send and receive data via communications interface 1932.

Processing circuit 1904 is shown to include a processor 1906 and memory 1908. Processor 1906 can be implemented as a general purpose processor, an application specific integrated circuit (ASIC), one or more field programmable gate arrays (FPGAs), a group of processing components, or other suitable electronic processing components. Memory 1908 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. Memory 1908 can be or include volatile memory or non-volatile memory. Memory 1908 can include database components, object code components, script components, or any other type of information structure for supporting the various activities and information structures described in the present disclosure. Memory 1908 may be communicably connected to processor 1906 via processing circuit 1904 and may include computer code for executing (e.g., by processing circuit 1904 and/or processor 1906) one or more processes described herein.

Memory 1908 is shown to include several components (e.g., software components, database components, executable code, data/information structures, etc.) that provide plant controller 1902 with the information, data, functionality, or other inputs/resources to execute the various control processes described herein. These components are shown to include a data collector 1910, a predictor neural network trainer 1912, and a predictive controller 1914. Data collector 1910 may be the same as or similar to data collector 710, as described with reference to FIGS. 5-16. For example, data collector 1910 may be configured to collect or receive one or more data sets for controlling some or all components of control system 1900. Data collector 1910 is shown receiving historical data including MV's, CV's, and DV's. MV's may be variables that can be adjusted to keep the CV's at their intended set points or otherwise affect the values of the CV's (e.g., drive the CV's toward values that optimize an objective function). MV's may include control signals that are provided as inputs to controllable equipment 1926, setpoints that are provided as inputs to controllers, or other variables that can be directly manipulated (e.g., adjusted, set, modulated, etc.) by plant controller 1902. The specific types of MV's may depend on the implementation of control system 1900 (e.g., the specific type of system or process controlled by control system 1900).

CV's may quantify the performance or quality of one or more variables affected by the controlled system or process. Examples of CV's may include measured values (e.g., temperature, pressure, energy consumption, etc.), calculated values (e.g., efficiency, coefficient of performance (COP), etc.), or any other values that characterize the performance or state of a controllable system or process. Some CV's may be quantities that are not capable of being directly manipulated by plant controller 1902 (e.g., highest value volume gain, etc.), but rather can be affected by manipulating corresponding MV's that affect the CV's (e.g., increasing the reactor severity of HCU 116, etc.). Examples of CV's in the context of system 100 include organic sulfur and/or nitrogen concentrations in the reactor effluent (e.g., feed being processed by HCU 116, etc.), naphtha product distillation boiling points, naphtha product sulfur concentration, naphtha product flash point, diesel product cloud point, diesel product distillation boiling points, diesel product flash point, diesel product sulfur concentration, UCO distillation boiling points, product stream flows, conversion ratios, conversion levels, hydraulic constraints, any product stream or intermediate flow, or any combination thereof. CV's may include the volumes, flow rates, mass, or other variables that quantify the amount of the various output oil products produced by system 100. However, it should be understood that the specific types of CV's are dependent upon the specific type of system or process. Like the MV's, the specific types of CV's may depend on the implementation of control system 1900 (e.g., the specific type of system or process controlled by control system 1900).

DV's may represent disturbances or other factors that can cause CV's to deviate from their respective set points. Examples of DV's include measurable or unmeasurable disturbances to the system such as outside air temperature, outside air humidity, uncontrolled sources of heat transfer, etc. DV's are typically not controllable, but may be measurable or unmeasurable depending on the type of disturbance. Any of the variables described as MV's may be DV's in some embodiments in which the system cannot control those variables. Similarly, any of the variables described as DV's may be MV's in some embodiments in which the system can control those variables. Examples of DV's in the context of system 100 can include feed rate, feed composition, hydrogen flow rate, reactor pressure, catalyst age, separation and/or fractionation section temperatures and pressures, reactor temperature differentials, intermediate flow rates, upstream unit process operating conditions, or any combination thereof. However, it should be understood that the specific types of DV's are dependent upon the specific type of system or process. Like the MV's and the CV's, the specific types of DV's may depend on the implementation of control system 1900 (e.g., the specific type of system or process controlled by control system 1900).

Data collector 1910 may be configured to separate the collected data into one or more episodes (e.g., based on the timestamps of the historical data). In some embodiments, the historical data represents a variety of different control situations over different periods of time. The full set of historical data may represent the non-linear behavior of the system over a relatively long time period (e.g., days, months, years, etc.). Each sample of the historical data may include values for all of the MV's, CV's DV's, and potentially other variables at an instantaneous time or over a time step having a predetermined duration (e.g., 1 second, 1 minute, 15 minutes, 1 hour, etc.). Each sample of the historical data may include a timestamp indicating a time at which the sample was collected and a value that defines a corresponding "state" of the system at the time the sample was collected. In some embodiments, the samples of historical data are separated into "episodes" which include the historical data for a window of time. These episodes may be predetermined prior to being received at plant controller 1902 (e.g., the start times, end times, and/or duration of each episode may be predefined) or can be automatically determined within plant controller 1902 based on attributes of the historical data and/or an operating condition of system 1900 at a time when the historical data were collected. In some embodiments, the historical data are separated into episodes as part of the neural network training process performed by predictor neural network trainer 1912, described in greater detail below.

In some embodiments, the episodes generated by data collector 1910 encompass a period of time large enough to include multiple samples of the historical data (e.g., multiple time steps, etc.), but small enough such that the behavior of the plant (i.e., the controlled system or process) is substantially linear within a given episode. In other words, each episode may include a portion of the historical data that, when viewed in isolation, indicates substantially linear system behavior within the episode. In other embodiments, the episodes generated by data collector 1910 may encompass a period of time long enough to capture non-linear behavior of the plant. In some embodiments, the historical data include not only multiple samples of the variables that affect the performance of controllable equipment 1926 (e.g., DV's, MV's, etc.), but also multiple samples of the variables that are affected by operating controllable equipment 1926 (e.g., CV's).

Predictor neural network trainer 1912 may be the same as or similar to predictor neural network trainer 902, as described with reference to FIGS. 7-16. For example, predictor neural network trainer 1912 may be configured to receive the historical data from data collector 1910 and train predictor neural network 1916 by adjusting the weights of predictor neural network 1916. Predictor neural network trainer 1912 may also be configured to receive the CV predictions of predictor neural network 1916 to facilitate training and determine how the weights need to be adjusted. For example, predictor neural network trainer 1912 may adjust or tune the weights of predictor neural network 1916 such that the CV predictions generated by predictor neural network 1916 comply or align with the values of the CV's in the historical data. An example of a process which can be performed by predictor neural network trainer 1912 to train predictor neural network 1916 is described in greater detail with reference to FIG. 15.

Figure 20:
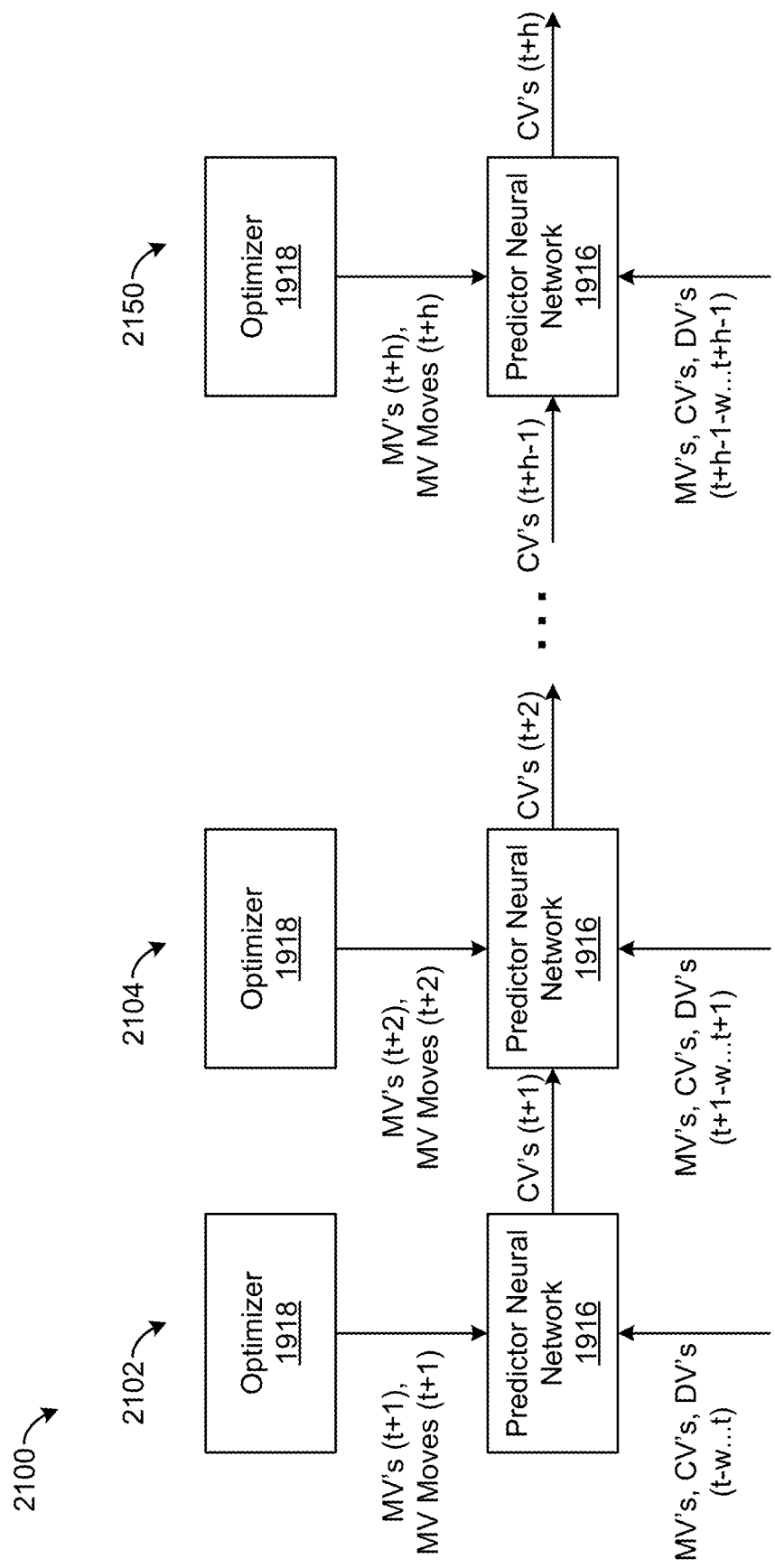
FIG. 20 is a block diagram illustrating a process for using a predictor neural network to predict values of controlled variables as a function of a given set of manipulated variables and a history of state data of the plant, according to some embodiments.

Predictor neural network 1916 may be the same as or similar to predictor neural network 904 as described with reference to FIGS. 7-16. For example, predictor neural network 1916 can be any type of neural network model configured to predict a set of CV's for a given time step based on a set of MV's for the given time step and a set of MV's, DV's, and/or CV's for a period of time leading up to the given time step. The CV predictions may be outputs of predictor neural network 1916, whereas the MV's, DV's, and CV's for the previous time period and the values of the MV's at the given time step may be provided as inputs to predictor neural network 1916. After the training process is completed, predictor neural network 1916 can be used to provide CV predictions for a future time step (e.g., time step t+1) as a function of the state of the plant leading up to the future time step (e.g., a set of values of the CV's, MV's, DV's, etc. for a time window beginning at time step t−w and ending at time step t, where w is the duration of the time window) and a set of planned or proposed values of the MV's for the future time step (e.g., time step t+1). This forward-looking prediction process is illustrated in FIG. 20. However, during the training process, predictor neural network trainer 1912 may use predictor neural network 1916 to predict the CV's of historical time steps using the MV's, DV's, and/or CV's in the set of historical data as an input to predictor neural network 1916.

In some embodiments, predictor neural network trainer 1912 is configured to determine an error between the predicted values of the CV's at historical time step t and actual values of the CV's at historical time step t in the historical training data. This may be performed by implementing an acceptable error threshold (e.g., 1%, 5% 20%, etc.) such that if the predicted CV is within that error threshold, the prediction is considered accurate, whereas if the predicted CV is outside of that error threshold, the prediction is considered inaccurate. Predictor neural network trainer 1912 may require the CV predictions to be accurate (e.g., within the acceptable error threshold) prior to determining that the training of predictor neural network 1916 is complete. Some or all of the techniques, steps, or processes used by predictor neural network trainer 902 to train predictor neural network 904, as described with reference to FIGS. 7-16, can be performed by predictor neural network trainer 1912 to train predictor neural network 1916.

In some embodiments, predictor neural network trainer 1912 is configured to train predictor neural network 904 by performing multiple training episodes. Each training episode may include receiving predictor neural network 904 with a given set of weights and repeatedly applying predictor neural network 904 to historical plant data (e.g., a set of historical training data for a historical time period) including values of the MV's, CV's, and DV's up to a historical time step t−1 and values of the MV's for a historical time step t to predict values of the CV's at the historical time step t for each of a set of historical time steps t. The predictions for each time step t may be based on the values of the CV's predicted by predictor neural network 904 for a preceding time step t−1 in combination with the historical plant data up to time step t. In some embodiments, the historical plant data used by predictor neural network 904 to make the predictions for each time step t include values of the MV's for time step t and values of the DV's and CV's from time steps t−1 and before. For example, the predicted values of the CV's for a first historical time step t may be fed back into predictor neural network 904 for the next historical time step t+1 and used in combination with historical values of the MV's at time step t+1 and historical values of the DV's and the MV's from time step t and one or more preceding time steps to predict the values of the CV's at time step t+1. This process may be repeated for each time step in the training episode to produce a trajectory of predicted CV values over the duration of the training episode. The trajectory of predicted CV values can then be compared with the actual values of the CV's over the duration of the training episode and the weights of predictor neural network 904 can be adjusted to reduce the errors between the predicted and actual values of the CV's. These and other details of the episode-based training process are described in greater detail in U.S. Pat. No. 11,200,489 granted Dec. 14, 2021, the entire disclosure of which is incorporated by reference herein.

Predictive controller 1914 can be configured to use predictor neural network 1916 to perform an optimization process to generate control signals for controllable equipment 1926. In some embodiments, predictive controller 1914 is a model predictive controller that executes a model predictive control (MPC) process to generate the control signals. MPC is a type of predictive control that uses a predictive model to predict future states of the plant (i.e., the controlled system or process) based on the state of the plant up to a given time and the inputs provided to the plant over a time horizon beginning at the given time and ending at a later time. MPC can be performed over a selected time horizon which includes a plurality of time steps (e.g., from time step t to time step t+h, where h is the duration of the time horizon). The state of the plant up to time step t−1 and the inputs to the plant at time step t are used to predict the state of the plant at time step t (i.e., how the state of the plant will evolve between time steps t−1 and t). The predicted state of the plant at time step t is then used in combination with the state of the plant up to time step t−1 and the predicted or planned inputs to the plant at time step t+1 to predict the state of the plant at time step t+1. This process is repeated for each time step within the time horizon, using the actual or previously predicted state of the plant at one or more previous time steps and the planned or predicted inputs to the plant at that time step to predict the state of the plant at that time step. Accordingly, MPC can be used to predict how the state of the plant will evolve over time as a function of the predicted or planned inputs to the plant over a given time period.

In the context of control system 1900, predictive controller 1914 can be configured to predict the values of the CV's at each time step (e.g., time step t+1) within the time horizon based on the state of the plant at or leading up to the previous time step (e.g., the values of the CV's, MV's and DV's for the time window from time step t−w to time step t) and the inputs to the plant at time step t+1 (e.g., the values of the MV's at time step t+1). The values of the MV's at each time step can be controlled by predictive controller 1914 and together form the set of decision variables in the predictive optimization process. For example, if the time horizon includes ten time steps (i.e., t=1 ... 10) and the set of MV's includes three decision variables (i.e., $MV_a$, $MV_b$, and $MV_c$), the set of decision variables used in the predictive optimization process may include thirty decision variables (i.e., $MV_{a,1}$, $MV_{a,2}$, ..., $MV_{a,10}$, $MV_{b,1}$, $MV_{b,2}$, ..., $MV_{b,10}$, $MV_{c,1}$, $MV_{c,2}$, ..., $MV_{c,10}$). The values of the DV's at each time step may not be controllable by predictive controller 1914 and thus may be excluded from the set of decision variables, but can be forecasted for the duration of the time horizon and provided as inputs to the predictive optimization process. Each DV can be provided as a time series or vector of forecasted values (e.g., a value of each DV for each time step). The values of the CV's at each time step can be predicted by predictive controller 1914 (e.g., using predictor neural network 1916) based on the values of the MV's at that time step and the values of the MV's, CV's, and DV's at the previous time step and/or leading up to the previous time step. The trajectory of the CV's over time represents the predicted evolution of the state of the plant in response to a planned or forecasted trajectory of the MV's and the DV's over the duration of the time horizon.

Predictive controller 1914 is shown to include predictor neural network 1916, optimizer 1918, objective function 1928, constraints 1930, and control signal generator 1920. In brief overview, predictor neural network 1916 can be configured to predict the values of the CV's at time step t+1 based on a given (e.g., planned, proposed, hypothetical, etc.) set of MV moves or values of the MV's at time step t+1 provided by optimizer 1918 and the values of the state data from time step t−w to time step t (e.g., values of the CV's, MV's, and DV's from time steps t−w ... t), which may be received from sensors 1924 and/or other data sources. Objective function 1928 may define the value of a control objective which may include one or more sub-objectives (e.g., volume/mass of products generated, price/value of products generated, error between predicted values of CV's and their target values, etc.) as a function of the MV's, CV's and/or DV's over the duration of the optimization time period (i.e., the duration of the time horizon h).

Optimizer 1918 may perform a predictive optimization process (e.g., a model predictive control process) to optimize objective function 1928 over the duration of the time horizon h subject to constraints 1930. The predictive optimization process may include optimizer 1918 providing predictor neural network 1916 with a proposed set of values for the decision variables (e.g., the MV moves or values of the MV's over the time horizon) and using predictor neural network 1916 to predict the values of the CV's that will result from the proposed set of values for the decision variables. Optimizer 1918 may use objective function 1928 to determine the value of the control objective as a function of the proposed MV's, predicted CV's, and DV's over the duration of the optimization period. Optimizer 1918 may iteratively adjust the proposed MV moves using an optimization algorithm (e.g., zero-order algorithms, first-order algorithms, second-order algorithms, etc.) with the goal of optimizing (e.g., minimizing or maximizing) the value of objective function 1928. The result of the predictive optimization process is a set of optimal MV moves or values of the MV's (i.e., values of the decision variables in the predictive optimization). Control signal generator 1920 may receive the optimal MV moves or optimal values of the MV's from optimizer 1918 and use the optimal MV moves or values of the MV's to generate control signals for controllable equipment 1926. These and other features of predictive controller 1914 are described in greater detail below.

Figure 18:
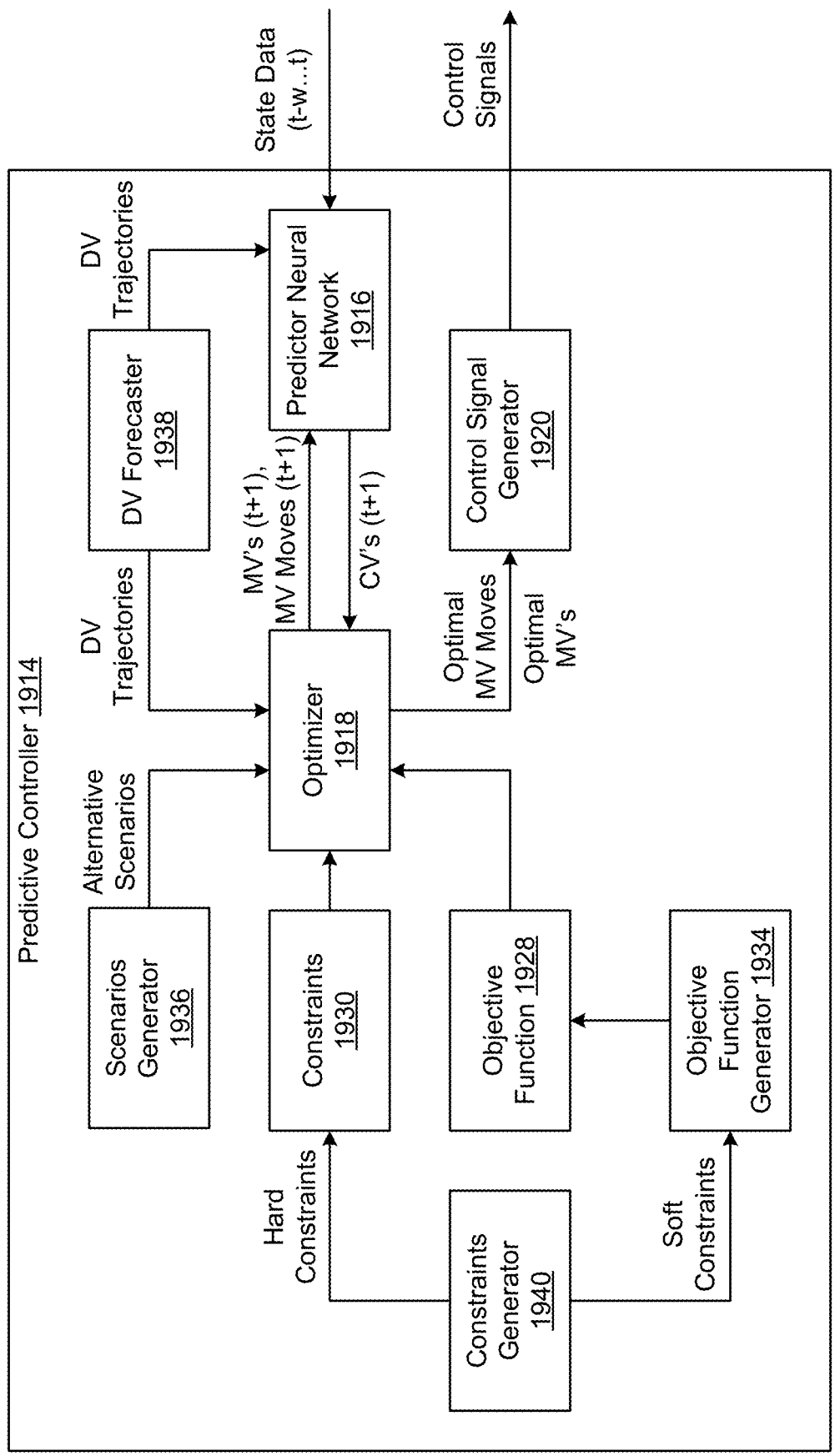
FIG. 18 is a block diagram illustrating the predictive controller of the control system of FIG. 17 in greater detail, according to some embodiments.

Referring now to FIG. 18, a block diagram illustrating predictive controller 1914 in greater detail is shown, according to an exemplary embodiment. In addition to the components shown in FIG. 17, predictive controller 1914 is shown to include a constraints generator 1940, an objective function generator 1934, a scenarios generator 1936, and a DV forecaster 1938.

Constraints generator 1940 may be configured to generate the set of constraints 1930 used by optimizer 1918 in the predictive optimization process. Constraints 1930 may define ranges of permissible values (e.g., upper bounds, lower bounds, allowed ranges, etc.), for any of the MV's, CV's, or other variables in the predictive optimization process (e.g., custom variables calculated based on the MV's, CV's and/or DV's). In some embodiments, constraints 1930 are based on operating limits of controllable equipment 1926. For example, constraints 1930 may limit the MV's to values within the minimum and maximum operating limits (e.g., maximum capacities, minimum capacities, etc.) of controllable equipment 1926 to ensure that the predictive optimization produces a feasible result that can realistically be achieved by controllable equipment 1926. In some embodiments, constraints 1930 impose limits on the rate of change of the MV's, CV's, or other variables in the predictive optimization process. For example, constraints 1930 may specify that the value of a given MV, CV, or other variable cannot change by an amount that exceeds a threshold rate of change (e.g., maximum increase or decrease between time steps). In some embodiments, constraints 1930 specify that the value of a given MV, CV, or other variable cannot change direction (e.g., change from increasing to decreasing or change from decreasing to increasing relative to the previous time step) if less than a threshold amount of time has elapsed since the last change in direction occurred.

In some embodiments, constraints 1930 impose a limit on the number of changes in direction of a given variable or require the change in the value of the variable between time steps to be substantially uniform (e.g., increase or decrease at a substantially uniform or linear rate), or impose any other limit on the geometry of the trajectory of the variable over time. For example, the trajectory of a given variable over time can be defined as a piecewise linear function that includes several linear segments connected at their endpoints. The linear segments may have different slopes that indicate different rates of change of the variable. Each linear segment may span a length of time (e.g., an amount of time that elapses between a range of time steps) over which the rate of change or slope of the given variable is consistent (e.g., a consistent slope of zero indicating no change, a consistent positive or negative slope indicating a positive or negative rate of change). Constraints 1930 may impose an upper limit on the number of linear segments within the trajectory of the given variable over time. Similarly, constraints 1930 may define a maximum number of times that the rate of change or slope of the given variable is permitted to change within the selected time horizon (e.g., a maximum number of "bend points" between segments of different slopes). Constraints 1930 such as these will cause optimizer 1918 to select values of the MV's that result in the permitted number (or fewer) of linear segments or slope changes if implemented as hard constraints, or encourage optimizer 1918 to select values of the MV's that result in fewer changes in slope of the given variable over time if implemented as soft constraints or penalties.

In some embodiments, constraints 1930 require the values of the MV's, CV's, or other variables to be equal to a corresponding target value, or above, below, or within a threshold range of the corresponding target value (e.g., +/−5%, +/−10%, +/−25%, etc.). For example, constraints generator 1940 may receive target values for one or more of the MV's and may generate constraints 1930 that require the MV's to be equal to or within a predetermined threshold of the corresponding target values. In some embodiments, constraints 1930 define relationships between two or more of the MV's, DV's, CV's or other variables (e.g., a given MV must be less than another MV, the product of two MV's must be greater than a threshold, the value of a MV must be equal to a given function of one or more of the other MV's and/or DV's, etc.). The relationships defined by constraints 1930 can represent the physical realities of the plant (e.g., constraints that reflect laws of physics, chemistry, etc.) or may represent operational requirements that are desired to be achieved but are not mandated by physical laws.

In some embodiments, the relationship between the inputs to predictor neural network 1916 and the outputs of predictor neural network 1916 are implemented as constraints 1930. For example, predictor neural network 1916 can be used to define or establish a constraint that requires the CV's at time step t+1 to be related to the values of the MV's or MV moves at time step t+1 and the values of the MV's, DV's, and CV's defined by the state data from time step t−w to time step t. In other words, constraints 1930 may require the values of the CV's at time step t+1 to be related to the values of the MV's at time step t+1 and the values of the MV's, DV's, and CV's at previous time steps, where the relationships between the MV's, DV's, and CV's required by constraints 1930 reflect the predictions made by predictor neural network 1916. In some embodiments, objective function 1928 is a function of the CV's at time t+1 as well as future time steps of the optimization period. Accordingly, the relationships or constraints provided by predictor neural network 1916 allow optimizer 1918 to determine the values of the MV's that optimize objective function 1928 by relating the values of the MV's proposed by optimizer 1918 for the duration of the optimization period to the predicted values of the CV's used in objective function 1928.

Constraints generator 1940 may be configured to impose the generated constraints as hard constraints and/or soft constraints. Hard constraints may be implemented as equality constraints or inequality constraints on the predictive optimization process. Hard constraints must be satisfied by any solution produced by optimizer 1918 and cannot be violated when performing the predictive optimization process. Conversely, soft constraints may be implemented as penalties on objective function 1928 (e.g., additional terms in objective function 1928) that impact the overall value of objective function 1928 when the constraint is violated. For example, a soft constraint may be defined as a penalty that is incurred when the value of a CV deviates from its corresponding target value by more than a given amount or otherwise violates a given condition based on the value of the CV. Soft constraints can be violated when performing the predictive optimization process, but optimizer 1918 is discouraged from selecting values of the MV's that result in soft constraint violations because any such violations will affect the value of objective function 1928. However, optimizer 1918 may generate a solution that violates the soft constraints, for example, when no feasible solution exists without violating the soft constraints or if the penalties resulting from the soft constraints do not outweigh the benefits (e.g., other terms of objective function 1928 outweigh the penalties).

Objective function generator 1934 can be configured to generate objective function 1928 for use in the predictive optimization process. Objective function 1928 may be a function J that defines the value of one or more control objectives as a function of the MV's, CV's, DV's, or other variables in the predictive optimization process. Several examples of objective functions that could be generated and used are described above with reference to FIG. 5. Several additional examples are provided below. In some embodiments, objective function 1928 may depend on the values of the MV's, CV's and/or DV's for all of the time steps within the optimization period. For example, objective function 1928 may be the summation or mean of a set of terms calculated for every time step (i.e., a step-wise objective) based on the values of the MV's, CV's, and/or DV's for that time step.

In some embodiments, objective function 1928 is a minimization or maximization function based on the values of the CV's over the duration of the optimization period. One example of objective function 1928 is:

$$J = \sum_{t=1}^{h} CV_{1,t} + CV_{2,t} + CV_{3,t} + \ldots + CV_{n,t}$$

where $CV_{1,t}$, $CV_{2,t}$, $CV_{3,t}$ ... $CV_{n,t}$ are the values of the n CV's at time step t and the summation adds the values of the CV's at each time step t=1 ... h within the optimization period. In this example, each of the CV's may represent the volume, mass, or flow rate of a given product generated by the plant such that the summation represents the total volume, mass, or aggregate flow rate (respectively) over the duration of the optimization period.

Another example of objective function 1928 is:

$$J = \sum_{t=1}^{h} w_{1,t} CV_{1,t} + w_{2,t} CV_{2,t} + w_{3,t} CV_{3,t} + \ldots + w_{n,t} CV_{n,t}$$

where $CV_{1,t}$, $CV_{2,t}$, $CV_{3,t}$, ... $CV_{n,t}$ are the values of the n CV's at time step t, $w_{1,t}$, $w_{2,t}$, $w_{3,t}$, ... $w_{n,t}$ are weights (e.g., prices, relative importance of each CV, etc.) of the n CV's at time step t, and the summation adds the weighted values of the CV's at each time step t=1 ... h within the optimization period. For an embodiment in which the weights are prices or costs, the summation represents the total price or value of the products generated by the plant over the duration of the optimization period.

In some embodiments, objective function 1928 includes one or more penalty terms that act as soft constraints. Objective function generator 1934 can be configured to modify the base objective function J to add penalties as illustrated in the following example:

$$J_a = J - \sum_{t=1}^{h} |CV_{1,t} - TV_{1,t}| + |CV_{2,t} - TV_{2,t}| + |CV_{3,t} - TV_{3,t}| + \ldots + |CV_{n,t} - TV_{n,t}|$$

where $CV_{1,t}$, $CV_{2,t}$, $CV_{3,t}$, ... $CV_{n,t}$ are the values of the n CV's at time step t, $TV_{1,t}$, $TV_{2,t}$, $TV_{3,t}$, ... $TV_{n,t}$ are the target values of the n CV's at time step t, J is the initial objective function without penalties (e.g., any of the objective functions described above), and $J_a$ is the augmented objective function 1928 after accounting for the penalties. In this example, the summation represents the total penalty incurred as a result of the CV's deviating from their corresponding target values over the duration of the optimization period, which subtracts from the overall value of the augmented objective function $J_a$ to be maximized. Thus, optimizer 1918 may be discouraged from incurring penalties in the interest of maximizing the value of $J_a$. If the optimization problem is alternatively formulated as a minimization problem, the penalties may add to the overall value of the augmented objective function $J_a$ (i.e., $J_a$=J+penalties) such that optimizer 1918 may be discouraged from incurring the penalties in the interest of minimizing the value of $J_a$. In some embodiments, square functions (e.g., $(CV_{1,t}-TV_{1,t})^2$) can be used instead of absolute value functions (e.g., $|CV_{1,t}-TV_{1,t}|$) for the penalties.

Another example of penalty terms that act as soft constraints is shown in the following equation:

$$J_a = J - \sum_{t=1}^{h} \delta_{1,t} + \delta_{2,t} + \delta_{3,t} + \ldots + \delta_{n,t}$$

where $\delta_{1,t}+\delta_{2,t}+\delta_{3,t}+\ldots+\delta_{n,t}$ are amounts by which the values of the corresponding CV's (i.e., $CV_{1,t}$, $CV_{2,t}$, $CV_{3,t}$, ... $CV_{n,t}$) deviate from a desired range. The desired range can be set by adding inequality constraints to the set of constraints 1930 as follows:

$$\delta_{1,t} \geq CV_{1,t} - CV_{1,max}$$

$$\delta_{1,t} \geq CV_{1,min} - CV_{1,t}$$

$$\delta_{1,t} \geq 0$$

where $CV_{1,max}$ is the maximum desired value of the first controlled variable $CV_1$, $CV_{1,min}$ is the minimum desired value of the first controlled variable $CV_1$, and the set of inequalities ensures that optimizer 1918 sets the value of $\delta_{1,t}$ to a non-negative value that represents either the amount by which $CV_{1,t}$ exceeds $CV_{1,max}$ or the amount by which $CV_{1,t}$ is less than $CV_{1,min}$. Similar constraints can be added for the other CV's.

While a few examples of augmented objective functions $J_a$ are provided to illustrate the concept of soft constraints or penalties, it should be appreciated that any type of soft constraint, penalty, or other term can be added to the objective function J to account for any of a variety of control objectives or constraints, as may be desirable based on the particular implementation of control system 1900. In general, objective function 1928 can include any number of smaller objectives (e.g., terms within objective function 1928) or sub-goals of various types. Sub-goals can be applied to any MV, CV, or custom variable calculated on the basis of the MV's, CV's, and/or DV's. Sub-goals can include soft constraints such as upper and lower bounds, target values, value maximization or minimization, or any other function that can be expressed in terms of the MV's, CV's, DV's, and/or any other information.

In some embodiments, objective function generator 1934 formulates objective function 1928 in the form of the optimization problem to be solved by optimizer 1918. In general, the predictive optimization problem may have the following form:

$$\max_{MV} J_a \text{ or } \min_{MV} J_a \text{ s.t. constraints}$$

which denotes that the goal of the predictive optimization is to either maximize or minimize the value of the objective function $J_a$ 1928 by adjusting the values of the manipulated variables (MV's) subject to a set of constraints. The MV's are the decision variables in the predictive optimization process and are adjusted by optimizer 1918 to drive objective function 1928 toward a maximum or minimum value. The predictive optimization is performed subject to the constraints generated by constraints generator 1940, which can be implemented as hard constraints or soft constraints as previously described.

DV forecaster 1938 can be configured to forecast a trajectory of each of the DV's for the duration of the optimization period. As noted above, DV's may not be directly controllable, but can be predicted or forecasted prior to performing the predictive optimization process and provided as an input to optimizer 1918 and/or predictor neural network 1916. DV forecaster 1938 can generate a trajectory or time series of each DV which includes a value of each DV at each time step of the optimization period. In some embodiments, DV forecaster 1938 provides the forecasted DV trajectories in vector or matrix form, as shown in the following equations:

$$DV_1 = [DV_{1,1}, \quad DV_{1,2}, \quad DV_{1,3}, \quad \ldots \quad DV_{1,h}]$$

$$DV_2 = [DV_{2,1}, \quad DV_{2,2}, \quad DV_{2,3}, \quad \ldots \quad DV_{2,h}]$$

$$\vdots$$

$$DV_m = [DV_{m,1}, \quad DV_{m,2}, \quad DV_{m,3}, \quad \ldots \quad DV_{m,h}]$$

where $DV_1$ is a vector containing a value for the first DV at each time step t=1 ... h, $DV_2$ is a vector containing a value for the second DV at each time step t=1 ... h, and $DV_m$ is a vector containing a value for the m'th DV at each time step t=1 . . . h, where m is the total number of DV's forecasted.

DV forecaster 1938 can use any of a variety of techniques to forecast the values of the DV's over the duration of the optimization period. In some embodiments, DV forecaster 1938 extrapolates the values of the DV's from a historical pattern (e.g., historical values of the DV's prior to the beginning of the optimization period) using linear extrapolation, polynomial extrapolation, conical extrapolation, geometric extrapolation, constant extrapolation (e.g., holding the values of the DV's at their most recent known values, setting the DV's to their average values over several past time steps), or any other extrapolation technique. In some embodiments, DV forecaster 1938 applies noise to the extrapolated or forecasted values of the DV's. For example, DV forecaster 1938 may add a noise signal (e.g., a random signal, a normally distributed or Gaussian noise signal, etc.) to the extrapolated or forecasted values of the DV's. In some embodiments, DV forecaster 1938 uses an auto-regressive model to predict the trajectory of the DV's based on their historical pattern. In some embodiments, the auto-regressive model is based on a neural network. The DV trajectories generated by DV forecaster 1938 can be provided as inputs to predictor neural network 1916 for use in predicting the CV's. The DV trajectories generated by DV forecaster 1938 can also be provided as inputs to optimizer 1918 for use in formulating the predictive optimization problem. For example, optimizer 1918 can use the DV trajectories to define the values of any DV's in objective function 1928 and/or constraints 1930.

Scenarios generator 1936 can be configured to generate multiple different alternative scenarios to be considered by optimizer 1918. Each of the alternative scenarios may include some or all of the information discussed above including, for example, a set of values for the DV trajectories, constraints 1930, target values of the CV's, or any other information needed to fully define the optimization problem. Each scenario may be a fully defined instance of the predictive optimization problem. However, each of the alternative scenarios may represent slightly different conditions and thus may include different values (relative to the other scenarios) for some or all of the DV trajectories, constraints 1930, target values of the CV's, or any other information needed to fully define the optimization problem. In some embodiments, scenarios generator 1936 generates the alternative scenarios by adding different noise signals to a base set of the DV trajectories, constraints 1930, or target values of the CV's (e.g., different random noise signals, different normally distributed or Gaussian noise signals, etc.), by applying dropout to the neurons of predictor neural network 1916 (e.g., noise in internal neurons), or otherwise generating multiple different and alternative sets of values for the various inputs to optimizer 1918. By generating alternative scenarios in this manner, scenarios generator 1936 can mimic the stochastic nature of the target environment and account for a variety of different scenarios that could potentially occur. This may result in a more robust control policy relative to any single scenario.

Optimizer 1918 may perform the predictive optimization process for each of the alternative scenarios independently to generate a scenario-specific set of values for the MV's or MV moves that are optimal for that particular scenario. Optimizer 1918 may then combine (e.g., average, sum, aggregate, etc.) the scenario-specific results of the predictive optimization process to generate the final values for the MV's or MV moves. In some embodiments, optimizer 1918 combines the scenario-specific results of the predictive optimization process using a weighted average that weighs each scenario by the likelihood of that scenario occurring. For example, optimizer 1918 can calculate an amount by which the inputs for each scenario (i.e., the DV trajectories, constraints 1930, target values of the CV's, etc.) deviate from an average or mean of the set of scenarios (e.g., as a standard deviation, variance, etc.). Optimizer 1918 can assign a greater weight to the scenarios that are closer to the average or mean, and a lower weight to the scenarios that are farther from the average or mean (e.g., using a normally distributed set of weights that follow a bell-shaped curve centered at that average or mean scenario). In some embodiments, optimizer 1918 can assign a greater weight to the scenarios that result in fewer changes in the values of the MV's or fewer piecewise linear segments in the trajectories of the MV's over time (as described above) and assign a lesser weight to the scenarios that result in more changes in values of the MV's or more piecewise linear segments in the trajectories of the MV's over time, relative to the other scenarios. In general, optimizer 1918 may assign each scenario a score or weight based on any of these or other factors and use the weights to combine the scenario-specific results of the predictive optimization process.

One example of an equation that can be used to combine the scenario-specific results of the predictive optimization process is:

$$MV_t = \sum_{i=1}^{p} w_i MV_{i,t}$$

where $MV_t$ is the final value of a given MV at time t, $MV_{i,t}$ is the scenario-specific value of that same MV for the ith scenario generated by performing the predictive optimization using the scenario-specific inputs for the ith scenario, $w_i$ is the weight assigned to the ith scenario, and p is the total number of scenarios. The set of weights $w_1 \ldots w_p$ may sum to one in some embodiments. This same equation can be applied to each of the MV's in the predictive optimization process to combine the results of the scenario-specific predictive optimization processes into a final result that accounts for all of the scenarios generated by scenarios generator 1936.

Although one equation that can be used by optimizer 1918 is provided as an example, it should be understood that this example is non-limiting and it is contemplated that optimizer 1918 may combine the scenario-specific results using any of a variety of combination strategies. Another combination strategy that could be used by optimizer 1918 includes removing outlier scenarios or outlier values of the MV's (e.g., by evaluating the scenarios or MV's using an outlier detection or clustering technique) and averaging the remaining scenarios or values of the MV's after outlier removal. In some embodiments, optimizer 1918 combines the scenario-specific results of the predictive optimization process using a neural network that is trained to produce a trajectory of the MV's or MV moves (referred to herein as an "input sequence") that achieves the best performance when applied to all scenarios. The input sequence that achieves the best performance can be determined by scoring the results of each input sequence in each scenario using the objective function 1928 and selecting the input sequence that results in the most optimal value of the objective function 1928 when averaged over the scenarios.

Alternatively, rather than running the predictive optimization process for each scenario individually to produce scenario-specific results and then combining the scenario-specific results, optimizer 1918 may perform a combined predictive optimization process that considers all of the scenarios together in a single optimization. For example, optimizer 1918 may combine (e.g., sum, average, etc.) all of the scenario-specific control objectives (e.g., each of the scenario-specific objective functions or terms within each of the scenario-specific objective functions) to generate a single objective function 1928 that encompasses all of the scenarios. In some embodiments, optimizer 1918 combines or considers all of the scenario-specific results or scenario-specific objective functions by selecting the scenario that has the minimum or maximum value of the corresponding scenario-specific objective function (i.e., the worst case scenario or best case scenario) so as to perform the subsequent steps using the worst case scenario or best case scenario. Optimizer 1918 may then execute the predictive optimization process using the combined objective function 1928 to generate an input sequence that optimizes the combined objective function 1928. This technique is a robust control method (e.g., stochastic control or stochastic optimal control) as it considers many different scenarios that could potentially occur and produces an input sequence that is optimal in view of the uncertainty in which scenario will actually occur over the duration of the time horizon.

Optimizer 1918 can be configured to execute the predictive optimization process using any of a variety of optimization techniques. Examples of optimization techniques that can be used by optimizer 1918 include zero-order, first-order, or second-order optimization algorithms. In some embodiments, optimizer 1918 performs the optimization process iteratively to converge on the optimal set of values for the MV's or MV moves as the iterations progress.

In some embodiments, the optimization problem solved by optimizer 1918 is non-convex. Traditional optimization-based control systems such as those conventionally used for model predictive control (MPC) typically apply convex optimization, which is the process of minimizing convex functions over convex sets. In a convex function, a straight line connecting any two points on a graph of the function does not lie below the graph of the function between the two points (i.e., all points on the line lie at or above the graph of the function, regardless of which two points on the graph of the function are selected as the end points). Similarly, in a convex set, a straight line connecting any two points within the convex set is contained entirely within the convex set (i.e., all points along the line are contained within the convex set). In convex optimization, the feasible solution set is a convex set and every stationary point is also a global minimum. Non-convex optimization is significantly more challenging than convex optimization due to the potential existence of stationary points that are not necessarily the global minimum and/or feasible solution sets that are non-convex sets. While convex optimization problems can be solved exactly (i.e., reaching a global minimum) using standard MPC algorithms, non-convex optimization problems typically cannot.

In some embodiments, optimizer 1918 performs the predictive optimization process using a non-convex optimization algorithm. For example, optimizer 1918 may adjust the values of the MV's to drive objective function 1928 toward its optimal value using a non-convex optimization algorithm. Examples of non-convex optimization algorithms that can be used by optimizer 1918 include zero-order optimization algorithms (i.e., any optimization algorithm that does not rely on first-order information such as first derivatives or gradients, second-order information such as the Hessian, or higher-order information about the optimized function) such as genetic algorithms, first-order optimization algorithms (i.e., any algorithm that uses at least one first-derivative or gradient of the optimized function and does not use second-order or higher-order information about the optimized function) such as gradient descent, and second-order optimization algorithms (i.e., any algorithm that uses at least one second-derivative, Hessian, or other second-order information and does not use higher-order information about the optimized function) such as Newton's method.

In some embodiments, optimizer 1918 is configured to determine the number of iterations to use and/or when to stop the iterative optimization process by monitoring results of the predictive optimization and evaluating whether the results are converging or have sufficiently converged. For example, optimizer 1918 may determine that the predictive optimization has sufficiently converged if the result of the most recent iteration deviates by less than a threshold (e.g., a percentage change, a change by less than a predetermined amount, etc.) relative to the previous iteration. In response to detecting such convergence, optimizer 1918 may stop the iterative process and use the most recent set of results as the final results. The ability to adaptively determine when to stop the predictive optimization process may ensure that optimizer 1918 performs a sufficient number of iterations to allow for convergence on the optimal values, but does not waste computational effort on unnecessary iterations once the results have sufficiently converged.

Upon completing the predictive optimization process, optimizer 1918 may provide the optimal values of the decision variables to control signal generator 1920. As discussed above, the decision variables may include values for each of the MV's at each of the time steps within the optimization period. For example, if the optimization period includes ten time steps (i.e., t=1 ... 10) and the set of MV's includes three decision variables (i.e., $MV_a$, $MV_b$, and $MV_c$), the set of decision variables may include thirty decision variables (i.e., $MV_{a,1}$, $MV_{a,2}$, ..., $MV_{a,10}$, $MV_{b,1}$, $MV_{b,2}$, ..., $MV_{b,10}$, $MV_{c,1}$, $MV_{c,2}$, ..., $MV_{c,10}$). In some embodiments, optimizer 1918 provides control signal generator 1920 with a set of MV moves in addition to or in place of the optimal values of the MVs. The MV moves may indicate an amount by which the MV's should be changed relative to their previous values. For example, if optimizer 1918 determines that the optimal value of a given MV at time step t−1 is $x_{t-1}$ and the optimal value of that same MV at time step t is $x_t$, optimizer 1918 may calculate the optimal MV move from time step t−1 to time step t as $x_t-x_{t-1}$. Control signal generator 1920 can use the optimal values of the MV's and/or the optimal MV moves to generate the control signals for controllable equipment 1926.

In some embodiments, optimizer 1918 repeats the predictive optimization process at each time step to generate a new trajectory of values for each of the MV's and/or MV moves. Each trajectory may include a value of each of the MV's and/or MV moves for each of the time steps within the optimization period. For example, at time step t=1, optimizer 1918 may perform the predictive optimization process to generate a set of MV trajectories and/or MV moves for each time step from time step t=1 to time step t=h, where h is the total number of time steps within the optimization period. The MV trajectories can be provided in vector or matrix form, as shown in the following equations:

$$MV_1 = [MV_{1,1}, \quad MV_{1,2}, \quad MV_{1,3}, \quad \ldots \quad MV_{1,h}]$$
$$MV_2 = [MV_{2,1}, \quad MV_{2,2}, \quad MV_{2,3}, \quad \ldots \quad MV_{2,h}]$$
$$\vdots$$
$$MV_n = [MV_{n,1}, \quad MV_{n,2}, \quad MV_{n,3}, \quad \ldots \quad MV_{n,h}]$$

where $MV_1$ is a vector containing a value for the first MV or MV move at each time step t=1 ... h, $MV_2$ is a vector containing a value for the second MV or MV move at each time step t=1 ... h, and MV, is a vector containing a value for the n'th MV or MV move at each time step t=1 ... h, where n is the total number of MV's in the predictive optimization process. Control signal generator 1920 can use the optimal values of the MV's at time step t=1 and/or the optimal MV moves at time step t=1 to generate the control signals for controllable equipment 1926 at time step t=1. Control signal generator 1920 may ignore the optimal values of the MV's and/or MV moves for time steps t=2 ... h or store the optimal values of the MV's and/or MV moves for time steps t=2 ... h for later use.

At the next time step t=2, optimizer 1918 may shift the optimization period forward in time by one time step (i.e., beginning at time step t=2 and ending at time step h+1) and repeat the predictive optimization process to generate a set of MV trajectories and/or MV moves for each time step from time step t=2 to time step t=h+1, where h is the total number of time steps within the optimization period. The optimization period still has the same number of time steps, but is shifted forward in time relative to the previous optimization. The MV trajectories can be provided in vector or matrix form, as shown in the following equations:

$$MV_1 = [MV_{1,2}, \quad MV_{1,3}, \quad MV_{1,4}, \quad \ldots \quad MV_{1,h+1}]$$
$$MV_2 = [MV_{2,2}, \quad MV_{2,3}, \quad MV_{2,4}, \quad \ldots \quad MV_{2,h+1}]$$
$$\vdots$$
$$MV_n = [MV_{n,2}, \quad MV_{n,3}, \quad MV_{n,4}, \quad \ldots \quad MV_{n,h+1}]$$

where $MV_1$ is a vector containing a value for the first MV or MV move at each time step t=2 ... h+1, $MV_2$ is a vector containing a value for the second MV or MV move at each time step t=2 ... h+1, and MV, is a vector containing a value for the n'th MV or MV move at each time step t=2 ... h+1, where n is the total number of MV's in the predictive optimization process. Control signal generator 1920 can use the optimal values of the MV's at time step t=2 and/or the optimal MV moves at time step t=2 to generate the control signals for controllable equipment 1926 at time step t=2. Control signal generator 1920 may ignore the optimal values of the MV's and/or MV moves for time steps t=3 ... h+1 or store the optimal values of the MV's and/or MV moves for time steps t=3 ... h+1 for later use.

Optimizer 1918 can repeat the process of shifting the optimization period forward in time and performing another run of the predictive optimization process to provide control signal generator 1920 with an updated trajectory of MV's and/or MV moves at the beginning of each time step. Each time an updated trajectory of MV's and/or MV moves is received, control signal generator 1920 can implement the control decisions for the first time step in the updated trajectory (i.e., use the values of the MV's and/or MV moves for the first time step to generate the control signals for controllable equipment 1926) and ignore the control decisions for the remaining time steps in the updated trajectory. When another updated trajectory is received at the beginning of the next time step, control signal generator 1920 can overwrite the previously received trajectories of the MV's and/or MV moves with the most recent trajectories received from optimizer 1918. In some embodiments, control signal generator 1920 can selectively ignore or modify the control decisions provided by optimizer 1918 for certain MV's (e.g., preventing certain MV's from being changed, overriding the values of certain MV's from optimizer 1918 with predetermined values, etc.) based on a set of rules stored by control signal generator 1920, while implementing the control decisions provided by optimizer 1918 for other MV's without modification. For example, one rule that could be used by control signal generator 1920 may define a threshold for a number of MV moves and/or a magnitude of MV moves for one or more of the MV's within a given time period and may cause control signal generator 1920 to ignore subsequent moves of the applicable MV's if the threshold has been exceeded until the time period has expired or the rule is no longer satisfied. As another example, control signal generator 1920 may receive input from a user (e.g., a plant operator) and selectively ignore the control decisions from optimizer 1918 for one or more of the MV's if the user has provided a manual override for the MV's or otherwise indicated that the automatic control decisions generated by optimizer 1918 should be ignored. Such user input can be received in real-time or ahead-of-time for some or all of the time steps in a future time period.

As an alternative to overwriting the previously received trajectories each time a new trajectory is received, control signal generator 1920 may store in memory the full trajectories of the MV's and/or MV moves received at each time step. Control signal generator 1920 may merge the updated trajectory with the previously received trajectory or trajectories such that the value of a MV or MV move for a given time step evolves as additional trajectories containing that time step are received. For example, control signal generator 1920 may calculate an average of all of the values of a given MV received for a given time step and use the average value to generate the control signals for controllable equipment 1926. In various embodiments, control signal generator 1920 can calculate the average value as simple average or a weighted average (e.g., an exponentially weighted average) which weighs more recently received trajectories more heavily. By the time a given time step (e.g., time step t=x) becomes the first time step within a newly received trajectory, control signal generator 1920 will have received h trajectories that include the given time step (i.e., an initial trajectory that includes time step t=x as the last time step, an updated trajectory that includes time step t=x as the penultimate time step, etc.), where h is the number of time steps within the optimization period and the hth trajectory includes time step t=x as the first time step. Each successive trajectory may be shifted forward in time by one time step such that the given time step moves from the end of the trajectory (i.e., a trajectory ending at time step t=x) to the beginning of the trajectory (i.e., a trajectory beginning at time step t=x). Control signal generator 1920 can merge or combine the h values of the MV or MV move for the given time step t=x to calculate the value of the MV or MV move that is used to generate the control signals for controllable equipment 1926.

Figure 19:
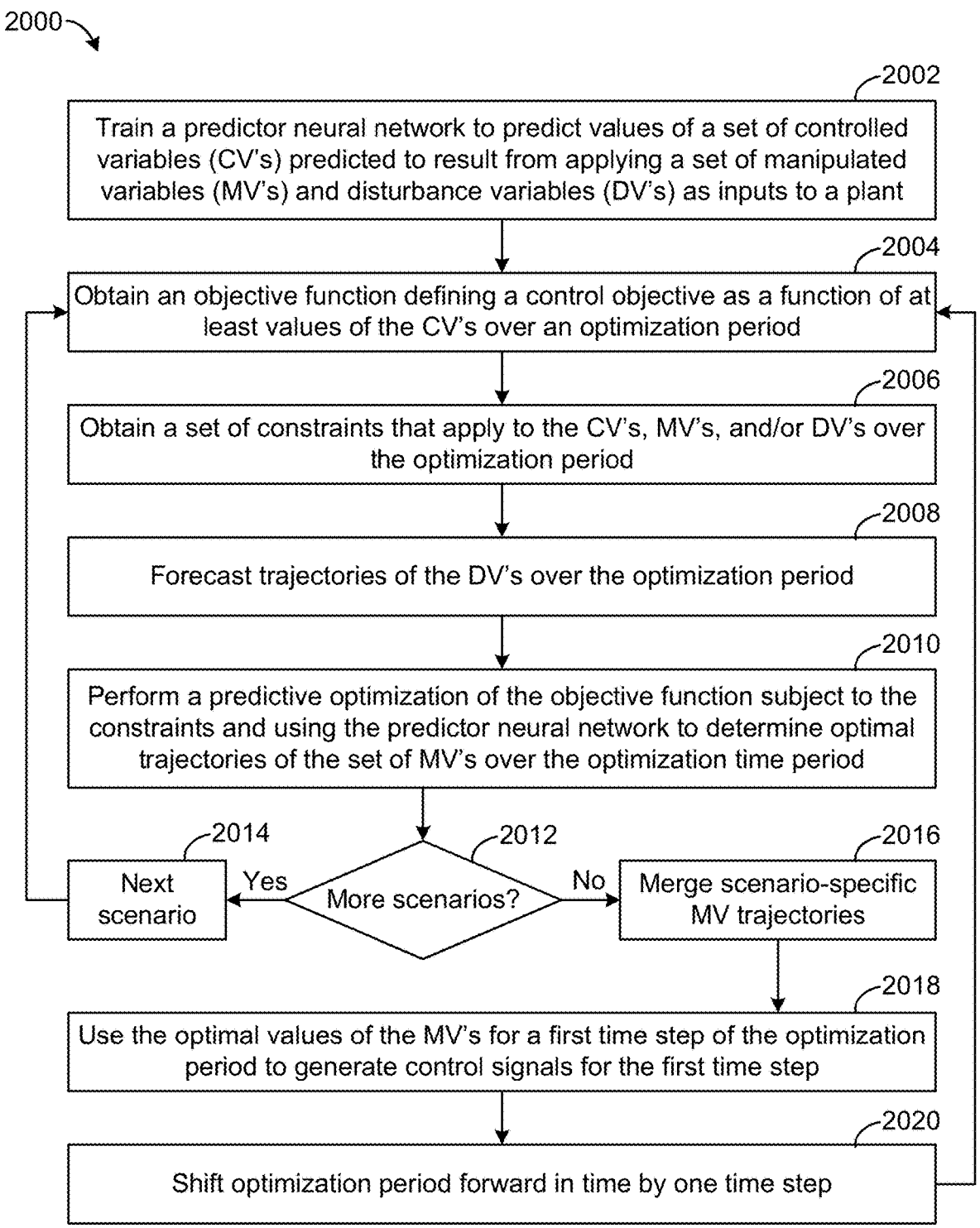
FIG. 19 is a flowchart of a process which can be performed by the optimization control system of FIGS. 17-18, according to some embodiments.

Referring now to FIG. 19, a flowchart of a process 2000 for monitoring and controlling a plant is shown, according to an exemplary embodiment. The plant can include any type of controllable system or process including, but not limited to, system 100 (e.g., atmospheric distillation unit 110, vacuum distillation unit 112, coker subsystem 114, hydrocracking unit 116, etc.), system 200 (e.g., heat source 202, pump 203, separator subsystem 204, etc.), petroleum refining equipment 726, and/or any other type of controllable system or process, whether related to petroleum refining or otherwise. Process 2000 can be performed by any of the systems or devices described herein. In some embodiments, process 2000 is performed by plant controller 1902 or any components thereof (e.g., data collector 1910, predictor neural network trainer 1912, predictive controller 1914, etc.) as described with reference to FIGS. 17-18. In various embodiments, one or more steps of process 2000 can be omitted without departing from the teachings of the present disclosure.

Process 2000 is shown to include training a predictor neural network to predict values of a set of controlled variables (CV's) predicted to result from applying a set of manipulated variables (MV's) and disturbance variables (DV's) as inputs to a plant (step 2002). In some embodiments, step 2002 is performed by predictor neural network trainer 1912 as described with reference to FIG. 17. For example, step 2002 may include obtaining historical data from data collector 1910 and training predictor neural network 1916 by adjusting the weights of predictor neural network 1916. Step 2002 may include using the CV predictions of predictor neural network 1916 to make adjustments to the weights. For example, step 2002 may include adjusting or tuning the weights of predictor neural network 1916 such that the CV predictions generated by predictor neural network 1916 comply or align with the values of the CV's in the historical data. An example of a process which can be performed to accomplish step 2002 is described in greater detail with reference to FIG. 15.

Predictor neural network 1916 can be any type of neural network model configured to predict a set of CV's for a given time step based on a set of MV's for the given time step (i.e., a set of decision variables for the given time step) and a set of MV's, DV's, and/or CV's leading up to the given time step (i.e., past state data for the plant). The CV predictions may be outputs of predictor neural network 1916, whereas the MV's for the given time step and the MV's, DV's, and CV's leading up to the given time step may be provided as inputs to predictor neural network 1916. After the training process is completed, predictor neural network 1916 can be used to provide CV predictions for a future time step (e.g., time step t+1) as a function of a set of MV's for the future time step (e.g., time step t+1) and the state of the plant leading up to the future time step (e.g., a set of values of the CV's, MV's, DV's, etc. from time step t-w to time step t). However, the training process in step 2002 may use predictor neural network 1916 to predict the CV's of historical time steps using the MV's, DV's, and/or CV's in the set of historical data as an input to predictor neural network 1916.

In some embodiments, step 2002 includes determining an error between the predicted values of the CV's at historical time step t and actual values of the CV's at historical time step t in the historical training data. This may be performed by implementing an acceptable error threshold (e.g., 1%, 5% 20%, etc.) such that if the predicted CV is within that error threshold, the prediction is considered accurate, whereas if the predicted CV is outside of that error threshold, the prediction is considered inaccurate. Step 2002 may require the CV predictions to be accurate (e.g., within the acceptable error threshold) prior to determining that the training of predictor neural network 1916 is complete. Some or all of the techniques, steps, or processes described with reference to FIGS. 17-18, can be performed to train predictor neural network 1916 in step 2002.

Process 2000 is shown to include obtaining an objective function defining a control objective as a function of values of the CV's over an optimization period (step 2004). In some embodiments, step 2004 is performed by objective function generator 1934 to generate or obtain objective function 1928, as described with reference to FIGS. 17-18. Objective function 1928 may be any function that defines the value of one or more control objectives as a function of the MV's, CV's, DV's, or other variables in the predictive optimization process. Several examples of objective functions that could be obtained in step 2004 are described above with reference to FIGS. 5 and 17-18. In some embodiments, objective function 1928 depends on the values of the MV's, CV's and/or DV's for all of the time steps within the optimization period. For example, objective function 1928 may be the summation or mean of a set of terms calculated for every time step (i.e., a step-wise objective) based on the values of the MV's, CV's, and/or DV's for that time step. In various embodiments, objective function 1928 can be a differentiable function or a non-differentiable function.

In some embodiments, step 2004 includes adding soft constraints or penalties to objective function 1928. Any type of soft constraint, penalty, or other term can be added to objective function 1928 to account for any of a variety of control objectives or constraints, as may be desirable based on the particular implementation of process 2000. In general, objective function 1928 can include any number of smaller objectives (e.g., terms within objective function 1928) or sub-goals of various types. Sub-goals can be applied to any MV, DV, or custom variable calculated on the basis of the MV's, CV's, and/or DV's. Sub-goals can include soft constraints such as upper and lower bounds, target values, value maximization or minimization, or any other function that can be expressed in terms of the MV's, CV's, DV's, and/or any other information.

Process 2000 is shown to include obtaining a set of constraints that apply to the CV's, MV's, and/or DV's over the optimization period (step 2006). In some embodiments, step 2006 is performed by constraints generator 1940 as described with reference to FIGS. 17-18 to generate or obtain constraints 1930. Constraints 1930 may define ranges of permissible values (e.g., upper bounds, lower bounds, allowed ranges, etc.), for any of the MV's, CV's, or other variables in the predictive optimization process (e.g., custom variables calculated based on the MV's, CV's and/or DV's). In some embodiments, constraints 1930 are based on operating limits of controllable equipment 1926. For example, constraints 1930 may limit the MV's to values within the minimum and maximum operating limits (e.g., maximum capacities, minimum capacities, etc.) of controllable equipment 1926 to ensure that the predictive optimization produces a feasible result that can realistically be achieved by controllable equipment 1926. In some embodiments, constraints 1930 impose limits on the rate of change of the MV's, CV's, or other variables in the predictive optimization process. For example, constraints 1930 may specify that the value of a given MV, CV, or other variable cannot change by an amount that exceeds a threshold rate of change (e.g., maximum increase or decrease between time steps). In some embodiments, constraints 1930 specify that the value of a given MV, CV, or other variable cannot change direction (e.g., change from increasing to decreasing or change from decreasing to increasing relative to the previous time step) if less than a threshold amount of time has elapsed since the last change in direction occurred. In some embodiments, constraints 1930 impose a limit on the number of changes in direction of a given variable or require the change in the value of the variable between time steps to be substantially uniform (e.g., increase or decrease at a substantially uniform or linear rate), or impose any other limit on the geometry of the trajectory of the variable over time (e.g., an upper limit on the number of linear segments or bend points in the trajectory of the variable over time).

In some embodiments, constraints 1930 require the values of the MV's, CV's, or other variables to be equal to a corresponding target value, or above, below, or within a threshold range of the corresponding target value (e.g., +/−5%, +/−10%, +/−25%, etc.). For example, step 2006 may include receiving target values for one or more of the CV's and generating constraints 1930 that require the CV's to be equal to or within a predetermined threshold of the corresponding target values. In some embodiments, constraints 1930 define relationships between two or more of the MV's, DV's, CV's or other variables (e.g., a given CV must be less than another CV, the product of two CVs must be greater than a threshold, the value of a CV must be equal to a given function of one or more of the MV's and/or DV's, etc.). The relationships defined by constraints 1930 can represent the physical realities of the plant (e.g., constraints that reflect laws of physics, chemistry, etc.) or may represent operational requirements that are desired to be achieved but are not mandated by physical laws.

In some embodiments, the relationship between the inputs to predictor neural network 1916 and the outputs of predictor neural network 1916 are implemented as constraints 1930. For example, predictor neural network 1916 can be used to define or establish a constraint that requires the MV's or MV moves at time step t+1 to be related to the values of the MV's at time step t+1 and the values of the MV's, DV's, and CV's defined by the state data from time step t−w to time step t. In other words, constraints 1930 may require the values of the CV's at time step t+1 to be related to the values of the MV's at time step t+1 and the values of the MV's, DV's, and CV's at previous time steps according to the relationship defined by predictor neural network 1916. In some embodiments, objective function 1928 is a function of the CV's at time t+1 as well as future time steps of the optimization period. Accordingly, the relationships or constraints provided by predictor neural network 1916 allow process 2000 to determine the values of the MV's that optimize objective function 1928 by relating the values of the MV's proposed by optimizer 1918 for the duration the optimization period to the predicted values of the CV's used in objective function 1928.

Step 2006 may include imposing the generated constraints as hard constraints and/or soft constraints. Hard constraints may be implemented as equality constraints or inequality constraints on the predictive optimization process. Hard constraints must be satisfied by any solution produced by optimizer 1918 and cannot be violated when performing the predictive optimization process. Conversely, soft constraints may be implemented as penalties on objective function 1928 (e.g., additional terms in objective function 1928) that impact the overall value of objective function 1928 when the constraint is violated. For example, a soft constraint may be defined as a penalty that is incurred when the value of a CV deviates from its corresponding target value by more than a given amount or otherwise violates a soft constraint. Soft constraints can be violated when performing the predictive optimization process, but optimizer 1918 is discouraged from selecting values of the MV's that result in soft constraint violations because any such violations will affect the value of objective function 1928. However, process 2000 may generate a solution that violates the soft constraints, for example, when no feasible solution exists without violating the soft constraints or if the penalties resulting from the soft constraints do not outweigh the benefits (e.g., other terms of objective function 1928 outweigh the penalties).

Process 2000 is shown to include forecasting trajectories of the DV's over the optimization period (step 2008). In some embodiments, step 2008 is performed by DV forecaster 1938 as described with reference to FIGS. 17-18. For example, step 2008 may include forecasting a trajectory of each of the DV's for the duration of the optimization period. As noted above, DV's may not be directly controllable, but can be predicted or forecasted prior to performing the predictive optimization process in step 2010. Step 2008 may include generating a trajectory or time series of each DV which includes a value of each DV at each time step of the optimization period. In some embodiments, step 2008 includes providing the forecasted DV trajectories in vector or matrix form, as shown in the following equations:

$$DV_1 = [DV_{1,1}, \quad DV_{1,2}, \quad DV_{1,3}, \quad \ldots \quad DV_{1,h}]$$
$$DV_2 = [DV_{2,1}, \quad DV_{2,2}, \quad DV_{2,3}, \quad \ldots \quad DV_{2,h}]$$
$$\vdots$$
$$DV_m = [DV_{m,1}, \quad DV_{m,2}, \quad DV_{m,3}, \quad \ldots \quad DV_{m,h}]$$

where $DV_1$ is a vector containing a value for the first DV at each time step $t=1 \ldots h$, $DV_2$ is a vector containing a value for the second DV at each time step $t=1 \ldots h$, and $DV_m$ is a vector containing a value for the m'th DV at each time step $t=1 \ldots h$, where m is the total number of DV's forecasted.

Step 2008 may use any of a variety of techniques to forecast the values of the DV's over the duration of the optimization period. In some embodiments, step 2008 includes extrapolating the values of the DV's from a historical pattern (e.g., historical values of the DV's prior to the beginning of the optimization period) using linear extrapolation, polynomial extrapolation, conical extrapolation, geometric extrapolation, constant extrapolation (e.g., holding the values of the DV's at their most recent known values), or any other extrapolation technique. In some embodiments, step 2008 includes applying noise to the extrapolated or forecasted values of the DV's. For example, step 2008 may include adding a noise signal (e.g., a random signal, a normally distributed or Gaussian noise signal, etc.) to the extrapolated or forecasted values of the DV's. In some embodiments, step 2008 includes using an auto-regressive model to predict the trajectory of the DV's based on their historical pattern. The DV trajectories generated in step 2008 can be provided as inputs to predictor neural network 1916 for use in predicting the CV's. The DV trajectories generated in step 2008 can also be provided as inputs to step 2010 for use in performing the predictive optimization process.

Process 2000 is shown to include performing a predictive optimization of the objective function subject to the constraints and using the predictor neural network determine optimal trajectories of the set of MV's over the optimization time period (step 2010). In some embodiments, step 2010 is performed by optimizer 1918 as described with reference to FIGS. 17-18. For example, step 2010 may include performing a model predictive control process to determine optimal values of a set of decision variables. In some embodiments, the decision variables include values for each of the MV's at each of the time steps within the optimization period. For example, if the optimization period includes ten time steps (i.e., t=1 ... 10) and the set of MV's includes three decision variables (i.e., $MV_a$, $MV_b$, and $MV_c$), the set of decision variables may include thirty decision variables (i.e., $MV_{a,1}$, $MV_{a,2}$, ..., $MV_{a,10}$, $MV_{b,1}$, $MV_{b,2}$, ..., $MV_{b,10}$, $MV_{c,1}$, $MV_{c,2}$, ..., $MV_{c,10}$). In some embodiments, the decision variables include a set of MV moves in addition to or in place of the optimal values of the MVs. The MV moves may indicate an amount by which the MV's should be changed relative to their previous values. For example, if step 2010 determines that the optimal value of a given MV at time step t−1 is $x_{t-1}$ and the optimal value of that same MV at time step t is $x_t$, step 2010 may calculate the optimal MV move from time step t−1 to time step t as $x_t - x_{t-1}$.

Step 2010 may include executing the predictive optimization process using any of a variety of optimization techniques. Examples of optimization techniques that can be used in step 2010 include zero-order, first-order, or second-order optimization algorithms. In some embodiments, step 2010 includes performing the optimization process iteratively to converge on the optimal set of values for the MV's or MV moves as the iterations progress.

In some embodiments, step 2010 includes determining the number of iterations to use and/or when to stop the iterative optimization process by monitoring results of the predictive optimization and evaluating whether the results are converging or have sufficiently converged. For example, step 2010 may include determining that the predictive optimization has sufficiently converged if the result of the most recent iteration deviates by less than a threshold (e.g., a percentage change, a change by less than a predetermined amount, etc.) relative to the previous iteration. In response to detecting such convergence, step 2010 may stop the iterative process and use the most recent set of results as the final results. The ability to adaptively determine when to stop the predictive optimization process may ensure that step 2010 includes a sufficient number of iterations to allow for convergence on the optimal values, but does not waste computational effort on unnecessary iterations once the results have sufficiently converged.

Process 2000 is shown to include determining whether there are any additional scenarios to consider (step 2012). If there are any additional scenarios to consider (i.e., the result of step 2012 is "yes"), process 2000 may advance to the next scenario (step 2014) and may repeat steps 2004-2010 for the next scenario. The various scenarios to be considered may be generated by scenarios generator 1936 as described with reference to FIGS. 17-18. The different scenarios may include multiple different and alternative sets of information that are used to define the optimization problem. For example, each of the alternative scenarios may include some or all of the information discussed above including, for example, a set of values for the DV trajectories, constraints 1930, target values of the CV's, or any other information needed to fully define the optimization problem. Each scenario may be a fully defined instance of the predictive optimization problem. However, each of the alternative scenarios may represent slightly different conditions and thus may include different values (relative to the other scenarios) for some or all of the DV trajectories, constraints 1930, target values of the CV's, or any other information needed to fully define the optimization problem.

In some embodiments, repeating steps 2004-2010 for the next scenario includes generating the next scenario by adding noise signals to a base set of the DV trajectories, constraints 1930, or target values of the CV's (e.g., different random noise signals, different normally distributed or Gaussian noise signals, etc.), by applying dropout to the neurons of predictor neural network 1916 (e.g., noise in internal neurons), or otherwise generating different and alternative sets of values for the various inputs to step 2010. By generating alternative scenarios in this manner, process 2000 can mimic the stochastic nature of the target environment and account for a variety of different scenarios that could potentially occur. This may result in a more robust control policy relative to any single scenario. Steps 2001-2012 may be repeated until there are no additional scenarios to consider in step 2012.

If there are no additional scenarios to consider in step 2012 (i.e., the result of step 2012 is "no"), process 2000 may merge the scenario-specific MV trajectories (step 2016). The scenario-specific MV trajectories may include the optimal trajectories of the set of MV's generated in step 2010 for each of the scenarios considered in process 2000. Each set of scenario-specific MV trajectories may be generated by performing an instance of steps 2004-2010 for a corresponding scenario. Each instance of steps 2004-2010 may be performed independently for the corresponding scenario (i.e., independent of the other scenarios) to generate a scenario-specific set of values for the MV's or MV moves that are optimal for that particular scenario.

Merging the scenario-specific MV trajectories in step 2016 may include combining (e.g., average, sum, aggregate, etc.) the scenario-specific results of the predictive optimization process from each instance of step 2010 to generate the final values for the MV's or MV moves. In some embodiments, step 2016 includes combining the scenario-specific results of the predictive optimization process using a weighted average that weights each scenario by the likelihood of that scenario occurring. For example, step 2016 may include calculating an amount by which the inputs for each scenario (i.e., the DV trajectories, constraints 1930, target values of the CV's, etc.) deviate from an average or mean of the set of scenarios (e.g., as a standard deviation, variance, etc.). Step 2016 may include assigning a greater weight to the scenarios that are closer to the average or mean, and a lower weight to the scenarios that are further from the average or mean (e.g., using a normally distributed set of weights that follow a bell-shaped curve centered at that average or mean scenario). One example of an equation that can be used to combine the scenario-specific MV trajectories in step 2016 is:

$$MV_t = \sum_{i=1}^{p} w_i MV_{i,t}$$

where $MV_t$ is the final value of a given MV at time t, $MV_{i,t}$ is the scenario-specific value of that same MV for the ith scenario generated by performing the predictive optimization using the scenario-specific inputs for the ith scenario, $w_i$ is the weight assigned to the ith scenario, and p is the total number of scenarios. The set of weights $w_1 \ldots w_p$ may sum to one in some embodiments. This same equation can be applied to each of the MV's in the MV trajectories and at each time step of the optimization period to combine the results of the scenario-specific predictive optimization processes into a final result that accounts for all of the different and alternative scenarios.

Process 2000 is shown to include using the optimal values of the MV's for a first time step of the optimization period to generate control signals for the first time step (step 2018). In some embodiments, step 2018 is performed by control signal generator 1920 as described with reference to FIGS. 17-18. For example, at time step t=1, steps 2004-2016 can be performed to generate a set of MV trajectories and/or MV moves for each time step from time step t=1 to time step t=h, where h is the total number of time steps within the optimization period. The MV trajectories can be provided in vector or matrix form, as shown in the following equations:

$$MV_1 = [MV_{1,1}, \quad MV_{1,2}, \quad MV_{1,3}, \quad \ldots \quad MV_{1,h}]$$
$$MV_2 = [MV_{2,1}, \quad MV_{2,2}, \quad MV_{2,3}, \quad \ldots \quad MV_{2,h}]$$
$$\vdots$$
$$MV_n = [MV_{n,1}, \quad MV_{n,2}, \quad MV_{n,3}, \quad \ldots \quad MV_{n,h}]$$

where $MV_1$ is a vector containing a value for the first MV or MV move at each time step t=1 ... h, $MV_2$ is a vector containing a value for the second MV or MV move at each time step t=1 ... h, and $MV_n$ is a vector containing a value for the n'th MV or MV move at each time step t=1 ... h, where n is the total number of MV's in the predictive optimization process. Step 2020 may include using the optimal values of the MV's or MV moves at time step t=1 and/or the optimal MV moves at time step t=1 to generate the control signals for controllable equipment 1926 at time step t=1. In some embodiments, step 2018 may ignore the optimal values of the MV's and/or MV moves for time steps t=2 ... h or store the optimal values of the MV's and/or MV moves for time steps t=2 ... h for later use.

Process 2000 is shown to include shifting the optimization period forward in time by one time step (step 2020) and returning to step 2004. In some embodiments, process 2000 includes repeating steps 2004-2020 at each time step to generate a new trajectory of values for each of the MV's and/or MV moves. Each trajectory may include a value of each of the MV's and/or MV moves for each of the time steps within the optimization period. For example, after shifting the optimization period forward in time by one time step, the optimization period may begin at time step t=2 and end at time step h+1. Steps 2004-2020 may be repeated to generate a set of MV trajectories and/or MV moves for each time step from time step t=2 to time step t=h+1, where h is the total number of time steps within the optimization period. The optimization period still has the same number of time steps, but is shifted forward in time relative to the previous optimization. The MV trajectories can be provided in vector or matrix form, as shown in the following equations:

$$MV_1 = [MV_{1,2}, \quad MV_{1,3}, \quad MV_{1,4}, \quad \ldots \quad MV_{1,h+1}]$$
$$MV_2 = [MV_{2,2}, \quad MV_{2,3}, \quad MV_{2,4}, \quad \ldots \quad MV_{2,h+1}]$$
$$\vdots$$
$$MV_n = [MV_{n,2}, \quad MV_{n,3}, \quad MV_{n,4}, \quad \ldots \quad MV_{n,h+1}]$$

where $MV_1$ is a vector containing a value for the first MV or MV move at each time step t=2 ... h+1, $MV_2$ is a vector containing a value for the second MV or MV move at each time step t=2 ... h+1, and $MV_n$ is a vector containing a value for the n'th MV or MV move at each time step t=2 ... h+1, where n is the total number of MV's in the predictive optimization process. When performing step 2018 the second time, process 2000 may use the optimal values of the MV's or MV moves at time step t=2 and/or the optimal MV moves at time step t=2 to generate the control signals for controllable equipment 1926 at time step t=2. Process 2000 may ignore the optimal values of the MV's and/or MV moves for time steps t=3 ... h+1 or store the optimal values of the MV's and/or MV moves for time steps t=3 ... h+1 for later use.

Steps 2004-2020 can be repeated iteratively by shifting the optimization period forward in time and performing another run of the predictive optimization process to provide control signal generator 1920 with an updated trajectory of MV's and/or MV moves at the beginning of each time step. Each time an updated trajectory of MV's and/or MV moves is received, step 2018 can implement the control decisions for the first time step in the updated trajectory (i.e., use the values of the MV's and/or MV moves for the first time step to generate the control signals for controllable equipment 1926) and ignore the control decisions for the remaining time steps in the updated trajectory. When another updated trajectory is received at the beginning of the next time step, step 2018 can overwrite the previously received trajectories of the MV's and/or MV moves with the most recent trajectories generated in step 2010.

As an alternative to overwriting the previously received trajectories each time a new trajectory is received, step 2018 may include storing in memory the full trajectories of the MV's and/or MV moves received at each time step. Step 2018 may include merging the updated trajectory with the previously generated trajectory or trajectories such that the value of a MV or MV move for a given time step evolves as additional trajectories containing that time step are received. For example, step 2018 may include calculating an average of all of the values of a given MV received for a given time step and use the average value to generate the control signals for controllable equipment 1926. In various embodiments, control signal generator 1920 can calculate the average value as simple average or a weighted average (e.g., an exponentially weighted average) which weighs more recently received trajectories more heavily.

By the time a given time step (e.g., time step t=x) becomes the first time step within a newly generated trajectory, process 2000 will have generated h trajectories that include the given time step (i.e., an initial trajectory that includes time step t=x as the last time step, an updated trajectory that includes time step t=x as the penultimate time step, etc.), where h is the number of time steps within the optimization period and the hth trajectory includes time step t=x as the first time step. Each successive trajectory may be shifted forward in time by one time step such that the given time step moves from the end of the trajectory (i.e., a trajectory ending at time step t=x) to the beginning of the trajectory (i.e., a trajectory beginning at time step t=x). Step 2018 can merge or combine the h values of the MV or MV move for the given time step t=x to calculate the value of the MV or MV move that is used to generate the control signals for controllable equipment 1926.

Referring now to FIG. 20, a block diagram of a process 2100 illustrating the functionality of predictor neural network 1916 and optimizer 1918 is shown, according to an exemplary embodiment. Predictor neural network 1916 can be configured to predict a set of CV's that will result from a set of MV's or MV moves at a given time based on the state of the plant during a time window leading up to the given time. The set of MV's or MV moves at the given time can be provided by optimizer 1918 and may be decision variables in the predictive optimization process. The state of the plant leading up to the given time may be defined by the trajectories of the MV's, CV's, and/or DV's within a time window leading up to the given time (e.g., time series or vectors of each of the MV's, CV's, and/or DV's containing a value for each of the MV's, CV's, and/or DV's at each time step within the time window). Optimizer 1918 can adjust the values of the MV's or MV moves when performing the predictive optimization process and can use predictor neural network 1916 to predict the values of the CV's that will result from the set of MV's or MV moves, in combination with the state of the plant leading up to the given time.

Process 2100 is shown to include a first stage 2102, a second stage 2104, and an h'th stage 2150. Any number of stages may occur between the second stage 2104 and the h'th stage 2150. In the first stage 2102, optimizer 1918 may provide predictor neural network 1916 with a set of MV's or MV moves for time step t+1. Predictor neural network 1916 may also receive the trajectories of the MV's, CV's, and/or DV's for a time window beginning at time step t-w and ending at time step t, where w is the duration of the time window. Predictor neural network 1916 may use these inputs to predict the values of the CV's at time step t+1. The set of MV's or MV moves at time step t+1 proposed by optimizer 1918 and the corresponding values of the CV's at time step t+1 output from predictor neural network 1916 may be appended to the trajectories of the MV's and the CV's for use in the next stage of process 2100.

The second stage 2104 is similar to the first stage 2102, but shifted forward in time by one time step. For example, in the second stage 2104, optimizer 1918 may provide predictor neural network 1916 with a set of MV's or MV moves for time step t+2. Predictor neural network 1916 may also receive the trajectories of the MV's, CV's, and/or DV's for a time window beginning at time step t+1-w and ending at time step t+1, where w is the duration of the time window. Predictor neural network 1916 may use these inputs to predict the values of the CV's at time step t+2. The set of MV's or MV moves at time step t+2 proposed by optimizer 1918 and the corresponding values of the CV's at time step t+2 output from predictor neural network 1916 may be appended to the trajectories of the MV's and the CV's for use in the next stage of process 2100.

Process 2100 may repeat these steps for each subsequent stage, advancing forward in time by one time step with each subsequent stage, until reaching the final stage 2150. In the final stage 2150, optimizer 1918 may provide predictor neural network 1916 with a set of MV's or MV moves for time step t+h, where h is the total number of stages, which may be equivalent to the number of time steps within the optimization period. Predictor neural network 1916 may also receive the trajectories of the MV's, CV's, and/or DV's for a time window beginning at time step t+h-1-w and ending at time step t+h-1, where w is the duration of the time window. Predictor neural network 1916 may use these inputs to predict the values of the CV's at time step t+h.

Upon completing the final stage 2150, optimizer 1918 may use the values of the MV's or MV moves for each time step and the predicted values of the CV's for each time step to evaluate objective function 1928. Optimizer 1918 may then adjust the proposed trajectories of the MV's and iteratively repeat process 2100 until objective function 1928 has sufficiently converged upon an optimal value. Upon reaching convergence, optimizer 1918 may output the values of the MV's or MV moves from the most recent iteration of process 2100 to control signal generator 1920 for use in generating the control signals for controllable equipment 1926.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A predictive control system for automatic operation of a plant, the predictive control system comprising:
controllable equipment operable to affect one or more controlled variables of the plant by providing the controllable equipment with control signals based on one or more manipulated variables; and
a predictive controller comprising a processing circuit configured to:
use a predictive model to predict values of the one or more controlled variables predicted to result from operating the controllable equipment in accordance with corresponding values of the one or more manipulated variables;
use the values of the one or more controlled variables predicted by the predictive model to evaluate an objective function that defines a control objective as a function of at least the one or more controlled variables;
perform a predictive optimization process to generate optimal values of the one or more manipulated variables for a plurality of time steps in an optimization period using the predictive model and the objective function; and
operate the controllable equipment by providing the controllable equipment with control signals based on the optimal values of the one or more manipulated variables generated by performing the predictive optimization process.

2. The predictive control system of claim 1, wherein:
the plant comprises at least one of an oil refinery system or process, a chemical plant, a manufacturing plant, a processing system, or a production system; and
the controllable equipment comprises one or more pieces of equipment in which a chemical reaction occurs, resulting in conversion of one or more input resources into one or more output products.

3. The predictive control system of claim 1, wherein the one or more manipulated variables comprise at least one of:
a feed rate, concentration, quality, or chemical or physical property of one or more input resources comprising one or more input feeds or catalysts provided as inputs to the plant;
a temperature, pressure, heat transfer, or energy consumption of one or more pieces of equipment within which the one or more input resources are converted into one or more output products; or a temperature, pressure, or flow rate of the one or more input resources or the one or more output products or a ratio based on flow rates of the one or more input resources or the one or more output products.

4. The predictive control system of claim 1, wherein the one or more controlled variables comprise at least one of:
a product yield, concentration, quality, or chemical or physical property of one or more output products produced by the plant;
a temperature, pressure, heat transfer, or energy consumption of one or more pieces of equipment within which one or more input resources are converted into the one or more output products; or
a temperature, pressure, or flow rate of the one or more input resources or the one or more output products or a ratio based on flow rates of the one or more input resources or the one or more output products.

5. The predictive control system of claim 1, wherein performing the predictive optimization process comprises performing a model predictive control process using the predictive model and the objective function, the model predictive control process comprising:
using the predictive model to predict the values of the one or more controlled variables predicted to result from operating the controllable equipment in accordance with the corresponding values of the one or more manipulated variables;
evaluating the objective function using the values of the one or more controlled variables predicted using the predictive model; and
adjusting the one or more manipulated variables to drive the control objective defined by the objective function toward an optimum value.

6. The predictive control system of claim 5, wherein the predictive model comprises a predictor neural network configured to predict the values of the one or more controlled variables based on the corresponding values of the one or more manipulated variables.

7. The predictive control system of claim 1, wherein:
the predictive model comprises a predictor neural network configured to predict the values of the one or more controlled variables based on the corresponding values of the one or more manipulated variables; and
the predictive controller is configured to generate the optimal values of the one or more manipulated variables by:
training a controller neural network using the predictor neural network and the objective function; and
using the controller neural network to generate the optimal values of the one or more manipulated variables based on a current state of the plant.

8. The predictive control system of claim 1, wherein:
the predictive model comprises a predictor neural network configured to generate a gains matrix based on a current state of the plant; and
the predictive controller is configured to generate the optimal values of the one or more manipulated variables by:
using the gains matrix to predict the values of the one or more controlled variables predicted to result from the corresponding values of the one or more manipulated variables; and
performing an optimization process to determine the optimal values of the one or more manipulated variables according to a relationship between the values of the one or more controlled variables and the corresponding values of the one or more manipulated variables defined by the gains matrix.

9. The predictive control system of claim 1, wherein:
the predictive model comprises a predictor neural network configured to generate a gains matrix based on a current state of the plant; and
the predictive controller is configured to generate the optimal values of the one or more manipulated variables by:
training a controller neural network using the gains matrix to predict the values of the one or more controlled variables predicted to result from the corresponding values of the one or more manipulated variables; and
using the controller neural network to generate the optimal values of the one or more manipulated variables based on the current state of the plant.

10. The predictive control system of claim 1, wherein:
the predictive model comprises a predictor neural network configured to generate a plurality of gains matrices using a set of historical state data for the plant; and
the predictive controller is configured to generate the optimal values of the one or more manipulated variables by:
training a controller neural network using the plurality of gains matrices to predict the values of the one or more controlled variables predicted to result from the corresponding values of the one or more manipulated variables; and
using the controller neural network to generate the optimal values of the one or more manipulated variables based on a current state of the plant.

11. A method for automatic operation of controllable equipment of a plant, the method comprising:
using a predictive model to predict values of one or more controlled variables of the plant predicted to result from operating the controllable equipment in accordance with corresponding values of one or more manipulated variables;
using the values of the one or more controlled variables predicted by the predictive model to evaluate an objective function that defines a control objective as a function of at least the one or more controlled variables;
performing a predictive optimization process to generate optimal values of the one or more manipulated variables for a plurality of time steps in an optimization period using the predictive model and the objective function; and
operating the controllable equipment by providing the controllable equipment with control signals based on the optimal values of the one or more manipulated variables generated by performing the predictive optimization process.

12. The method of claim 11, wherein:
the plant comprises at least one of an oil refinery system or process, a chemical plant, a manufacturing plant, a processing system, or a production system; and
the controllable equipment comprises one or more pieces of equipment in which a chemical reaction occurs, resulting in conversion of one or more input resources into one or more output products.

13. The method of claim 11, wherein the one or more manipulated variables comprise at least one of:
- a feed rate, concentration, quality, or chemical or physical property of one or more input resources comprising one or more input feeds or catalysts provided as inputs to the plant;
- a temperature, pressure, heat transfer, or energy consumption of one or more pieces of equipment within which the one or more input resources are converted into one or more output products; or
- a temperature, pressure, or flow rate of the one or more input resources or the one or more output products or a ratio based on flow rates of the one or more input resources or the one or more output products.

14. The method of claim 11, wherein the one or more controlled variables comprise at least one of:
- a product yield, concentration, quality, or chemical or physical property of one or more output products produced by the plant;
- a temperature, pressure, heat transfer, or energy consumption of one or more pieces of equipment within which one or more input resources are converted into the one or more output products; or
- a temperature, pressure, or flow rate of the one or more input resources or the one or more output products or a ratio based on flow rates of the one or more input resources or the one or more output products.

15. The method of claim 11, wherein performing the predictive optimization process comprises performing a model predictive control process using the predictive model and the objective function, the model predictive control process comprising:
- using the predictive model to predict the values of the one or more controlled variables predicted to result from operating the controllable equipment in accordance with the corresponding values of the one or more manipulated variables;
- evaluating the objective function using the values of the one or more controlled variables predicted using the predictive model; and
- adjusting the one or more manipulated variables to drive the control objective defined by the objective function toward an optimum value.

16. The method of claim 15, wherein the predictive model comprises a predictor neural network configured to predict the values of the one or more controlled variables based on the corresponding values of the one or more manipulated variables.

17. The method of claim 11, wherein:
the predictive model comprises a predictor neural network configured to predict the values of the one or more controlled variables based on the corresponding values of the one or more manipulated variables; and
performing a predictive optimization process to generate the optimal values of the one or more manipulated variables comprises:
- training a controller neural network using the predictor neural network and the objective function; and
- using the controller neural network to generate the optimal values of the one or more manipulated variables based on a current state of the plant.

18. The method of claim 11, wherein:
the predictive model comprises a predictor neural network configured to generate a gains matrix based on a current state of the plant; and
performing a predictive optimization process to generate the optimal values of the one or more manipulated variables comprises:
- using the gains matrix to predict the values of the one or more controlled variables predicted to result from the corresponding values of the one or more manipulated variables; and
- performing an optimization process to determine the optimal values of the one or more manipulated variables according to a relationship between the values of the one or more controlled variables and the corresponding values of the one or more manipulated variables defined by the gains matrix.

19. The method of claim 11, wherein:
the predictive model comprises a predictor neural network configured to generate a gains matrix based on a current state of the plant; and
performing a predictive optimization process to generate the optimal values of the one or more manipulated variables comprises:
- training a controller neural network using the gains matrix to predict the values of the one or more controlled variables predicted to result from the corresponding values of the one or more manipulated variables; and
- using the controller neural network to generate the optimal values of the one or more manipulated variables based on the current state of the plant.

20. The method of claim 11, wherein:
the predictive model comprises a predictor neural network configured to generate a plurality of gains matrices using a set of historical state data for the plant; and
performing a predictive optimization process to generate the optimal values of the one or more manipulated variables comprises:
- training a controller neural network using the plurality of gains matrices to predict the values of the one or more controlled variables predicted to result from the corresponding values of the one or more manipulated variables; and
- using the controller neural network to generate the optimal values of the one or more manipulated variables based on a current state of the plant.

* * * * *